US010219256B2

(12) United States Patent
Yoo et al.

(10) Patent No.: US 10,219,256 B2
(45) Date of Patent: Feb. 26, 2019

(54) CONTROL INFORMATION FEEDBACK FOR ECC ON PCELL

(71) Applicant: QUALCOMM Incorporated, San Diego, CA (US)

(72) Inventors: Taesang Yoo, Riverside, CA (US); Durga Prasad Malladi, San Diego, CA (US); Yongbin Wei, La Jolla, CA (US); Jelena Damnjanovic, Del Mar, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 14/984,339

(22) Filed: Dec. 30, 2015

(65) Prior Publication Data

US 2016/0205679 A1   Jul. 14, 2016

Related U.S. Application Data

(60) Provisional application No. 62/104,964, filed on Jan. 19, 2015, provisional application No. 62/102,739, filed on Jan. 13, 2015.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/0026* (2013.01); *H04L 1/1854* (2013.01);
(Continued)

(58) Field of Classification Search
CPC ... H04L 1/0026; H04L 1/1854; H04L 1/1861; H04L 5/001; H04L 5/0055; H04L 5/0057; H04W 72/0413
(Continued)

(56) References Cited

U.S. PATENT DOCUMENTS

2012/0140743 A1   6/2012   Pelletier et al.
2013/0034073 A1   2/2013   Aiba et al.
(Continued)

FOREIGN PATENT DOCUMENTS

WO   WO-2012106843 A1   8/2012

OTHER PUBLICATIONS

ISA/EP, International Search Report and Written Opinion of the International Searching Authority, Int'l Appl. No. PCT/US2015/068332, dated Jul. 1, 2016, European Patent Office, Rijswijk, NL, 21 pgs.
(Continued)

*Primary Examiner* — Robert J Lopata
(74) *Attorney, Agent, or Firm* — Holland & Hart LLP

(57) ABSTRACT

Described herein are methods, systems, and apparatus for communicating control information over a primary component carrier (PCell). In one example, a method for wireless communication is described that includes communicating using an enhanced component carrier (eCC) on at least a secondary component carrier (SCell) in a carrier aggregation (CA) configuration. The method may also include using a PCell for control information pertaining to communications on the eCC. The control information may be channel state information (CSI) or acknowledgment/negative-acknowledgment (ACK/NACK) feedback information.

31 Claims, 28 Drawing Sheets

(51) Int. Cl.
  *H04L 1/00* (2006.01)
  *H04L 1/18* (2006.01)
  *H04W 72/14* (2009.01)

(52) U.S. Cl.
  CPC ............ *H04L 1/1861* (2013.01); *H04L 5/001* (2013.01); *H04L 5/0055* (2013.01); *H04L 5/0057* (2013.01); *H04W 72/042* (2013.01); *H04W 72/14* (2013.01)

(58) Field of Classification Search
  USPC ........................................................ 370/329
  See application file for complete search history.

(56) References Cited

U.S. PATENT DOCUMENTS

| | | | | |
|---|---|---|---|---|
| 2013/0336273 | A1 | 12/2013 | Takeda et al. | |
| 2013/0343288 | A1* | 12/2013 | Ratasuk | H04W 72/1215 370/329 |
| 2014/0161002 | A1* | 6/2014 | Gauvreau | H04W 16/24 370/280 |
| 2014/0211672 | A1* | 7/2014 | Klatt | H04L 5/001 370/280 |
| 2015/0023228 | A1* | 1/2015 | Yin | H04L 5/001 370/280 |
| 2015/0049652 | A1* | 2/2015 | Li | H04L 5/0057 370/280 |
| 2015/0092703 | A1* | 4/2015 | Xu | H04L 5/003 370/329 |
| 2015/0163805 | A1* | 6/2015 | Cattoni | H04W 72/0453 370/329 |
| 2015/0223243 | A1* | 8/2015 | Tabet | H04W 28/085 370/330 |
| 2015/0236829 | A1* | 8/2015 | Ratasuk | H04L 5/0048 370/329 |
| 2015/0245219 | A1* | 8/2015 | Wei | H04W 16/14 370/336 |
| 2015/0245232 | A1* | 8/2015 | Luo | H04W 24/08 370/252 |
| 2015/0373741 | A1* | 12/2015 | Yerramalli | H04W 24/08 370/336 |
| 2016/0119920 | A1* | 4/2016 | Mallik | H04L 5/0048 370/336 |
| 2016/0119948 | A1* | 4/2016 | Damnjanovic | H04L 1/1812 370/280 |
| 2016/0119969 | A1* | 4/2016 | Vajapeyam | H04W 24/10 370/329 |
| 2016/0128028 | A1* | 5/2016 | Mallik | H04W 72/042 370/336 |
| 2016/0128090 | A1* | 5/2016 | Azarian Yazdi | H04L 5/0048 370/329 |
| 2016/0128091 | A1* | 5/2016 | Azarian Yazdi | H04L 5/0048 370/329 |
| 2016/0128092 | A1* | 5/2016 | Azarian Yazdi | H04L 5/0048 370/329 |
| 2016/0128095 | A1* | 5/2016 | Damnjanovic | H04W 72/14 370/336 |
| 2016/0373235 | A1* | 12/2016 | Oh | H04L 1/18 |
| 2016/0374079 | A1* | 12/2016 | Yasukawa | H04B 7/2615 |
| 2017/0005775 | A1* | 1/2017 | Cheng | H04L 5/0098 |
| 2017/0063479 | A1* | 3/2017 | Kim | H04W 24/10 |
| 2017/0367106 | A1* | 12/2017 | Kim | H04W 72/1215 |
| 2018/0019836 | A1* | 1/2018 | Kim | H04J 11/0079 |

OTHER PUBLICATIONS

ITL Inc., "The On/Off State Indication of SCell in LAA Unlicensed Carrier for DL Measurement," 3GPP TSG RAN WG1 Meeting #79, R1-145110, San Francisco, USA, Nov. 17-21, 2014, 3 pgs., XP_50876142A, 3rd Generation Partnership Project.

LG Electronics, "Data Scheduling and Control Signaling in LAA," 3GPP TSG RAN WG1 Meeting #79, R1-144904, San Francisco, USA, Nov. 17-21, 2014, 5 pgs., XP_50875960A, 3rd Generation Partnership Project.

Samsung, "Discussion on the Impacts of Pcell Duplex Mode for LAA," 3GPP TSG RAN WG1 #79, R1-144745, San Francisco, USA, Nov. 17-21, 2014, 3 pgs., XP_50875823A, 3rd Generation Partnership Project.

Ho et al., "Enhanced Component Carrier Selection and Power Allocation in LTE-Advanced Downlink Systems," 2013 IEEE Wireless Communications and Networking Conference (WCNC): MAC, Apr. 2013, 6 pgs., 978-1-4673-5939-9/13, Intelligent Information and Communications Research Center, National Chiao Tung University, Taiwan.

* cited by examiner

CONTROL INFORMATION FEEDBACK FOR ECC ON PCELL

CROSS REFERENCES

The present application for patent claims priority to U.S. Provisional Patent Application No. 62/104,964 by Damnjanovic et al., entitled "HARQ and CSI Feedback for Non-Standalone Enhanced Component Carriers," filed Jan. 19, 2015, and U.S. Provisional Patent Application No. 62/102,739 by Yoo et al., entitled "Control Information Feedback for ECC on PCell," filed Jan. 13, 2015, assigned to the assignee hereof.

BACKGROUND

Field of the Disclosure

The present disclosure, for example, relates to wireless communication systems, and more particularly to communicating control information related to communications using an enhanced component carrier (eCC).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless communication network may include a number of base stations that can support communication for a number of mobile devices, otherwise known as user equipments (UEs). Each base station may simultaneously supporting communication for multiple UEs. A base station may communicate with UEs on downlink channels (e.g., for transmissions from a base station to a UE) and uplink channels (e.g., for transmissions from a UE to a base station). The UE may communicate with a base station via downlink (DL) and uplink (UL) transmissions. The DL (or forward link) refers to the communication link from the base station to the mobile device, and the UL (or reverse link) refers to the communication link from the mobile device to the base station.

The wireless communication networks including the base stations and mobile devices may support operation on multiple carriers which may be called carrier aggregation. Carrier aggregation may be used to increase throughput between a base station supporting multiple component carriers and a mobile device, and mobile devices may be configured to communicate using multiple component carriers associated with multiple base stations. Other techniques for increasing throughput using multiple carriers may be used where base stations performing joint operations have non-ideal backhaul (e.g., dual-connectivity, etc.). Multiple access technologies may use Frequency Division Duplexing (FDD) or Time Division Duplexing (TDD) to provide UL and DL communications over one or more carriers.

In some instances of carrier aggregation, control information may be exchanged between nodes. However, sending control information on a secondary component carrier on an unlicensed or shared band may be inefficient due to the transmitting node needing to obtain media access. Sending control information on an unlicensed or shared band may also be inefficient because it could cause other nodes to back-off when the transmitting device is only sending a short burst of information. Further, the unlicensed or shared medium may not be available at particular times for providing feedback. For example, collisions may occur on the medium when providing feedback or the medium may be preempted by a higher priority operator. Therefore, providing reliable feedback for secondary carriers using unlicensed or shared spectrum provides challenges.

SUMMARY

Systems, methods, and apparatuses for data acknowledgement and channel feedback for non-standalone enhanced component carriers are described. In a carrier aggregation configuration, a user equipment (UE) or a base station (BS) may use more than one component carrier. An enhanced component carrier (eCC) configuration may be used with a licensed radio spectrum frequency band, but may also be used with a shared or unlicensed radio spectrum frequency band, where multiple UEs or base stations may be using the same band. When eCC is used as a secondary carrier component (SCell) on an unlicensed or shared radio spectrum frequency band, the UE or base station may exchange control information over a primary carrier component (PCell). Using the PCell for short, bursty data such as control information may improve efficiency on the SCell. The control information that may be exchanged over the PCell may include, but is not limited to, downlink (DL) acknowledgment/negative-acknowledgments (ACK/NACK), uplink (UL) ACK/NACKs, channel state information (CSI), DL grants, and UL grants.

Data acknowledgement feedback for an eCC may include ACK/NACK feedback information for each code block transmitted on the eCC. The ACK/NACK feedback information may be transmitted on an uplink control channel or data channel of the PCell in a feedback subframe of the PCell determined based on a subframe of the PCell for which transmission on the eCC is completed. Data acknowledgement feedback for the eCC may be provided using a control channel of the PCell, and may use a new or existing control channel format. Where the number of bits for block ACK/NACK of code blocks received on the eCC in a feedback subframe exceeds the capacity of the control channel format, spatial bundling or bundling of code blocks within a transport block may be performed. In some embodiments, downlink grants associated with transmissions received on the eCC may include index information to resolve ACK/NACK mapping ambiguity within reported data acknowledgement feedback. Additionally or alternatively, multiple control channel transmissions (e.g., one per transport block, etc.) may be sent on the PCell in the feedback subframe.

In some embodiments, an uplink data channel of the PCell may be used for transmission of data acknowledgement feedback for an eCC when the uplink data channel has a scheduled data transmission in a feedback subframe for the eCC. The block ACK/NACK feedback for code blocks received on the eCC may be sent in the uplink data channel transmission without bundling. The uplink data channel may be used for data acknowledgement feedback for the eCC even when the UE is configured for simultaneous transmission via a data channel and a control channel.

In some embodiments, channel state information (CSI) feedback for the eCC can be sent on the PCell. For example, the eCC may be configured to report periodic CSI feedback and may report the periodic CSI feedback on the control channel or data channel (if a data transmission is being sent during the CSI feedback subframe) of the PCell. Aperiodic CSI can be triggered by a grant on the PCell or by a grant on the eCC. In some cases, aperiodic CSI is transmitted on the cell that triggers the aperiodic CSI report. Alternatively, aperiodic CSI may be transmitted on the PCell regardless of which cell triggers the aperiodic CSI report.

In a first set of illustrative examples, a method for wireless communication is described. In one configuration, the method includes communicating using an eCC on at least an SCell in a carrier aggregation (CA) configuration. The method also includes using a PCell for control information pertaining to communications on the eCC.

In a second set of illustrative examples, an apparatus for wireless communication is described. In one configuration, the apparatus may include means for communicating using an eCC on at least a SCell in a CA configuration. The apparatus may also include means for using a PCell for control information pertaining to communications on the eCC.

In a third set of illustrative examples, an apparatus for wireless communication is described. In one configuration, the apparatus may include a processor, memory in electronic communication with the processor, and instructions stored in the memory. The instructions are executable by the processor to communicate using an eCC on at least a SCell in a CA configuration. The instructions may be further executable by the processor to use a PCell for control information pertaining to communications on the eCC.

In a fourth set of illustrative examples, a non-transitory computer-readable medium storing computer-executable code for wireless communication is described. In one configuration, the code is executable by a processor to communicate using an eCC on at least a SCell in a CA configuration. The code may be further executable by the processor to use a PCell for control information pertaining to communications on the eCC.

One or more of the following aspects may pertain to one or more of the disclosed set of illustrative examples.

In some example embodiments, communicating using the eCC includes communicating on an unlicensed radio frequency spectrum band or a shared radio frequency spectrum band. In other examples, communicating using the eCC includes communicating on a licensed radio frequency spectrum band.

In some examples, using the PCell for control information further includes sending or receiving CSI related to the eCC. Sending or receiving CSI may further include sending or receiving the CSI on one or both of a physical UL control channel (PUCCH) of the PCell and a physical UL shared channel (PUSCH) of the PCell.

In another example embodiment, using the PCell for control information further includes sending or receiving, in response to data received via the eCC, one of a DL ACK/NACK and an UL ACK/NACK. In some examples, using the PCell to send or receive control information further includes sending the UL ACK/NACK in response to eCC DL data on one or both of a PUCCH of the PCell and a PUSCH of the PCell.

In yet another example, using the PCell to send or receive control information further includes sending the DL ACK/NACK in response to eCC UL data on at least one of a physical hybrid automatic repeat request (HARD) indicator channel (PHICH) of the PCell, an enhanced PHICH (ePHICH) of the PCell, a physical DL shared channel (PDSCH) of the PCell, and combinations thereof.

Communicating one of the DL ACK/NACK and the UL ACK/NACK may further include communicating a block ACK/NACK containing multiple ACK/NACKs corresponding to multiple eCC DL data or multiple eCC UL data. In another example, communicating the block ACK/NACK further includes indicating that the multiple ACK/NACKs correspond to multiple users transmitting the data received via the eCC.

In another example, using the PCell to send or receive control information further includes sending or receiving one or both of a DL grant and an UL grant. The example may further include sending the DL grant that identifies one or both of time and frequency resources for PDSCH transmission on the eCC and refraining from sending DL data in response to a failure to gain access to a medium identified in the DL grant using the identified time or frequency resources. Another example includes sending the DL grant that identifies multiple time and frequency resources for PDSCH transmission on the eCC and refraining from sending DL data in response to a failure to gain access to a medium identified in the DL grant using one of the multiple time or frequency resources.

Yet another example includes sending the DL grant that identifies an expiration time for PDSCH transmission on the eCC. The example may further include refraining from sending DL data in response to a failure to gain access to a medium identified in the DL grant by the expiration time.

Some examples include gaining access to a medium, wherein sending or receiving one or both the DL grant and the UL grant further comprises sending the DL grant, wherein the DL grant identifies resources for the medium.

Another example includes receiving the UL grant that identifies one or both of time and frequency resources for PUSCH transmission on the eCC. This example may further include refraining from sending UL data in response to a failure to gain access to a medium identified in the UL grant using the identified times or frequency resources. Another example includes receiving the UL grant that identifies an expiration time for PUSCH transmission on the eCC and refraining from sending UL data in response to a failure to gain access to a medium identified in the UL grant by the expiration time.

Another example includes identifying ACK/NACK feedback information for a plurality of code blocks received on the eCC of the SCell, the plurality of code blocks received in a plurality of scheduled transport blocks and identifying a feedback subframe of the PCell for providing the ACK/NACK feedback information based at least in part on a subframe of the PCell for which transmissions of the plurality code blocks received on the eCC completed. Sending or receiving the ACK/NACK feedback information may include transmitting the ACK/NACK feedback information via the PCell in the identified feedback subframe.

In some examples where the PCell comprises a downlink primary component carrier and a frequency division duplex (FDD) uplink primary component carrier, the feedback subframe has a predetermined offset from the subframe of the PCell for which the transmissions of the plurality of code blocks received on the eCC is completed. In another example where the PCell comprises a time division duplex (TDD) component carrier, the feedback subframe comprises a first uplink subframe of the TDD component carrier after a predetermined offset from the subframe of the PCell for which the transmissions of the plurality of code blocks received on the eCC are completed.

Some examples include jointly coding the ACK/NACK feedback information for sending in a single PUCCH transmission. Such an example may further include determining that a number of ACK/NACK bits of the ACK/NACK feedback information exceeds a capacity of a PUCCH format used for the PUCCH transmission and bundling one or more categories of ACK/NACK feedback information prior to the jointly encoding. The one or more categories may include any of ACK/NACK feedback information associated with different spatial streams, ACK/NACK feedback information for code blocks within a transport block of the plurality of scheduled transport blocks for the SCell, or combinations thereof.

One or more examples may include receiving downlink transmission index information within downlink grants associated with the plurality of scheduled transport blocks. These examples may further include determining, based at least in part on receiving a downlink grant for the eCC having an out of order index, that transmission of at least one downlink grant for the eCC has failed and sending, in the transmitted ACK/NACK feedback information, one or more NACK bits for the at least one downlink grant for the eCC that has failed. In some examples, the downlink transmission index information identifies a downlink grant order for providing ACK/NACK feedback for the plurality of scheduled transport blocks. In some examples, the downlink transmission index information identifies a code block order for providing ACK/NACK feedback for code blocks of the plurality of scheduled transport blocks. The PUCCH transmission may be a Long Term Evolution (LTE)/LTE-A PUCCH format 3 transmission.

In other examples include determining that a number of ACK/NACK bits of the ACK/NACK feedback information exceeds a capacity of a PUCCH format used for transmitting the ACK/NACK feedback information. The examples may also include determining a plurality of PUCCH resources for transmission of the ACK/NACK feedback information. Sending or receiving the ACK/NACK feedback information may further include transmitting a plurality of PUCCH transmissions using the plurality of PUCCH resources. In some examples, the ACK/NACK feedback information for respective transport blocks of the plurality of scheduled transport blocks for the SCell are separately transmitted in respective ones of the plurality of PUCCH transmissions.

Some examples may further include identifying a PUSCH transmission scheduled for the identified feedback subframe, wherein transmitting the ACK/NACK feedback information via the PCell in the identified feedback subframe further includes transmitting the ACK/NACK feedback information using the scheduled PUSCH transmission. Some examples may also include identifying second ACK/NACK feedback information associated with downlink transmissions not carried via the eCC for sending during the identified feedback subframe and transmitting the second ACK/NACK feedback information on a PUCCH in the identified feedback subframe.

Some examples also include receiving a grant comprising a trigger for aperiodic CSI feedback and determining a carrier of the PCell or SCell for transmission of the aperiodic CSI feedback. Determining the carrier may include determining the carrier based at least in part on any of a cell on which the grant is received, a cell which is scheduled by the grant, or combinations thereof. In some examples, the carrier for transmission of the aperiodic CSI feedback includes a carrier of the PCell.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
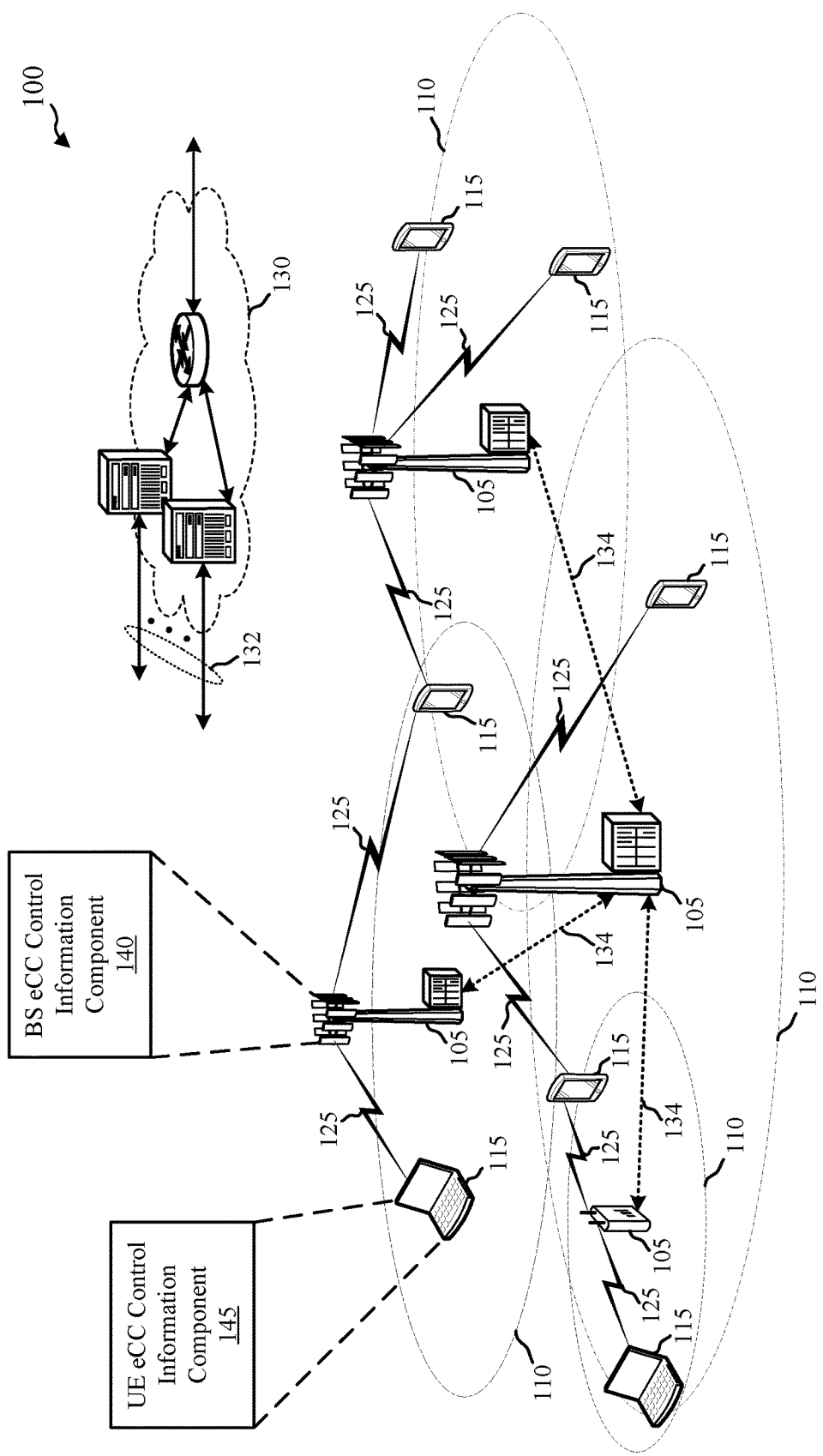
FIG. 1 shows a diagram of a wireless communication system, in accordance with various aspects of the present disclosure.

Described embodiments are directed to systems, devices, and methods for multi-carrier communications using an enhanced component carrier (eCC) configuration. These embodiments may include hybrid automatic repeat request (HARQ) and channel state information (CSI) feedback for a non-standalone eCC. The eCC configuration may be used with a licensed radio spectrum frequency band as well as with a shared or unlicensed radio spectrum frequency band. When eCC is deployed as a secondary component carrier (SCell or SCC) on a shared or unlicensed channel, a base station (BS) and a user equipment (UE) using the SCell may not have exclusive access to the channel over which they are communicating. Instead, the BS and the UE may have improved efficiency by sending some traffic over a primary component carrier (PCell or PCC). Short, bursty, or isolated information may be appropriate to transmit over the PCell instead of the SCell. Such information includes control information.

Techniques described herein provide for communicating nodes to exchange control information such as, for example, downlink (DL) acknowledgement/negative acknowledgements (ACK/NACKs), uplink (UL) ACK/NACKs, CSI, DL grants, and UL grants, over a PCell.

The eCC configuration may be a wideband carrier that supports up to 80 megahertz (MHz) bandwidth, which may be greater than some legacy Long Term Evolution (LTE) bandwidths. The eCC configuration may also support a shorter (e.g., 16.67 microsecond (µs)) Orthogonal Frequency Division Multiplexing (OFDM) symbol duration and a larger subcarrier spacing (e.g., 60 kilohertz (KHz)) than legacy LTE. The eCC configuration may be used as a standalone component carrier or as an SCell in carrier aggregation (CA) systems.

Further described herein are techniques for sending block ACK/NACK messages over a PCell. Also described are techniques for handling UL/DL grants when the UE or base station cannot access the shared medium for transmitting the UL/DL data, respectively.

A transmission on the eCC (e.g., granted by one downlink assignment) may contain multiple code blocks and HARQ feedback for the eCC may be provided as block ACK/NACK information via a PCell. If the PCell is an FDD PCell, the HARQ feedback for transmissions that complete in subframe k may be transmitted on an uplink control channel or data channel of the PCell at a feedback subframe having a fixed offset from subframe k. The fixed offset may be shorter than a fixed offset used for transmissions received via other carriers (e.g., the PCell or other SCells, etc.). If the PCell is a time division duplex (TDD) PCell, the HARQ feedback for transmissions that complete in subframe k may be transmitted on an uplink control channel or data channel of the PCell at a first uplink subframe of the PCell after fixed offset from subframe k.

A single uplink control channel transmission on the PCell may have a predetermined capacity for ACK/NACK information. For example, physical UL control channel (PUCCH) format 3 can carry up to 20 bits of HARQ feedback information. If the number of bits for block ACK/NACK of the eCC exceeds the capacity of the uplink control channel, bundling may be performed to reduce the number of bits of ACK/NACK information provided. Spatial bundling may be performed first, with code block bundling performed if the number of bits of ACK/NACK information still exceeds the capacity of the uplink control channel after spatial bundling. Additionally or alternatively, multiple uplink control channel transmissions (e.g., multiple PUCCH format 3 transmissions, etc.) may be used to convey HARQ feedback for an eCC within one feedback subframe of the PCell. For example, each transmission received via the eCC may be associated with one uplink control channel transmission. Multiple resources may be configured for the UE, and which resource to use for feedback may be specified in the downlink grant. Resources for HARQ feedback for eCCs may be overloaded among UEs (e.g., the same resources for HARQ feedback for eCC transmissions may be assigned to more than one UE).

In some embodiments, downlink grants may convey index information for transmissions over the eCC to resolve ACK/NACK mapping ambiguity in case a downlink grant is lost. The index information may include a transmission index for the transmission, or code block index information identifying each code block of the transmissions.

Due to the capacity limitations of using the PCell control channel, HARQ feedback for an eCC may utilize the uplink data channel of the PCell for providing feedback, whenever possible. HARQ feedback for the eCC provided via the uplink data channel of the PCell may follow the same timeline as providing feedback via the uplink control channel. Thus, the uplink data channel of the PCell may carry HARQ feedback for the eCC whenever a data transmission is scheduled during a feedback subframe for providing HARQ feedback for the eCC. The uplink data channel of the PCell may be used even where the UE is configured for simultaneous transmission on the uplink control channel and uplink data channel, and even where HARQ feedback for other carriers (e.g., the PCell, other SCells, etc.) is provided using the uplink control channel.

In some embodiments, CSI feedback for the eCC can be sent on the PCell. For example, the eCC may be configured to report periodic CSI feedback and may report the periodic CSI feedback on the PUCCH or physical UL shared channel (PUSCH) (if a data transmission is being sent during the CSI feedback subframe) of the PCell. Aperiodic CSI can be triggered by a grant on the PCell or by a grant on the eCC. In some cases, aperiodic CSI is transmitted on the cell that triggers the aperiodic CSI report. Alternatively, aperiodic CSI may be transmitted on the PCell regardless of which cell triggers the aperiodic CSI report.

The techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Techniques described herein may be used for various wireless communications systems such as CDMA, TDMA, FDMA, OFDMA, SC-FDMA, and other systems. The terms "system" and "network" are often used interchangeably. Examples of Radio Access Technologies employing CDMA techniques include CDMA2000, Universal Terrestrial Radio Access (UTRA), and the like. CDMA2000 covers IS-2000, IS-95, and IS-856 standards. IS-2000 Releases 0 and A are commonly referred to as CDMA2000 1x, 1x, and the like. IS-856 (TIA-856) is commonly referred to as CDMA2000 1xEV-DO, High Rate Packet Data (HRPD), and the like. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies including cellular (e.g., LTE) communications over an unlicensed and/or shared bandwidth.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller. In various examples, the base stations 105 may communicate, either directly or indirectly (e.g., through core network 130), with each other over backhaul links 134 (e.g., X1, etc.), which may be wired or wireless communication links.

Generally, wireless communications systems utilize wireless spectrum that is partitioned into frequency bands, which may be regulated (e.g., by the FCC, etc.) according to various regulation schemes. For example, licensed bands may be reserved for a particular operator or purpose, and devices that are not licensed to operate on the band are generally prohibited from transmitting on the band. Unlicensed bands may not be reserved for a particular operator but may be used according to various rules or protocols (e.g., limited transmit power, contention resolution protocols, etc.). Shared frequency bands may have a prioritized operator that has precedence when transmitting, but may allow for opportunistic use by non-prioritized operators.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, an evolved NodeB (eNB), Home NodeB, a Home eNodeB, or some other suitable terminology. The geographic coverage area 110 for a base station 105 may be divided into sectors making up only a portion of the coverage area. The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term eNB may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, etc.). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

Wireless communications system 100 may support operation on multiple cells or carriers, a feature which may be referred to as CA or multi-carrier operation. A carrier may also be referred to as a component carrier (CC), a layer, a channel, etc. The terms "carrier," "component carrier," "cell," and "channel" may be used interchangeably herein. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each carrier may be used to transmit control information (e.g., reference signals, control channels, etc.), overhead information, data, etc. Multiple component carriers may be aggregated or utilized concurrently to provide some UEs 115 with greater bandwidth and, e.g., higher data rates. Each component carrier may provide the same capabilities as an isolated carrier based on release 8 or release 9 of the LTE standard. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Additionally or alternatively, carrier aggregation may be used with both FDD and TDD component carriers.

The wireless communication system 100 may use an eCC for CA. The eCC may be used as a standalone component carrier (e.g., a PCell) or as an SCell in CA. The eCC may be a wideband carrier that has non-backward compatible OFDM numerology. For example, the eCC may have a wider bandwidth and a shorter OFDM symbol duration and larger subcarrier spacing than that used in legacy LTE. In one particular example, an eCC has up to and including an approximately 80 MHz bandwidth, a 16.67 µs OFDM symbol duration, and a subcarrier spacing of 60 KHz. In other examples, the eCC may have other bandwidths, OFDM symbol durations, and subcarrier spacing.

The wireless communication system 100 is capable of using an eCC in different radio frequency spectrum bands. The wireless communication system 100 may deploy an eCC in an unlicensed radio frequency spectrum band or in a licensed radio frequency spectrum band. The unlicensed radio frequency spectrum band may be similar to that used in LTE-Advanced in an unlicensed radio frequency spectrum (LTE-U). The wireless communication system 100 may deploy an eCC in a shared radio frequency spectrum band. A shared radio frequency spectrum band may be licensed or unlicensed and may be shared among a number of different operators.

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The base stations 105 may include a base station eCC control information component 140. The base station eCC control information component 140 may be used for sending or receiving control information related to eCC communications over a PCell. The control information may include, for example, a DL/UL ACK/NACK, CSI, or a DL/UL grant. In other examples, other types of control information may be communicated using the PCell.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include UL transmissions from a UE 115 to a base station 105, and/or DL transmissions, from a base station 105 to a UE 115. The DL transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, and the like. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

The UEs 115 may include a UE eCC control information component 145. The UE eCC control information component 145 may be used for sending or receiving control information related to SCell eCC communications over a PCell. The control information may include, for example, a DL/UL ACK/NACK, CSI, or a DL/UL grant. In other examples, other types of control information may be communicated using the PCell.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

A carrier used for the DL may be referred to as a DL eCC, and a carrier used for the UL may be referred to as an UL eCC. A UE 115 may be configured with multiple DL eCCs and one or more UL eCCs for CA. Multi-layer base stations 105 may be configured to support communications with UEs over multiple eCCs on the DL or UL. Thus, a UE 115 may receive data and control information on one or more DL eCCs from one bases station 105 or from multiple base stations 105 (e.g., single or multi-layer base stations). The UE 115 may transmit data and control information on one or more UL eCCs to one or more base stations 105. CA may be used with both FDD and TDD component carriers.

A UE 115 may communicate with a single base station 105 utilizing multiple carriers, and may also communicate with multiple base stations simultaneously on different carriers. Each cell of a base station 105 may include a DL CC, a TDD UL-DL CC, or a DL CC and an UL CC. The coverage area 110 of each serving cell for a base station 105 may be different (e.g., CCs on different frequency bands may experience different path loss). In some examples, one carrier is designated as the primary carrier, or PCC, for a UE 115, which may be served by a PCell. The PCell may serve as the RRC connection interface for the UE 115. Certain uplink control information (UCI), e.g., ACK/NACK, channel quality indicator (CQI), and scheduling information transmitted on PUCCH, may be carried by the PCell. Additional carriers may be designated as secondary carriers, or secondary component carriers (SCC), which may be served by SCells. Secondary cells may be semi-statically configured on a per-UE basis. In some cases, secondary cells may not include or be configured to transmit the same control information as the primary cell.

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and PUSCH for user data.

HARQ may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a NACK indicating a failed attempt to decode the information.

A base station 105 may insert periodic pilot symbols such as cell-specific reference signals (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signal (DMRS) may be directed toward specific UEs 115 and may be transmitted only on resource blocks assigned to those UEs115. DMRS may include signals on 6 resource elements in each resource block in which they are transmitted. In some cases, two sets of DMRS may be transmitted in adjoining resource elements. In some cases, additional reference signals known as channel state information reference signals (CSI-RS) may be included to aid in generating CSI. On the UL, a UE 115 may transmit a combination of periodic sounding reference signal (SRS) and UL DMRS for link adaptation and demodulation, respectively.

For TDD frame structures, each subframe may carry UL or DL traffic, and special subframes ("S") may be used to switch between DL to UL transmission. Allocation of UL and DL subframes within radio frames may be symmetric or asymmetric and may be reconfigured semi-statically (e.g., via backhaul messaging over S1 and/or X2 interfaces, etc.). Special subframes may carry some DL and/or UL traffic and may include a Guard Period (GP) between DL and UL traffic. Special subframes generally are not used for PUCCH transmissions. Switching from UL to DL traffic may be achieved by setting timing advance at the UEs without the use of Special subframes or a guard period between UL and DL subframes. UL-DL configurations with switch-point periodicity equal to the frame period (e.g., 10 ms) or half of the frame period (e.g., 5 ms) may be supported. For example, TDD frames may include one or more Special frames, and the period between Special frames may determine the TDD DL-to-UL switch-point periodicity for the frame.

For LTE/LTE-A, seven different UL-DL configurations are defined that provide between 40% and 90% DL subframes as illustrated in Table 1.

TABLE 1

| UL-DL Configuration | Period (ms) | \multicolumn{10}{c}{TDD UL-DL Configurations Subframe} |||||||||||
|---|---|---|---|---|---|---|---|---|---|---|---|
| | | 0 | 1 | 2 | 3 | 4 | 5 | 6 | 7 | 8 | 9 |
| 0 | 5 | D | S | U | U | U | D | S | U | U | U |
| 1 | 5 | D | S | U | U | D | D | S | U | U | D |
| 2 | 5 | D | S | U | D | D | D | S | U | D | D |
| 3 | 10 | D | S | U | U | U | D | D | D | D | D |
| 4 | 10 | D | S | U | U | D | D | D | D | D | D |
| 5 | 10 | D | S | U | D | D | D | D | D | D | D |
| 6 | 5 | D | S | U | U | U | D | S | U | U | D |

As indicated in Table 1, there are two switching periodicities, 5 ms and 10 ms. For configurations with 5 ms switching periodicities, there are two special subframes per frame, and for configurations with 10 ms switching periodicities there is one special subframe per frame. Some of these configurations are symmetric, having the same number of uplink and downlink slots, while some are asymmetric, having different numbers of uplink and downlink slots. For example, UL-DL configuration 1 is symmetric, with four uplink and four downlink subframes, UL-DL configuration 5 favors downlink throughput, and UL-DL configuration 0 favors uplink throughput.

In some cases, wireless communications system 100 may utilize one or more eCCs. An eCC may be characterized by one or more features including: short symbol duration, wide tone spacing, short subframe duration, operation in contention-based spectrum, wide bandwidth, flexible bandwidth, and variable length TTIs. In some cases, an eCC may be associated with a carrier aggregation configuration or a dual connectivity configuration (i.e., when multiple serving cells have a suboptimal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that are not configured for monitoring the whole bandwidth or preferentially use a limited bandwidth (e.g., to conserve power). ECCs may be configured for standalone operation (e.g., in a single carrier operation or as a primary carrier in a CA configuration, etc.) or may be non-standalone, in some cases. For example, where an eCC operates in an unlicensed or shared spectrum region, the eCC may be used as a secondary CC in a CA configuration.

Figure 2A:
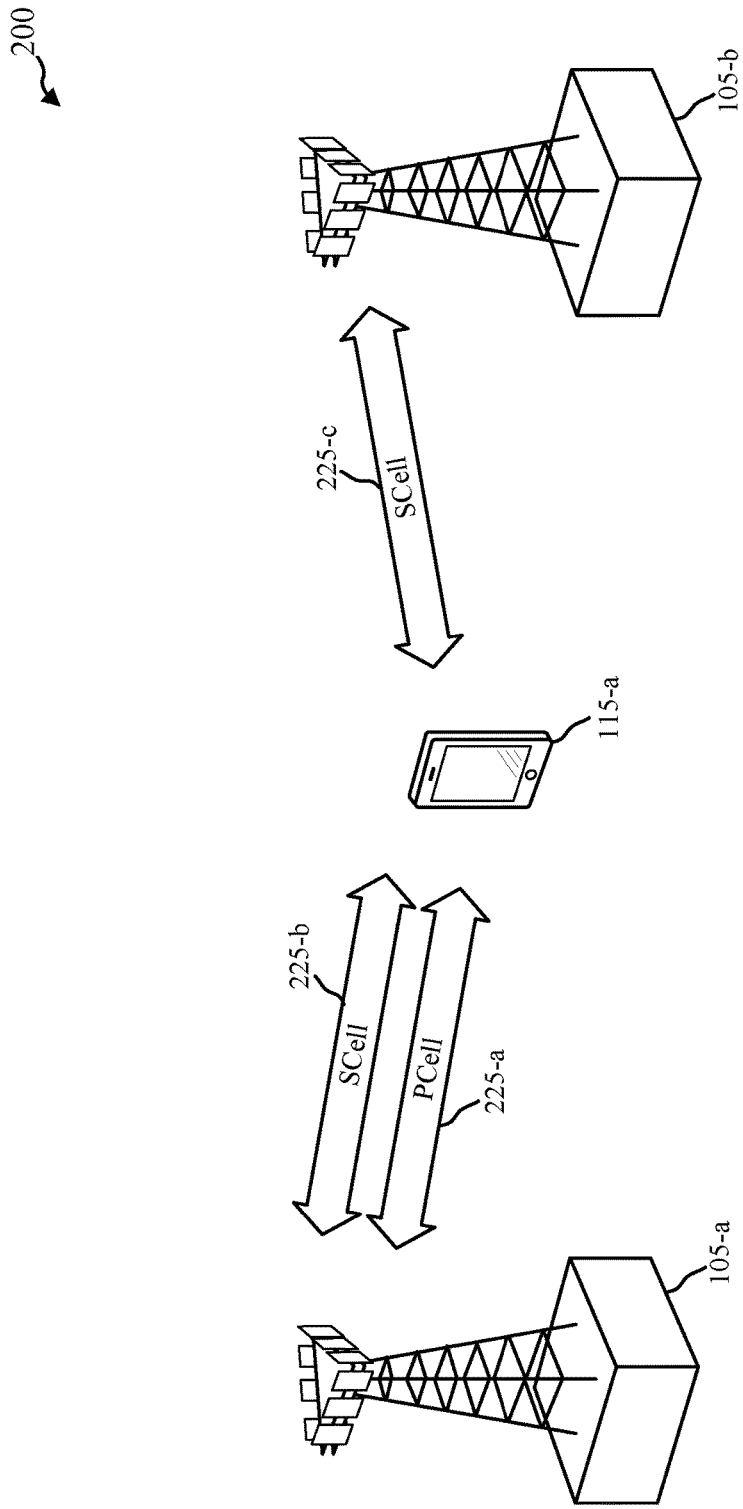
FIG. 2A shows a diagram of a system employing carrier aggregation, in accordance with various aspects of the present disclosure.

FIG. 2A shows a system 200 employing CA in accordance with various embodiments. The system 200 may illustrate aspects of the wireless communication system 100. The system 200 includes base stations 105-a and 105-b that may be examples of aspects of the base station 105 described with reference to FIG. 1. The system 200 also includes a UE 115-a that may be an example of aspects of the UE 115 described with reference to FIG. 1. In other examples, the system 200 includes other numbers of base stations 105 and UEs 115.

The base stations 105 may use one or more component carriers 225 ($CC_1$-$CC_N$) to communicate with UE 115-a. The base stations 105 can transmit information to the UE 115-a over forward (DL) channels on the component carriers 225. In addition, the UEs 115 can transmit information to the base stations 105 over reverse (UL) channels on the component carriers 225. In describing the various entities of FIG. 2, as well as other figures associated with some of the disclosed embodiments, for the purposes of explanation, the nomenclature associated with a 3GPP LTE or LTE-A wireless network is used. However, it is to be appreciated that the system 200 can operate in other networks such as, but not limited to, an OFDMA wireless network, a CDMA network, a 3GPP2 CDMA2000 network, etc. as long as the network supports eCC capabilities. One or more of the component carriers $CC_1$-$CC_N$ 225 can be in the same frequency operating band (intra-band) or in different operating bands (inter-band) and intra-band CCs can be contiguous or non-contiguous within the operating band. Furthermore, one or more of the component carriers $eCC_1$-$eCC_N$ 225 can be in the an unlicensed radio frequency spectrum band or a licensed radio frequency spectrum band. The radio frequency spectrum band may be shared among different operators. Furthermore, one or more of the component carriers 225 may be an enhanced component carrier.

In the system 200, the UE 115-a may be configured with multiple CCs 225 associated with one or more base stations 105, such as the base stations 105-a and 105-b. One CC is designated as the primary CC or PCell for the UE 115-a. The PCells 225 may be semi-statically configured by higher layers (e.g., RRC, etc.) on a per-UE basis. One or more of the other SCells 225 may be eCCs. Certain control information (e.g., ACK/NACK, CSI, DL/UL grants, scheduling requests (SR), etc.) related to data transmission on eCC, may be carried by the PCell 225-a. The UE 115-a may be configured with asymmetric DL-to-UL CC assignments. In some examples, the PCell is a legacy LTE carrier and at least one of the SCells is an eCC. In other examples, both the PCell and the SCell is an eCC.

In the example illustrated in FIG. 2A, the UE 115-a is configured with a PCell 225-a and an SCell 225-b associated with the base station 105-a and an SCell 325-c associated with the base station 105-b. The SCells 225-b and 225-c are enhanced component carriers. For illustration purposes, the PCell 225-a is a legacy component carrier, although this may differ in other examples. The system 200 may be configured to support CA using various combinations of FDD or TDD eCCs 225. For example, some configurations of system 200 may support CA for FDD eCCs (e.g., an FDD PCell and one or more FDD SCells). Other configurations may support CA using TDD CCs (e.g., a TDD PCell and one or more TDD SCells). In some examples, the TDD SCells for CA have the same DL/UL configuration while other examples support TDD CA with eCCs of different DL/UL configurations.

In some embodiments, the system 200 may support TDD-FDD joint operation, including CA and other types of joint operation (e.g., dual-connectivity when the base stations 105 of the multiple eCCs configured for the UE 115-a have non-ideal backhaul capabilities and schedule their transmissions separately, etc.). TDD-FDD joint operation may allow the UE 115-a supporting FDD and TDD CA operation to access both FDD and TDD eCCs using CA or in single eCC mode. In addition, legacy UEs with various capabilities (e.g., single mode UEs, FDD CA capable UEs, TDD CA capable UEs, etc.), may connect to FDD or TDD carriers of system 200.

The base station 105-a and the UE 115-a may send control information related to SCell eCC feedback over the PCell 225-a. The UE 115-a may send UL control information related to SCell eCC data transmission to the base station 105-a over the PCell 225-a. The base station 105-a may send DL control information related to SCell eCC data transmission to the UE 115-a over the PCell 225-a. In some examples, the base station 105-a sends DL control information meant for the UE 115-a as well as other UEs, such as a block ACK/NACK, over the PCell 225-a.

Figure 2B:
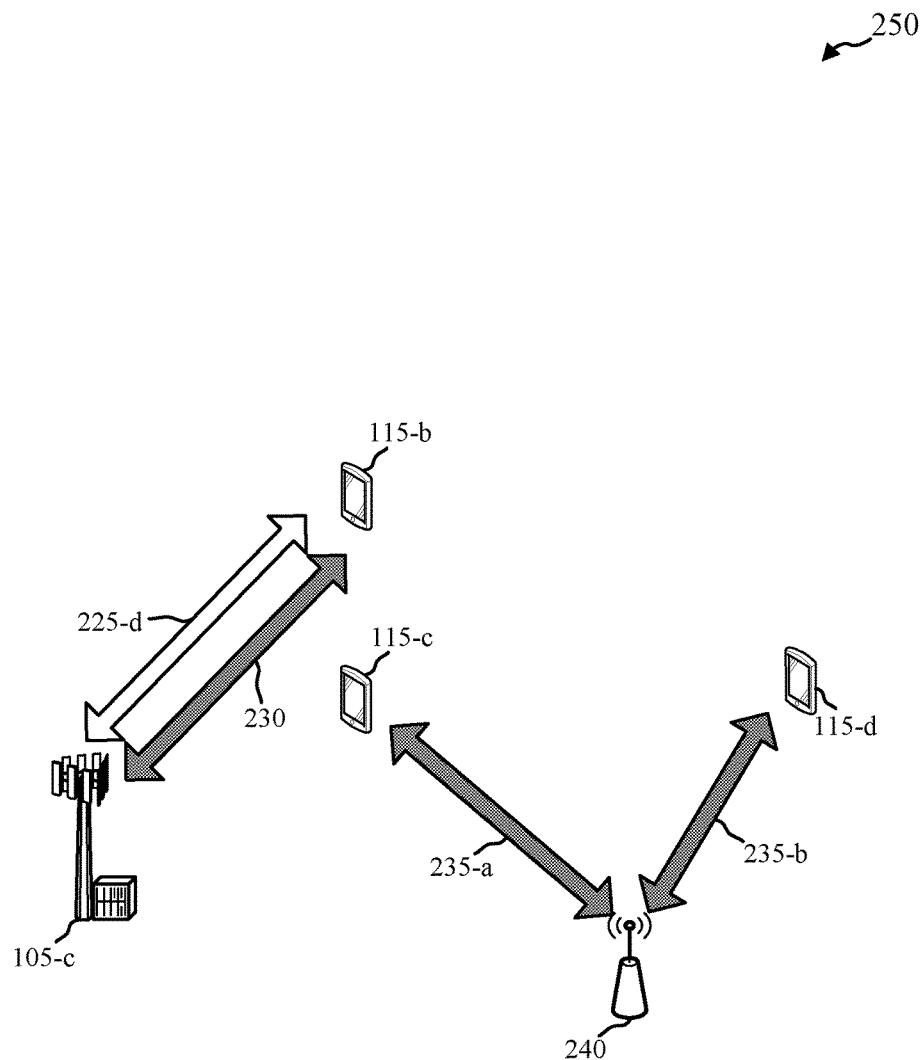
FIG. 2B illustrates an example communications environment utilizing one or more enhanced component carriers (eCCs) in accordance with various aspects of the disclosure.

FIG. 2B illustrates an example communications environment 250 utilizing one or more eCCs in accordance with various aspects of the disclosure. Communications environment 250 may illustrate, for example, aspects of wireless communications system 100 of FIG. 1 or system 200 of FIG. 2A. Communications environment 250 may include an eNB 105-c in communication with a UE 115-b via a PCell 225-d. The UE 115-b may be capable of multi-carrier operation, and the eNB 105-c may configure an SCell 230 for the UE 115-b. SCell 230 may be an eCC in a frequency band that is unlicensed or shared spectrum.

In some cases, eCC 230 may utilize a variable TTI length and symbol duration. In some cases eCC 230 may include multiple hierarchical layers associated with the different TTI lengths. For example, TTIs at one hierarchical layer may correspond uniform 1 ms subframes, whereas in a second layer, variable length TTIs may correspond to bursts of short duration symbol periods. In some cases, a shorter symbol duration may also be associated with increased subcarrier spacing. eCC 230 may be synchronized to PCell 225-d such that TTIs for eCC 230 fall on predictable boundaries (e.g., frame, subframe, etc.) the PCell. Alternatively, TTIs for eCC 230 may be asynchronous with respect to the PCell.

An eCC may also include modified or additional HARQ related control information. Data transmissions over the eCC may be performed using a modified data channel (e.g., eCC 230 may utilize an enhanced PDSCH (ePDSCH) format). A downlink grant (e.g., via a PDCCH or ePDCCH, etc.) for the eCC 230 may be associated with one transport block (e.g., one ePDSCH), which may include one or more code blocks (e.g., blocks that are separately encoded for HARQ).

Other operators may also use the unlicensed or shared spectrum. For example, FIG. 2B illustrates an access point 240 (e.g., LTE eNB, Wi-Fi access point, etc.) that is communicating with UEs 115-c and 115-d over wireless links 235-a and 235-b, respectively. The wireless links 235 may also use the same unlicensed or shared spectrum used by the eCC 230.

Because eCC 230 is using unlicensed or shared spectrum, the medium may not be available at particular times for providing feedback (e.g., HARQ, CSI, etc.). For example, the medium may be preempted by a higher priority operator (e.g., an operator associated with access point 240, etc.) or a collision may occur on the medium for a scheduled CSI or HARQ feedback transmission. Therefore, providing reliable feedback for an eCC using unlicensed or shared spectrum provides challenges.

In embodiments, the different aspects of wireless communication system 100, such as the eNBs 105 and UEs 115, may be configured to provide feedback (e.g., CSI, HARQ, etc.) for a non-standalone eCC via a PCell. HARQ feedback for an eCC may include ACK/NACK information for each code block transmitted on the eCC. The ACK/NACK information may be transmitted on an uplink control channel or data channel of the PCell in a feedback subframe of the PCell determined based on a subframe of the PCell for which the transmission on the eCC completed. For an FDD PCell, the feedback subframe may be determined based on a fixed offset from the transmission subframe. For a TDD PCell, the feedback subframe may be the first available uplink subframe after a fixed offset.

HARQ feedback for the eCC may be provided using a control channel (e.g., PUCCH, etc.) of the PCell, and may use a new or existing PUCCH format (e.g., PUCCH format 3, etc.). Where the number of bits for block ACK/NACK of code blocks received on the eCC in a feedback subframe exceeds the capacity of the PUCCH format, spatial bundling or bundling of code blocks within a transport block (e.g., ePDSCH) may be performed. In some embodiments, downlink grants associated with transmissions received on the eCC may include index information to resolve ACK/NACK mapping ambiguity within reported HARQ feedback. Additionally or alternatively, multiple PUCCH transmissions (e.g., one per transport block, etc.) may be sent on the PCell in the feedback subframe.

In some embodiments, an uplink data channel (e.g., PUSCH, etc.) of the PCell may be used for transmission of HARQ feedback for an eCC when the uplink data channel has a scheduled data transmission in a feedback subframe for the eCC. The block ACK/NACK feedback for code blocks received on the eCC may be sent in the PUSCH transmission without bundling. The PUSCH may be used for HARQ feedback for the eCC even when the UE is configured for simultaneous PUSCH/PUCCH transmission. For example, other CSI or HARQ feedback may be transmitted on the PUCCH while HARQ feedback for the eCC is transmitted using the PUSCH.

In some embodiments, CSI feedback for the eCC can be sent on the PCell. For example, the eCC may be configured to report periodic CSI feedback and may report the periodic CSI feedback on the PUCCH or PUSCH (if a data transmission is being sent during the CSI feedback subframe) of the PCell. Aperiodic CSI can be triggered by a grant on the PCell or by a grant on the eCC. In some cases, aperiodic CSI is transmitted on the cell that triggers the aperiodic CSI report. Alternatively, aperiodic CSI may be transmitted on the PCell regardless of which cell triggers the aperiodic CSI report.

Figure 3:
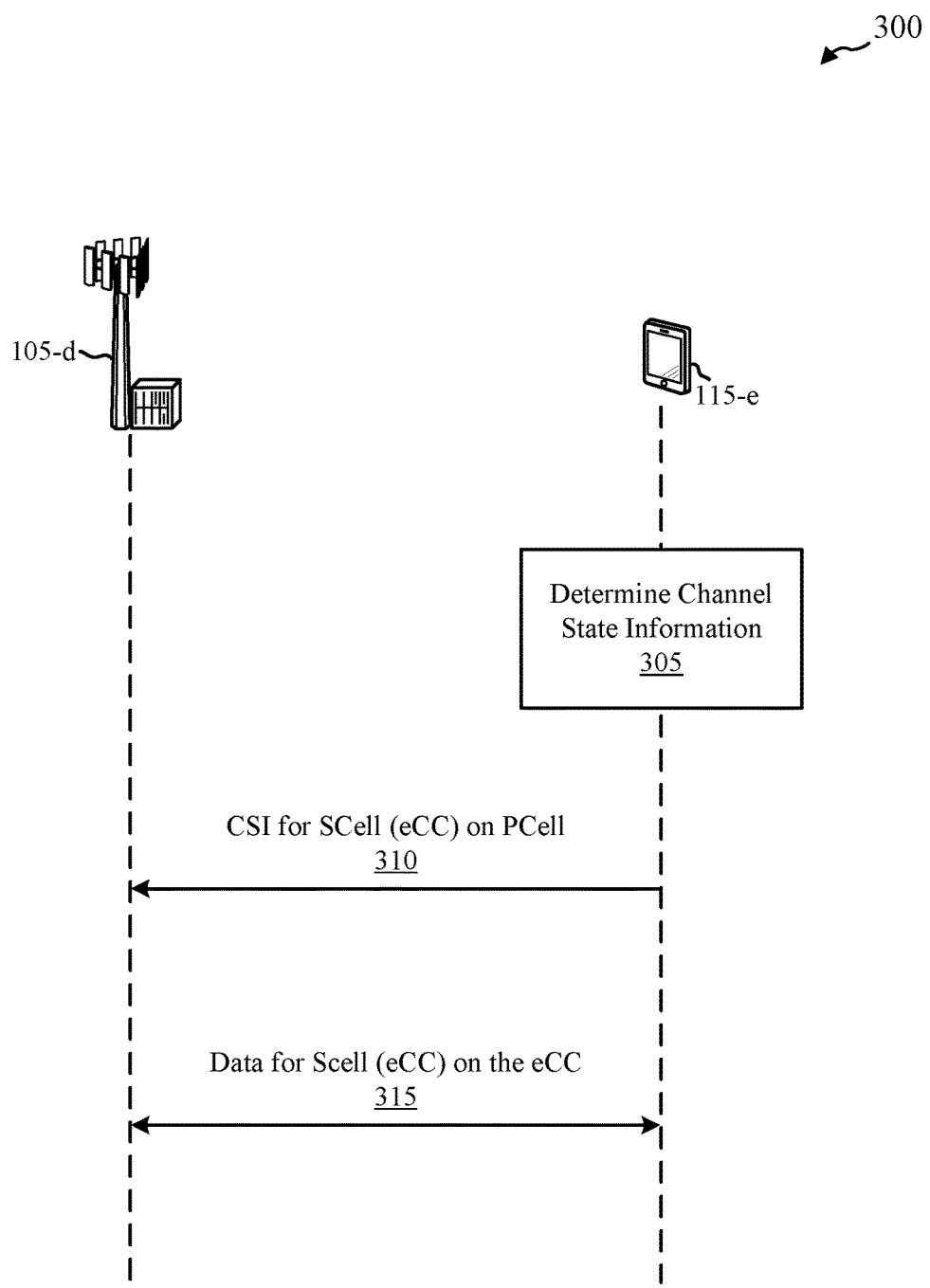
FIG. 3 shows a flow diagram illustrating an example eCC channel state information (CSI) communication over a primary carrier (PCell) in a wireless communication system, in accordance with various aspects of the present disclosure.

FIG. 3 shows a flow diagram 300 illustrating an example eCC CSI communication over a PCell in a wireless communication system, in accordance with various aspects of the present disclosure. In this example, a UE 115-e measures the CSI of the SCell and sends the CSI information to a base station 105-d over the PCell. The UE 115-e may be an example of one or more aspects of the UEs 115 described with reference to FIGS. 1, 2A, and 2B. Similarly, the base station 105-d may be an example of one or more aspects of the base stations 105 described with reference to FIGS. 1, 2A, and 2B. The PCell may be an example of one or more aspects of the PCell 225 described with reference to FIGS. 2A and 2B.

The UE 115-e may determine CSI feedback for the SCell at block 305. The CSI feedback may be eCC DL channel quality information that the UE 115-e reports to the base station 105-d. The UE 115-e may send this control information for the SCell, namely the CSI, to the base station 105-d using a PCell at message 310. In some examples, the UE 115-e sends the eCC CSI feedback through a PUCCH of the PCell. In other examples, the UE 115-e sends the eCC CSI feedback through a PUSCH of the PCell.

There are several advantages to sending the control information over the PCell instead of the SCell. By sending the CSI over the PCell, the UE 115-e avoids sending traffic over the SCell and causing the SCell to be busy. The UE 115-e may send the CSI over the PCell as a short and isolated burst of traffic. If this CSI traffic were sent on the SCell, especially on an unlicensed or shared channel, the SCell would be busy during that time and may cause other UEs 115 that are using the same SCell to back-off. Sending CSI data over the SCell may also be inefficient due to medium access. Thus, by using the PCell, the UE 115-e uses the SCell bandwidth more efficiently. In other examples, the base station 105-d and the UE 115-e may send other types of control information over the PCell.

The base station 105-d and the UE 115-e may exchange data for the SCell (which is an eCC) on the eCC in messages 315. For example, the base station 105-d may send DL eCC data to the UE 115-e and the UE 115-e may send UL eCC data to the base station 105-d.

Figure 4:
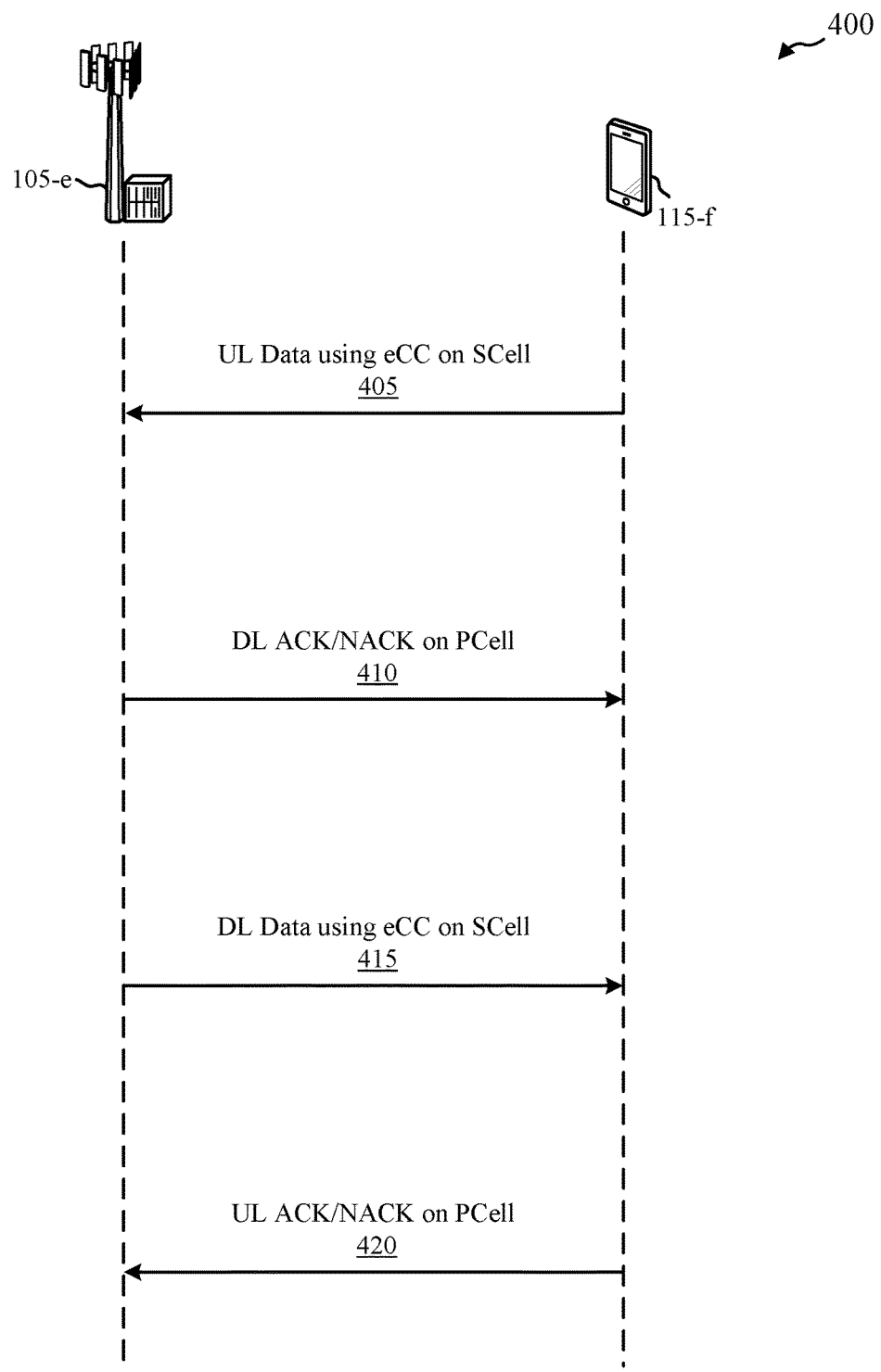
FIG. 4 shows a flow diagram illustrating example eCC acknowledgement/negative-acknowledgement (ACK/NACK) communications over a PCell in a wireless communication system, in accordance with various aspects of the present disclosure.

FIG. 4 shows a flow diagram 400 illustrating example eCC ACK/NACK communications over a PCell in a wireless communication system, in accordance with various aspects of the present disclosure. In this example, a base station 105-e and a UE 115-f exchange ACK/NACK messages over the PCell. The UE 115-f may be an example of one or more aspects of the UEs 115 described with reference to FIGS. 1-3. Similarly, the base station 105-e may be an example of one or more aspects of the base stations 105 described with reference to FIGS. 1-3. The PCell may be an example of one or more aspects of the PCell 225 described with reference to FIGS. 2A and 2B.

In this example, the may UE 115-f send UL data 405 to the base station 105-e using the SCell. The UL data 405 may be sent over the eCC PUSCH using the SCell. Based on whether the base station 105-e received all of the UL data 405 correctly, the base station 105-e sends a return DL ACK/NACK message 410 over the PCell. For example, the base station 105-e may send an ACK message as the DL ACK/NACK message 410 when the base station 105-e wants to acknowledge it received the UL data 405. In examples where the base station 105-e determines it did not receive the UL data 405 correctly or completely, the base station 105-e may send a NACK message as the DL ACK/NACK message 410. The base station 105-e may send the DL ACK/NACK 410 a PHICH of the PCell, an ePHICH of the PCell, a PDSCH of the PCell, or combinations thereof.

Likewise, the UE 115-f may send an UL ACK/NACK message 420 in response to the base station 105-b sending eCC DL data 415 sent over the SCell. The DL data 415 may be sent over the eCC PDSCH using the SCell. Based on whether the UE 115-f received all of the DL data 415 correctly, the UE 115-f sends a return UL ACK/NACK message 420 over the PCell. For example, the UE 115-f may send an ACK message as the UL ACK/NACK message 420 when the UE 115-f wants to acknowledge it received the DL data 415. In examples where the UE 115-f determines it did not receive the DL data 415 correctly or completely, the UE 115-f may send a NACK message as the UL ACK/NACK message 420. The UE 115-f may send the UL ACK/NACK 420 through a the PUCCH or the PUSCH of the PCell.

In some examples, ACK/NACK information from multiple DL/UL data may be may be grouped into a block ACK/NACK. Blocking may reduce the amount of information to be sent over the PCell and may therefore increase the efficiency of ACK/NACK feedback. The information acknowledged using the block ACK/NACK may be from multiple users. For example, the DL ACK/NACK 410 that corresponds to eCC UL data 405 may be a block ACK/NACK 410 that may contain ACK/NACK bits intended for one or more UEs 115. That is, the DL ACK/NACK 410 may acknowledge or negative-acknowledge UL data from two or more UEs 115. In such examples, the base station 105-e may broadcast the DL ACK/NACK 410 over the PCell.

In some examples, each UL data 405 or DL data 415 may require multiple ACK/NACK bits for each transport block. For example, the base station 105-e and the UE 115-f may send an ACK/NACK message 410 and 420 for each code-block of data, respectively.

A TTI may be shorter in eCC communications than a TTI in legacy LTE. Because the TTI may be shorter, multiple UL data messages 405 over the SCell may be aggregated into the DL ACK/NACK message 410 as a single feedback block. Similarly, multiple DL data messages 415 over the SCell may be aggregated into the UL ACK/NACK message 420 as a single feedback block.

Using the PCell to communicate ACK/NACK information instead of using the SCell may provide the same benefits as discussed above with respect to the transmission of CSI over the PCell.

Figure 5:
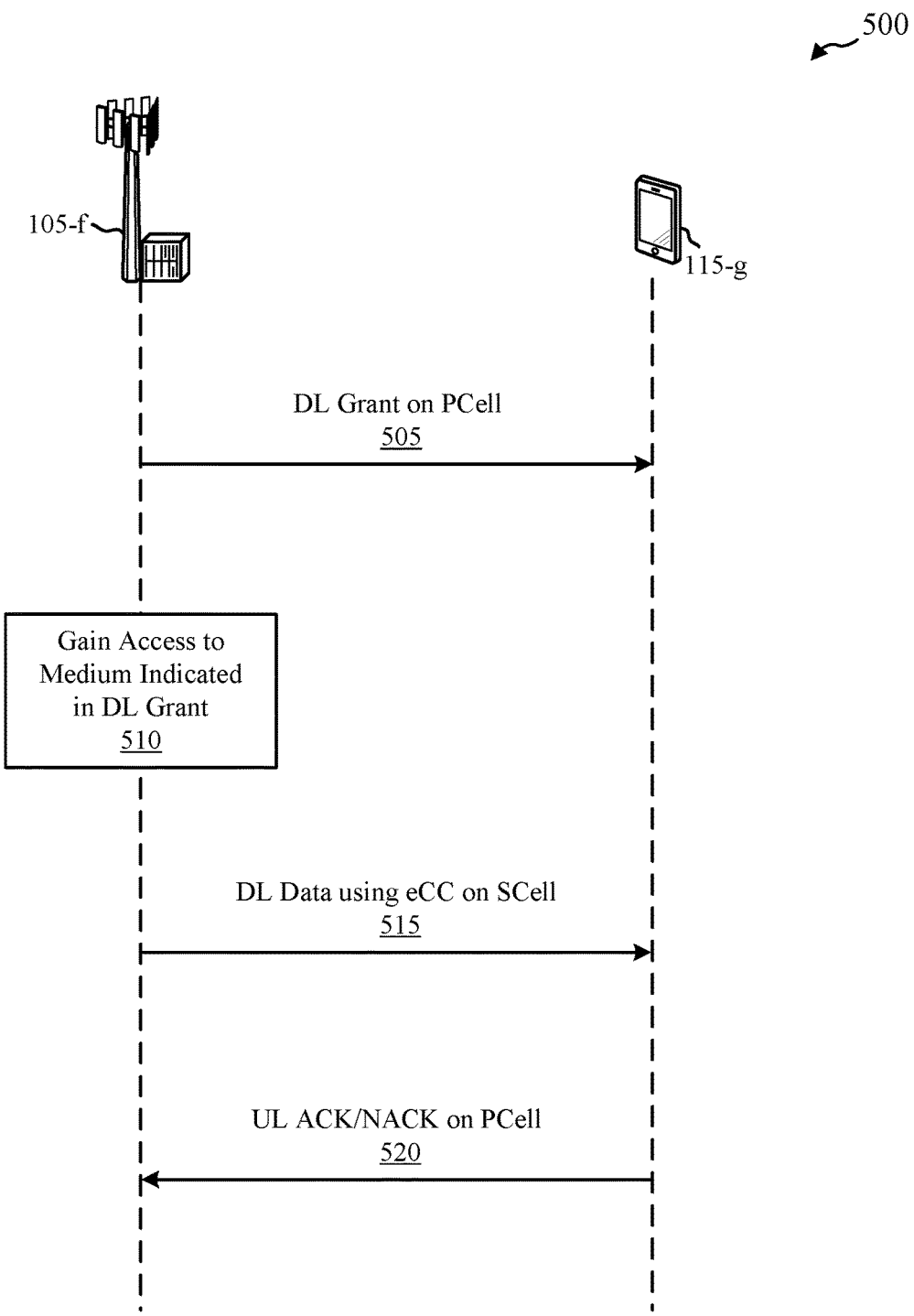
FIG. 5 shows a flow diagram illustrating an example downlink (DL) grant communication over a PCell in a wireless communication system, in accordance with various aspects of the present disclosure.

FIG. 5 shows a flow diagram 500 illustrating an example DL grant communication over a PCell in a wireless communication system, in accordance with various aspects of the present disclosure. In this example, a base station 105-*f* sends a UE 115-*g* a DL grant 505 over a PCell. The base station 105-*f* may be an example of one or more aspects of the base stations 105 described with reference to FIGS. 1-4. The UE 115-*g* may be an example of one or more aspects of the UEs 115 described with reference to FIGS. 1-4. The PCell may be an example of one or more aspects of the PCell 225 described with reference to FIGS. 2A and 2B.

In this example, the base station 105-*e* may send a DL grant 505 on the PCell to the UE 115-*g*. The DL grant 505 may indicate that the base station 105-*e* is prepared to send DL data on an eCC PDSCH of an SCell to the UE 115-*g*. The DL grant 505 may identify a resource (e.g., a time or frequency resource) where the DL data may be potentially sent.

After sending the DL grant 505 over the PCell, the base station 105-*f* may attempt to gain access to a medium indicated by the resources identified in the DL grant 505 at block 510. If the base station 105-*f* gains access to the medium in the resources, then the base station 105-*f* transmits the DL data 515 using eCC on the SCell over the medium. If the base station 105-*f* fails to gain access to a medium indicated by the resources identified in the DL grant 505 in time, the base station 105-*f* refrains from transmitting the DL data.

In some examples, the DL grant 505 may identify multiple resources. The DL grant 505 may identify several different times and frequency resources for sending the DL data. If the base station 105-*f* fails to gain access to the medium in one of the resources, then the base station 105-*f* does not transmit the DL data 515.

Alternatively, the DL grant 505 may indicate a time duration during which the DL grant 505 is valid. If the base station 105-*f* gains access to the medium during the time the DL grant 505 is valid, then the base station 105-*f* transmits the DL data 515 over eCC on the SCell. If the base station 105-*f* fails to gain access to the medium during the time the DL grant 505 is valid, then the base station 105-*f* does not transmit the DL data 515.

As a further alternative, the base station 105-*f* may not send the DL grant 505 to the UE 115-*g* over the PCell until after the base station 105-*f* has gained access to the medium. This option may ensure that the base station 105-*f* will be able to send the DL data 515 to the UE 115-*g*.

The UE 115-*g* may send an UL ACK/NACK 520 on the PCell in response to the DL data 515.

Figure 6:
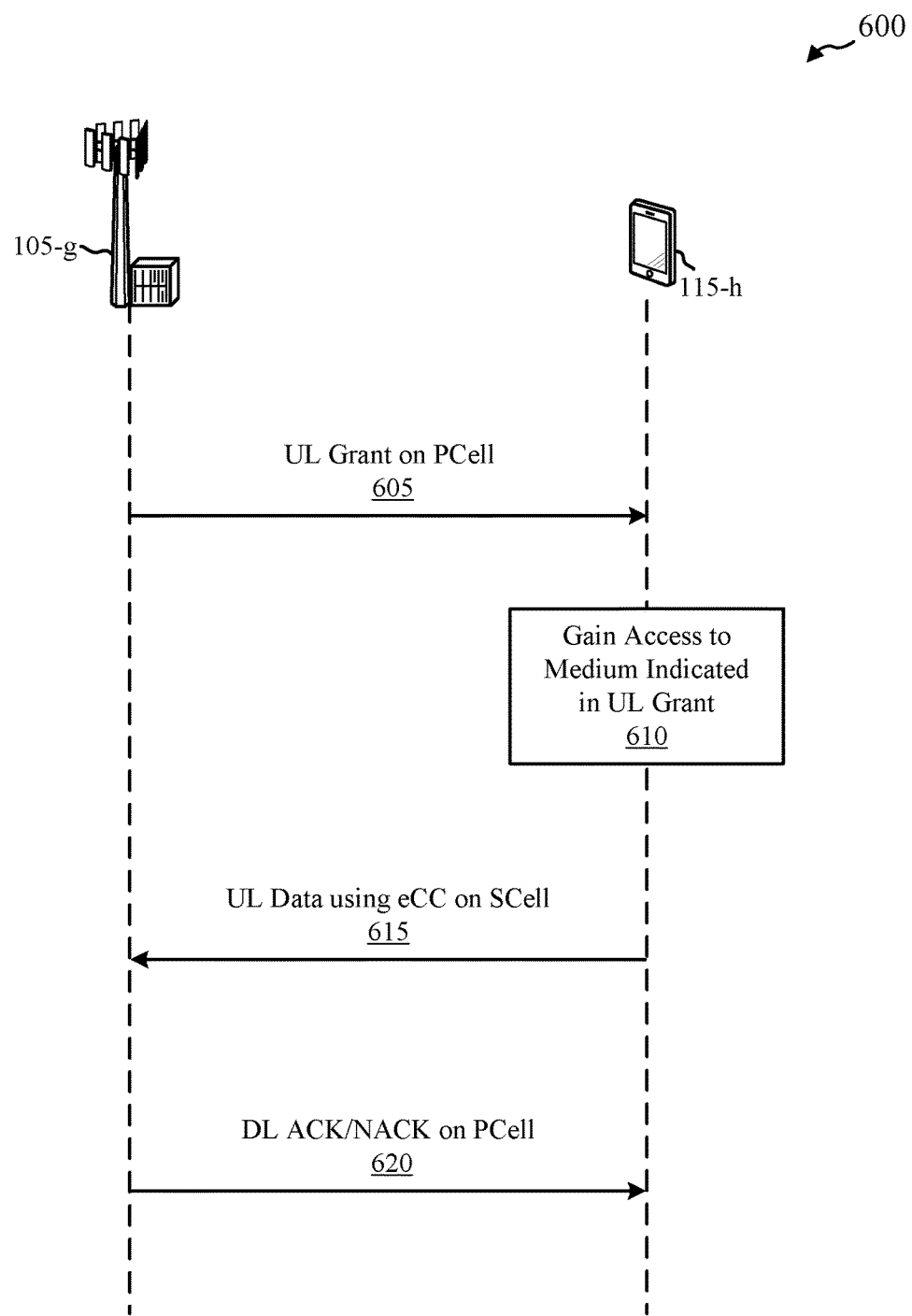
FIG. 6 shows a flow diagram illustrating an example uplink (UL) grant communication over a PCell in a wireless communication system, in accordance with various aspects of the present disclosure.

FIG. 6 shows a flow diagram 600 illustrating an example UL grant communication over a PCell in a wireless communication system, in accordance with various aspects of the present disclosure. In this example, a UE 115-*h* sends a base station 105-*g* an UL grant 605 over a PCell. The UE 115-*h* may be an example of one or more aspects of the UEs 115 described with reference to FIGS. 1-5. The base station 105-*g* may be an example of one or more aspects of the base stations 105 described with reference to FIGS. 1-5. The PCell may be an example of one or more aspects of the PCell 225 described with reference to FIGS. 2A and 2B.

The UE 115-*h* may receive the UL grant 605 on the PCell from the base station 105-*g*. The UL grant 605 may indicate to the UE 115-*h* what resources the UE 115-*h* may use to send UL data to the base station 105-*g*. The UL grant 605 may request UL data transmission on the eCC. The UL grant 605 may identify resources (e.g., several times or frequency resources) where the UL data may be potentially sent.

After receiving the UL grant 605 over the PCell, the UE 115-*h* may attempt to gain access to a medium indicated by the resources identified in the UL grant 605 at block 610. The resources identified in the UL grant 605 may include a time and a frequency resource. If the UE 115-*h* gains access to the medium in the resources, then the UE 115-*h* transmits UL data 615 using eCC on the SCell over the medium to the base station 105-*g*. If the UE 115-*h* fails to gain access to the medium indicated by the resources identified in the UL grant 605 in time, the UE 115-*h* refrains from transmitting the UL data.

The UL grant 605 may identify multiple resources. For example, the UL grant 605 may identify several different times and frequency resources that may be used for the transmission of UL data 615. If the UE 115-*h* fails to gain access to the medium in one of the resources, then the UE 115-*h* does not transmit the DL data 515. If the UE 115-*h* gains access to the medium in one of the resources, the UE 115-*h* sends the UL data 615.

Alternatively, the UL grant 605 may indicate a time duration during which the UL grant 605 is valid. If the UE 115-*h* gains access to the medium during the time the UL grant 605 is valid, then the UE 115-*h* transmits the UL data 615 over eCC on the SCell. If the UE 115-*h* fails to gain access to the medium during the time the UL grant 605 is valid, then the UE 115-*h* does not transmit the UL data 615.

The base station 105-*g* may send a DL ACK/NACK 620 on the PCell in response to the UL data 615.

Figure 7:
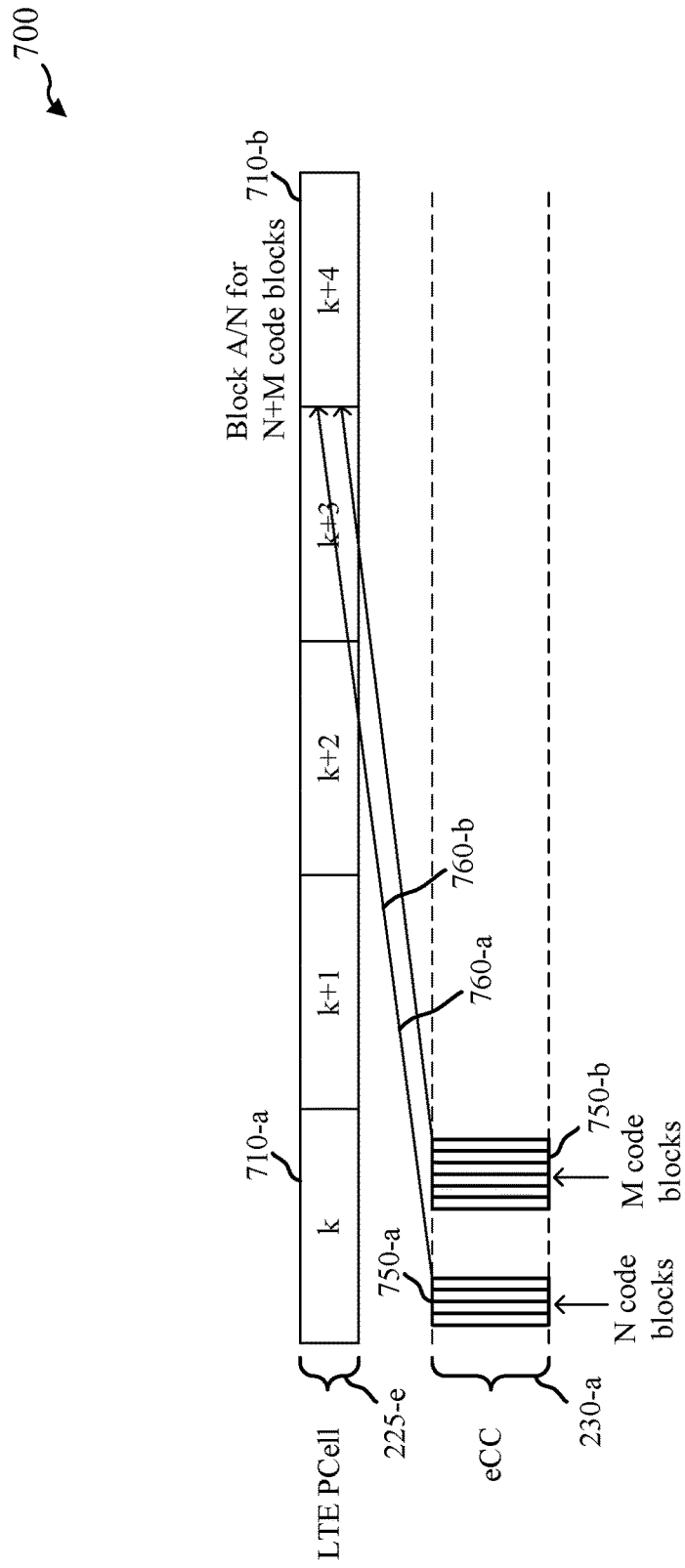
FIG. 7 shows a timing diagram illustrating hybrid automatic repeat request (HARQ) feedback provided via a Long Term Evolution (LTE) PCell for an eCC configured as a secondary component carrier (CC) in accordance with various aspects of the disclosure.

FIG. 7 shows a timing diagram 700 illustrating HARQ feedback provided via an LTE PCell for an eCC configured as a secondary CC (e.g., SCell, etc.) in accordance with various aspects of the disclosure. Timing diagram 700 illustrates HARQ feedback for an eCC 230-*a* provided on an LTE PCell CC 225-*e*. The LTE PCell CC 225-*e* and eCC 230-*a* may be, for example, the LTE PCell 225 and eCC 230 of FIGS. 2A and 2B, respectively.

During PCell subframe 710-*a*, the UE 115 may receive one or more code blocks via transmissions on the eCC 230-*a*, where each code block is separately encoded (e.g., turbo coded, convolutional coded, etc.). In timing diagram 700, the UE 115 receives a first transmission 750-*a* including N code blocks and a second transmission 750-*b* including M code blocks.

The UE 115 may identify a feedback subframe 710-*b* for providing HARQ feedback for transmissions that completed during subframe 710-*a*. For an FDD PCell, feedback subframe 710-*b* may be identified using a fixed offset from subframe 710-*a*. For example, where k is the subframe 710-*a* during which the transmissions on the eCC completed, subframe 710-*b* may be identified as subframe k+$n_{ECC}$. For transmissions received via LTE CCs (e.g., the LTE PCell or other CCs using LTE frame structures), feedback may be provided at subframe k+4. However, because eCCs may have a shorter symbol duration and generally lower latency than LTE frame structures, HARQ feedback for an eCC may be provided with a lower offset such as $n_{ECC}=2$ or $n_{ECC}=3$. The offset $n_{ECC}$ may be dependent on characteristics (e.g., symbol duration, TTI duration, etc.) of the eCC, which may be configured at the time the eCC is configured for the UE 115.

The UE 115 may transmit block ACK/NACK information for the transmissions 750-*a* and 750-*b* in subframe 710-*b*. For example, the UE 115 may transmit a one-bit ACK/

NACK value for each code block of transmissions 750-*a* and 750-*b*. Thus, the UE 115 may transmit N+M bits of ACK/NACK information in subframe 710-*b*. The UE 115 may send the block ACK/NACK information in a control channel transmission (e.g., PUCCH). For example, the UE 115 may transmit the block ACK/NACK information using PUCCH format 3, which may carry up to 20 HARQ ACK/NACK bits.

For a TDD PCell, feedback subframe 710-*b* may be identified as the first available uplink subframe after a fixed offset from subframe 710-*a*. For example, where k is the subframe 710-*a* during which the transmissions on the eCC completed, subframe 710-*b* may be identified as the first available subframe k' satisfying k'≥k+$n_{ECC}$.

Figure 8:
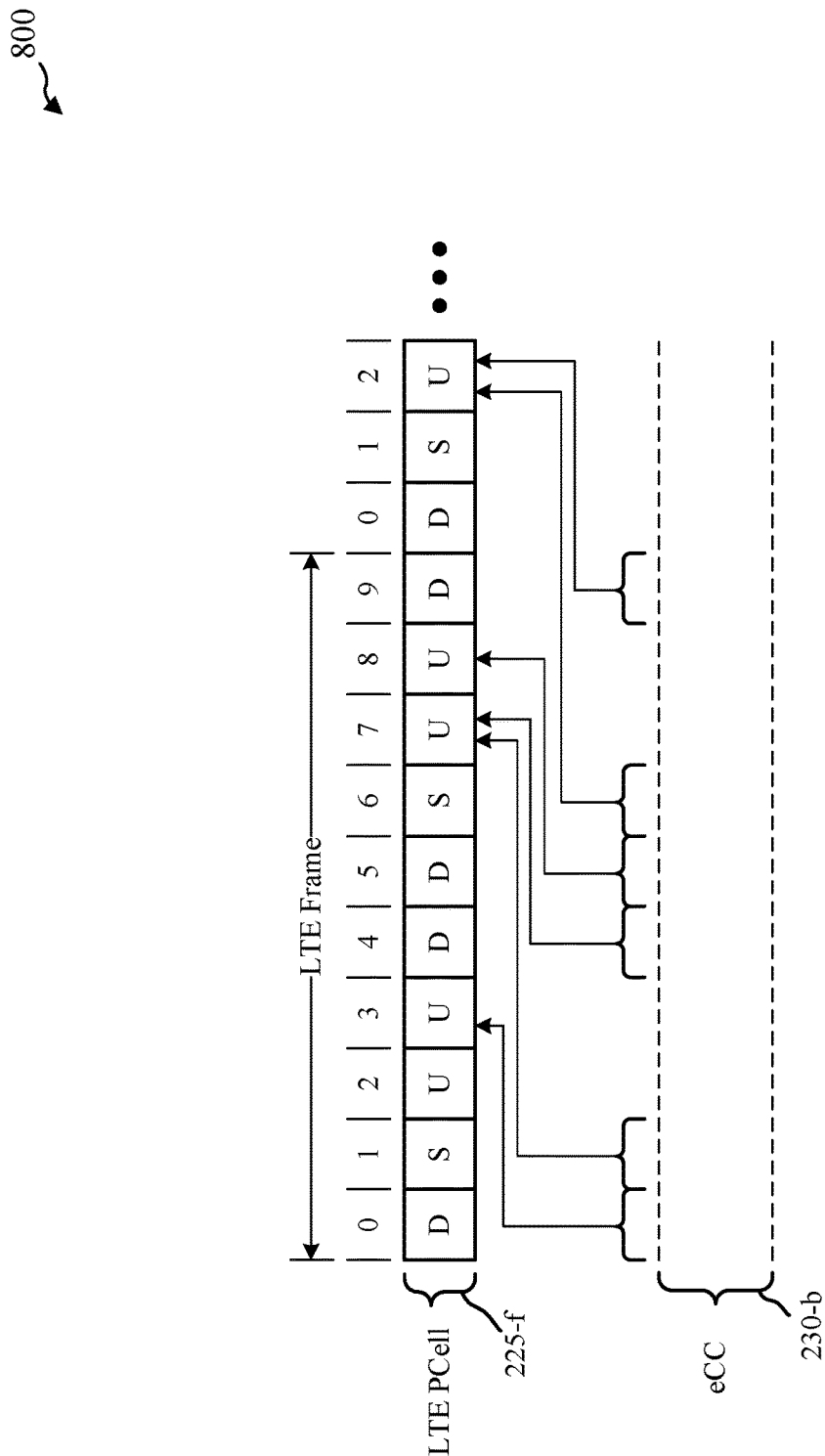
FIG. 8 shows a timing diagram illustrating HARQ feedback provided via a LTE time division duplex (TDD) PCell for an eCC configured as a secondary CC in accordance with various aspects of the disclosure.

FIG. 8 shows a timing diagram 800 illustrating HARQ feedback provided via a LTE TDD PCell for an eCC configured as a secondary CC (e.g., SCell, etc.) in accordance with various aspects of the disclosure. Timing diagram 800 illustrates HARQ feedback for an eCC 230-*b* provided on a LTE TDD PCell CC 225-*f*. The LTE TDD PCell CC 225-*f* and eCC 230-*b* may be, for example, the LTE PCell 225 and eCC 230 of FIGS. 2A and 2B, respectively.

Timing diagram 800 illustrates HARQ timing for eCC 230-*b* where the LTE TDD PCell 225-*f* is configured in TDD UL-DL configuration 1 and $n_{ECC}$=3. Thus, HARQ feedback for transmission received via the eCC 230-*b* may be sent in the first available subframe k' satisfying k'≥k+3. For example, transmissions received via the eCC 230-*b* that completed in LTE subframe 0 may be sent in uplink subframe 3 while transmissions received in LTE subframe 1 may be sent in uplink subframe 7.

In some cases, block ACK/NACK feedback for an eCC may exceed the capacity of an uplink control channel of the LTE PCell. For example, a single PUCCH format 3 can carry up to 20 HARQ feedback bits. If the number of ACK/NACK bits exceeds the capacity of the PUCCH payload, bundling may be performed to reduce the number of bits to be transmitted. Spatial bundling may be performed first, and if the number of bits still exceeds the capacity of the control channel, code block bundling may be performed.

Figure 9:
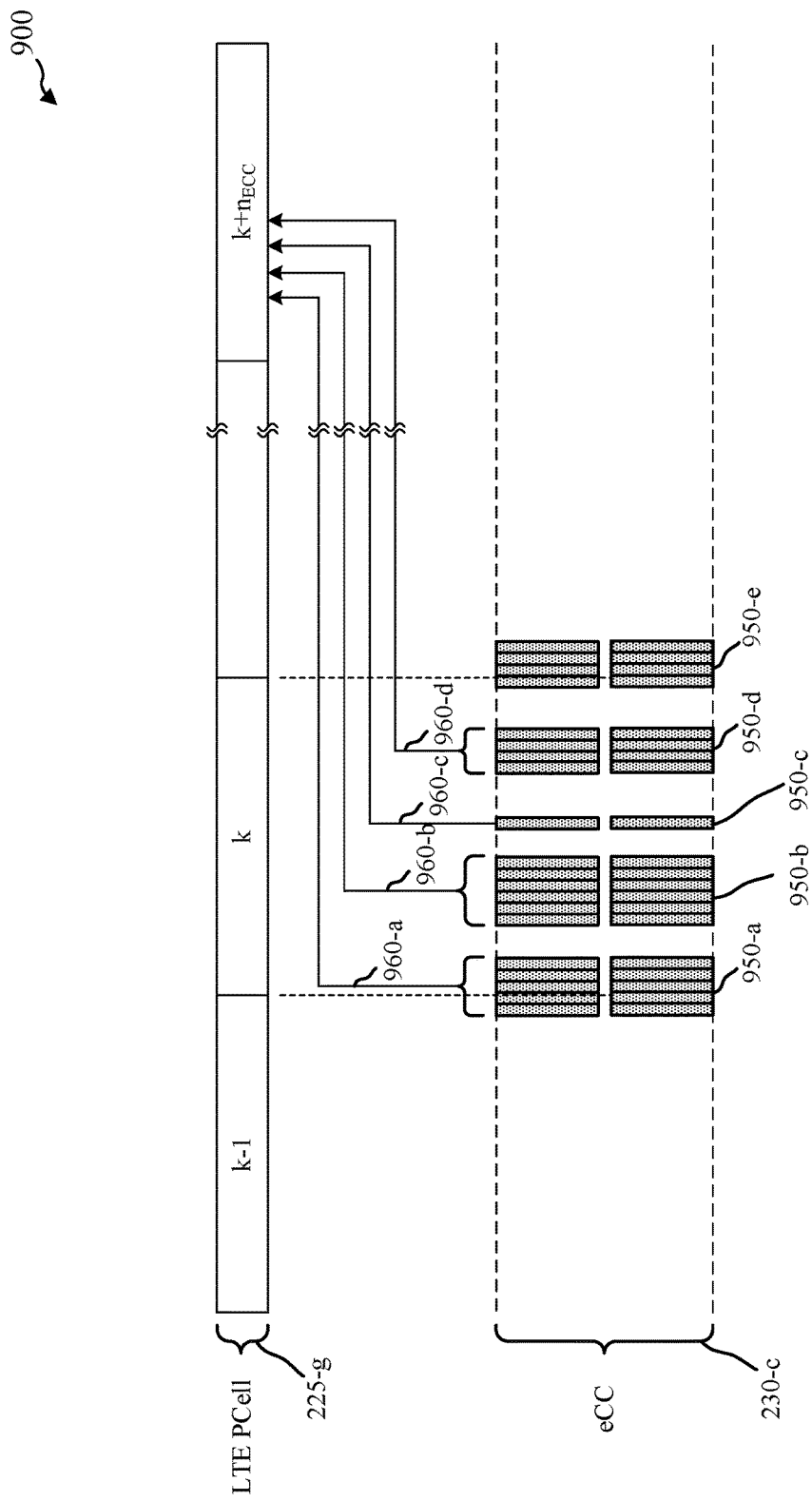
FIG. 9 shows a timing diagram illustrating HARQ feedback provided via an LTE PCell for an eCC configured as a secondary CC in accordance with various aspects of the disclosure.

FIG. 9 shows a timing diagram 900 illustrating HARQ feedback provided via an LTE PCell for an eCC configured as a secondary CC (e.g., SCell, etc.) in accordance with various aspects of the disclosure. Timing diagram 900 illustrates HARQ feedback for an eCC 230-*c* provided on a LTE PCell CC 225-*g*. The LTE PCell CC 225-*g* and eCC 230-*c* may be, for example, the LTE PCell 225 and eCC 230 of FIGS. 2A and 2B, respectively.

In timing diagram 900, transmissions 950-*a*, 950-*b*, 950-*c* and 950-*d* may be received via the eCC 230-*c* and may be completed in subframe k. Each of the transmissions 950 may include one or more code blocks and may include one or more spatial streams. For example, transmission 950-*a* may include A*2 code blocks in two spatial streams, transmission 950-*b* may include B*2 code blocks in two spatial streams, transmission 950-*c* may include C*2 code blocks in two spatial streams, and transmission 950-*c* may include C*2 code blocks in two spatial streams. The UE 115 may determine that the total number of code blocks received via the eCC 230-*c* in subframe k exceeds the capacity of the uplink control channel (e.g., exceeds the 20 bits than can be carried by PUCCH format 3, etc.).

The UE 115 may first perform spatial bundling to reduce the number of ACK/NACK bits to be transmitted in subframe k+$n_{ECC}$. For example, the UE 115 may logically AND ACK/NACK information from the two spatial streams to result in a total of A+B+C+D ACK/NACK bits. If A+B+C+D is less than or equal to the capacity of the uplink control channel, the UE 115 may feedback the spatially bundled ACK/NACK information in subframe k+$n_{ECC}$. For example, ACK/NACK information 960-*a*, 960-*b*, 960-*c*, and 960-*d* may include A, B, C, and D bits of ACK/NACK information, respectively, and may be jointly coded in a control channel transmission in subframe k+$n_{ECC}$.

If, after spatial bundling, the total number of ACK/NACK bits (e.g., A+B+C+D, etc.) still exceeds the capacity of the uplink control channel, the UE 115 may perform code block bundling of the block ACK/NACK information. For example, a single bit of ACK/NACK information 960-*a* may be determined based on an AND operation of the block ACK/NACK information for the A*2 code blocks received in transmission 950-*a*. Similarly, a single bit of ACK/NACK information 960-*b*, 960-*c*, and 960-*d* may be generated for transmissions 950-*b*, 950-*c*, and 950-*d*. The UE may send the N+M bits via the uplink control channel for the LTE PCell 225-*g* in subframe k+$n_{ECC}$ (or in the first available uplink subframe after k+$n_{ECC}$ for an LTE TDD PCell. Transmission 950-*e*, while started in subframe k, may not complete until subframe k+1, and therefore HARQ feedback for transmission 950-*e* may be provided in a different feedback subframe (e.g., subframe k+1+$n_{ECC}$, etc.).

In some embodiments, downlink grants associated with transmissions received on the eCC may include index information to resolve ACK/NACK mapping ambiguity within reported HARQ feedback. For example, the downlink grants for each transmission 950 may provide an index associated with the downlink grant (e.g., transport block index) or an index for each code block of the transmission associated with the grant (e.g., code block index). If a downlink grant is not received by the UE 115, the UE 115 may detect the loss of the downlink grant by a gap in the received indexes. The downlink index information may be implicitly or explicitly indicated in the HARQ feedback. For example, code block indexing may use implicit index information, where the order of code block ACK/NACK bits follows the code block index information. The UE may feedback NACK bits for each code block of a transmission for which the downlink grant is lost. When transport block indexing is used, the UE may include explicit indications of which grant the ACK/NACK feedback information corresponds to. For example, the grant index may be a fixed number of bits (e.g., 2, 3, 4, etc.), and each set of ACK/NACK bits for a given grant in the HARQ feedback may be preceded by the corresponding grant index. Thus, the UE 115 may transmit HARQ feedback for transport blocks received with out-of-order indexes, and the eNB 105 can determine that a grant was lost if the HARQ feedback information for the grant is missing.

Figure 10:
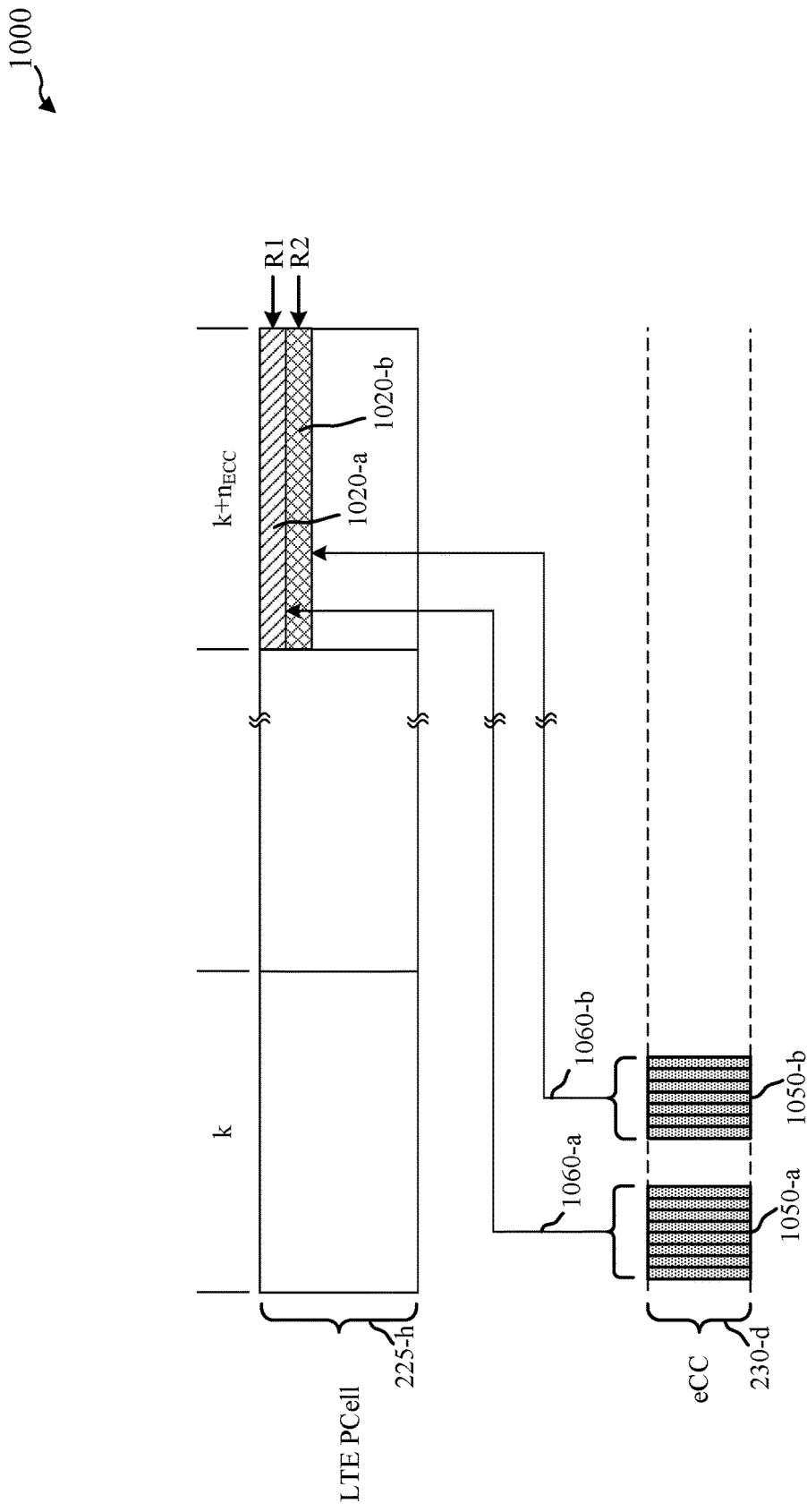
FIG. 10 shows a timing diagram illustrating HARQ feedback provided via an LTE PCell for an eCC configured as a secondary CC in accordance with various aspects of the disclosure.

In some embodiments, multiple uplink control channel resources may be configured, and HARQ feedback for an eCC may be provided using multiple control channel transmissions in the same subframe. FIG. 10 shows a timing diagram 1000 illustrating HARQ feedback provided via an LTE PCell for an eCC configured as a secondary CC (e.g., SCell, etc.) in accordance with various aspects of the disclosure. Timing diagram 1000 illustrates HARQ feedback for an eCC 230-*d* provided on a LTE PCell CC 225-*h*. The LTE PCell CC 225-*h* and eCC 230-*d* may be, for example, the LTE PCell 225 and eCC 230 of FIGS. 2A and 2B, respectively.

In timing diagram 1000, transmissions 1050-*a* and 1050-*b* may be received via the eCC 230-*d* and may be completed in subframe k. Each of the transmissions 1050 may include one or more code blocks and may include one or more spatial streams. For example, transmission 1050-a may include N code blocks in S spatial streams and transmission 1050-b may include M code blocks in S spatial streams.

The UE 115 may be configured with multiple uplink control channel resources for reporting HARQ feedback for secondary CCs. For example, the UE 115 may be configured (e.g., via RRC signaling, etc.) with uplink control channel resource R1 1020-a and uplink control channel resource R2 1020-b. The multiple uplink control channel resources may be associated with a particular PUCCH format. For example, the UE 115 may be configured with multiple $n_{PUCCH}^{(3)}$ resources associated with PUCCH format 3.

In some embodiments, identification of which of multiple configured resources to use may be provided in the downlink grants. For example, downlink grants may indicate an HARQ uplink control channel resource index and HARQ feedback for the transmission associated with the downlink grant may be according to the specified index. In timing diagram 1000, the downlink grant for transmission 1050-a may specify an HARQ uplink control channel resource index of (1) while the downlink grant for transmission 1050-b may specify an HARQ uplink control channel resource index of (2). Thus, ACK/NACK information 1060-a for transmission 1050-a may be provided in a first uplink control channel transmission on uplink control channel resources R1 1020-a and ACK/NACK information 1060-b for transmission 1050-b may be provided in a second, separate uplink control channel transmission on uplink control channel resources R2 1020-b. Each of the first and second uplink control channel transmissions may be, for example, a separate single-carrier waveform (e.g., PUCCH format 3 transmission, etc.).

Additionally or alternatively, the uplink control channel resources using for providing HARQ feedback for the eCC 230-d may be determined based on a total number of code blocks for which HARQ feedback is provided in the feedback subframe. For example, the UE 115 may determine that the total number of code blocks for providing block ACK/NACK for transmissions received via eCC 230-d in subframe k exceeds the capacity of a single control channel transmission on the uplink control channel. The UE 115 may use the multiple configured uplink control channel resources for providing block ACK/NACK feedback for the transmissions received via eCC 230-d in subframe k. For example, the UE 115 may generate N bits of block ACK/NACK information 1060-a for transmission 1050-a and M bits of block ACK/NACK information 1060-b for transmission 1050-b. The UE 115 may jointly encode and process block ACK/NACK information 1060-a for sending in a first uplink control channel transmission on uplink control channel resources 1020-a and may jointly encode and process block ACK/NACK information 1060-b for sending in a second uplink control channel transmission on uplink control channel resources 1020-b. The UE 115 may transmit both the first and second transmissions in subframe $k+n_{ECC}$. Each of the first and second uplink control channel transmissions may be, for example, a separate single-carrier waveform (e.g., PUCCH format 3 transmission, etc.).

Uplink control channel resources 1020-a and 1020-b may illustrate logical resources (e.g., $n_{PUCCH}^3$ resources, etc.). The physical resources used for transmission may be determined from the logical resources and characteristics of the uplink carrier (e.g., carrier bandwidth, etc.). Thus, the logical resources 1020 may be mapped to physical resources, which may vary within the subframe (e.g., hopping across slots, etc.).

In some embodiments, an uplink data channel (e.g., PUSCH, etc.) may be used for providing feedback for a configured eCC whenever transmissions on the uplink data channel are scheduled. For example, a feedback subframe for providing HARQ feedback for the eCC may be determined as described above. If a PUSCH transmission is scheduled for the feedback subframe, the ACK/NACK information associated with the eCC may be multiplexed with the data transmission on the PUSCH. The full block ACK/NACK information for code blocks received via the eCC may be multiplexed with the data transmission (e.g., no bundling performed). In some cases, HARQ feedback for an eCC may be transmitted over the uplink data channel even where other HARQ feedback for other carriers is provided via the uplink control channel. For example, a UE 115 may be configured for providing simultaneous uplink control channel and data channel transmissions, and may feedback ACK/NACK information for transmissions received via the PCell (or another SCell) on the uplink control channel, while providing feedback for the eCC via the uplink data channel in the same subframe.

Figure 11:
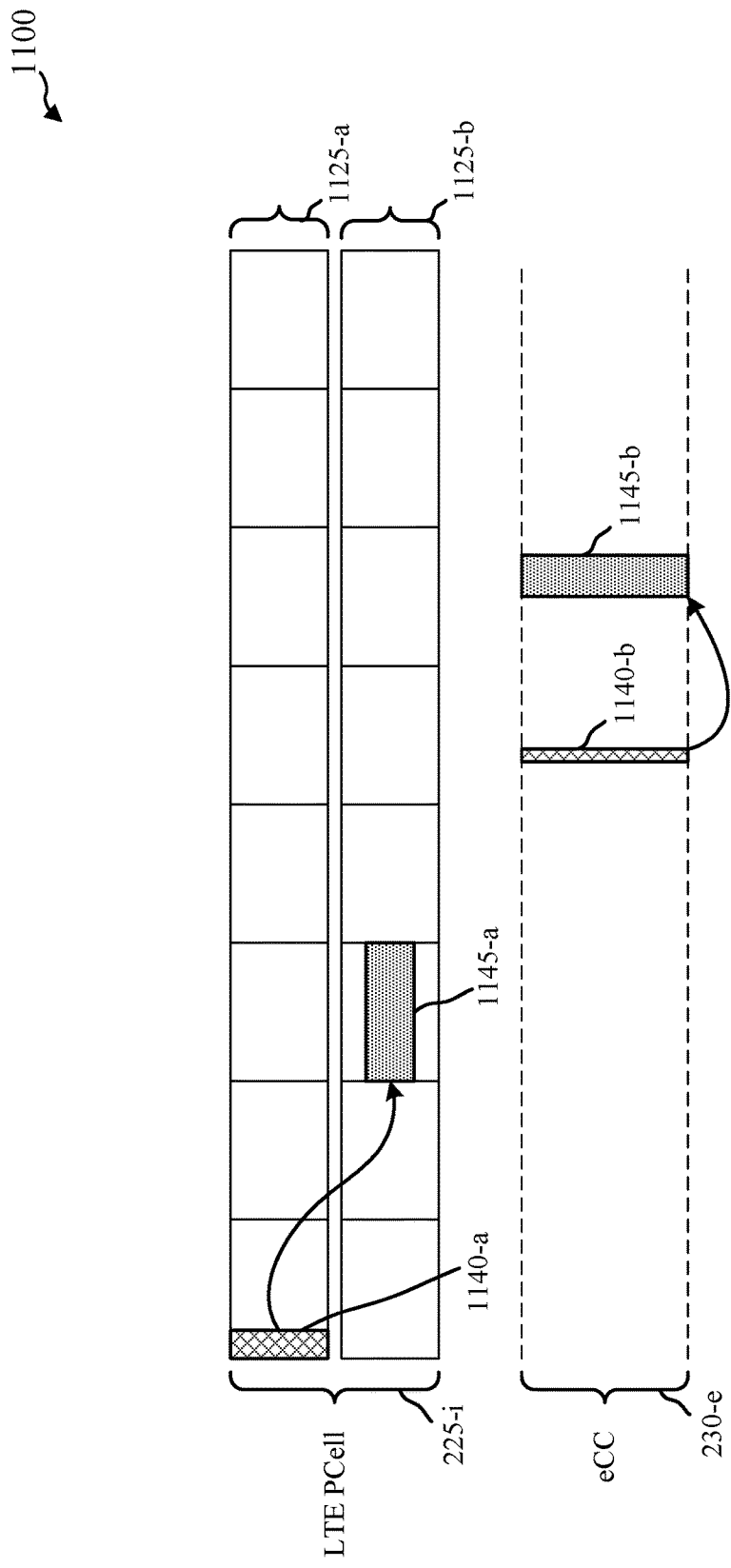
FIG. 11 shows a timing diagram illustrating CSI feedback for an eCC configured as a secondary CC in accordance with various aspects of the disclosure.

In some embodiments, aperiodic CSI can be triggered by a grant on the PCell or by a grant on the eCC. FIG. 11 shows a timing diagram 1100 illustrating CSI feedback for an eCC configured as a secondary CC (e.g., SCell, etc.) in accordance with various aspects of the disclosure. Timing diagram 1100 illustrates CSI feedback for a UE 115 configured with an LTE PCell 225-i and an eCC 230-e. The LTE PCell 225-i and eCC 230-d may be, for example, the LTE PCell 225 and eCC 230 of FIGS. 2A and 2B, respectively. The LTE PCell 225-i, as illustrated in FIG. 11, may be an FDD PCell and may include a downlink CC 1125-a and an uplink CC 1125-b. However, the LTE PCell 225-i may also be a TDD PCell, in some cases.

Aperiodic CSI for the eCC 230-e may be transmitted on the cell that triggers the aperiodic CSI report. For example, the UE 115 may receive a first aperiodic CSI trigger 1140-a (e.g., within a grant received on the PCell 225-i) and may feedback an aperiodic CSI report 1145-a on the PCell 225-i. The UE 115 may receive a second aperiodic CSI trigger 1140-b (e.g., within a grant received on the eCC 230-e) and may feedback an aperiodic CSI report 1145-b on the eCC 230-b. Alternatively, aperiodic CSI may be transmitted on the PCell 225-i regardless of which cell triggers the aperiodic CSI report.

Figure 12:
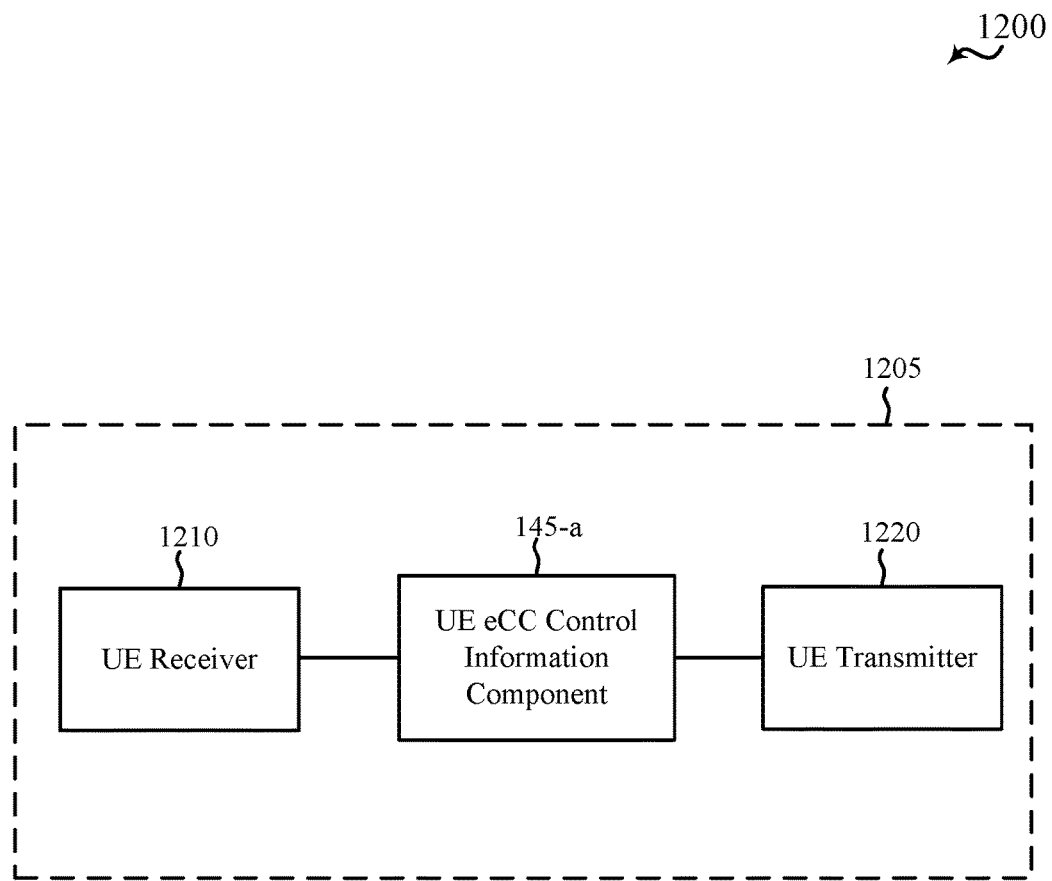
FIG. 12 shows a block diagram of a device configured for use in wireless communication, in accordance with various aspects of the present disclosure.

FIG. 12 shows a block diagram 1200 of a device 1205 for use in wireless communication, in accordance with various aspects of the present disclosure. The device 1205 may be an example of one or more aspects of a UE 115 described with reference to FIGS. 1-11. The device 1205 may include a UE receiver 1210, a UE eCC control information component 145-a, and/or a UE transmitter 1220. The device 1205 may also be or include a processor. Each of these components may be in communication with each other.

The components of the device 1205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The UE receiver 1210 may receive information such as packets, user data, and/or control information associated with various information channels (e.g., control channels, data channels, information related to HARQ and CSI feedback for non-standalone enhanced component carriers, etc.). The UE receiver 1210 may be configured to receive DL data over an SCell of an eCC communication. The UE receiver 1210 may also be configured to receive DL control information over a PCell of the eCC communication. The control information may be DL ACK/NACK, CSI, DL grants, UL grants, or other types of control information. Information may be passed on to the UE eCC control information component 145-a, and to other components of the device 1205. In some examples, the receiver 1210 may receive a grant comprising a trigger for aperiodic CSI feedback.

The UE eCC control information component 145-a may interpret control information received by the UE receiver 1210 over the PCell. The UE eCC control information component 145-a may also determine control information to UL, such as CSI, UL ACK/NACK, or other types of control information. The UE eCC control information component 145-a formats the control information to be transmitted by the UE transmitter over the PCell. The UE eCC control information component 145-a may select an appropriate channel of the PCell to send the information, such as the PUCCH or the PUSCH of the PCell. The UE eCC control information component 145-a may select the appropriate channel based on at least in part the type of control information, channel conditions, or some other consideration. The UE eCC control information component 145-a may also identify a multi-carrier configuration comprising a PCell and an SCell, the SCell comprising an eCC, identify ACK/NACK feedback information for a plurality of code blocks received on the eCC of the SCell (e.g., one or more scheduled transport blocks, each transport block with one or more code blocks, etc.), identify a feedback subframe of the PCell for providing the ACK/NACK feedback information based at least in part on a subframe of the PCell for which transmissions of the plurality code blocks received on the eCC completed, and transmit the ACK/NACK feedback information via the PCell in the identified feedback subframe.

The UE transmitter 1220 may transmit the one or more signals received from other components of the device 1205. The UE transmitter 1220 may transmit control information from the UE eCC control information component 145-a over the PCell of the eCC communications. In some examples, the UE transmitter 1220 may be collocated with the UE receiver 1210 in a UE transceiver.

According to instructions from the UE eCC control information component 145-a, the UE transmitter 1220 may transmit the control information over the PUCCH or the PUSCH of the PCell. The transmitter 1220 may include a single antenna, or it may include a plurality of antennas. In some examples, the transmitter 1220 may transmit the ACK/NACK feedback information via the PCell in the identified feedback subframe. In some examples, transmitting the ACK/NACK feedback information includes transmitting a plurality of PUCCH transmissions using the plurality of PUCCH resources. In some examples, the transmitter 1220 may separately transmit ACK/NACK feedback information for respective transport blocks of the plurality of scheduled transport blocks for the SCell in respective ones of the plurality of PUCCH transmissions. In some examples, transmitting the ACK/NACK feedback information via the PCell in the identified feedback subframe includes transmitting the ACK/NACK feedback information using the scheduled PUSCH transmission. In some examples, the transmitter 1220 may transmit the second ACK/NACK feedback information on a PUCCH in the identified feedback subframe.

Figure 13:
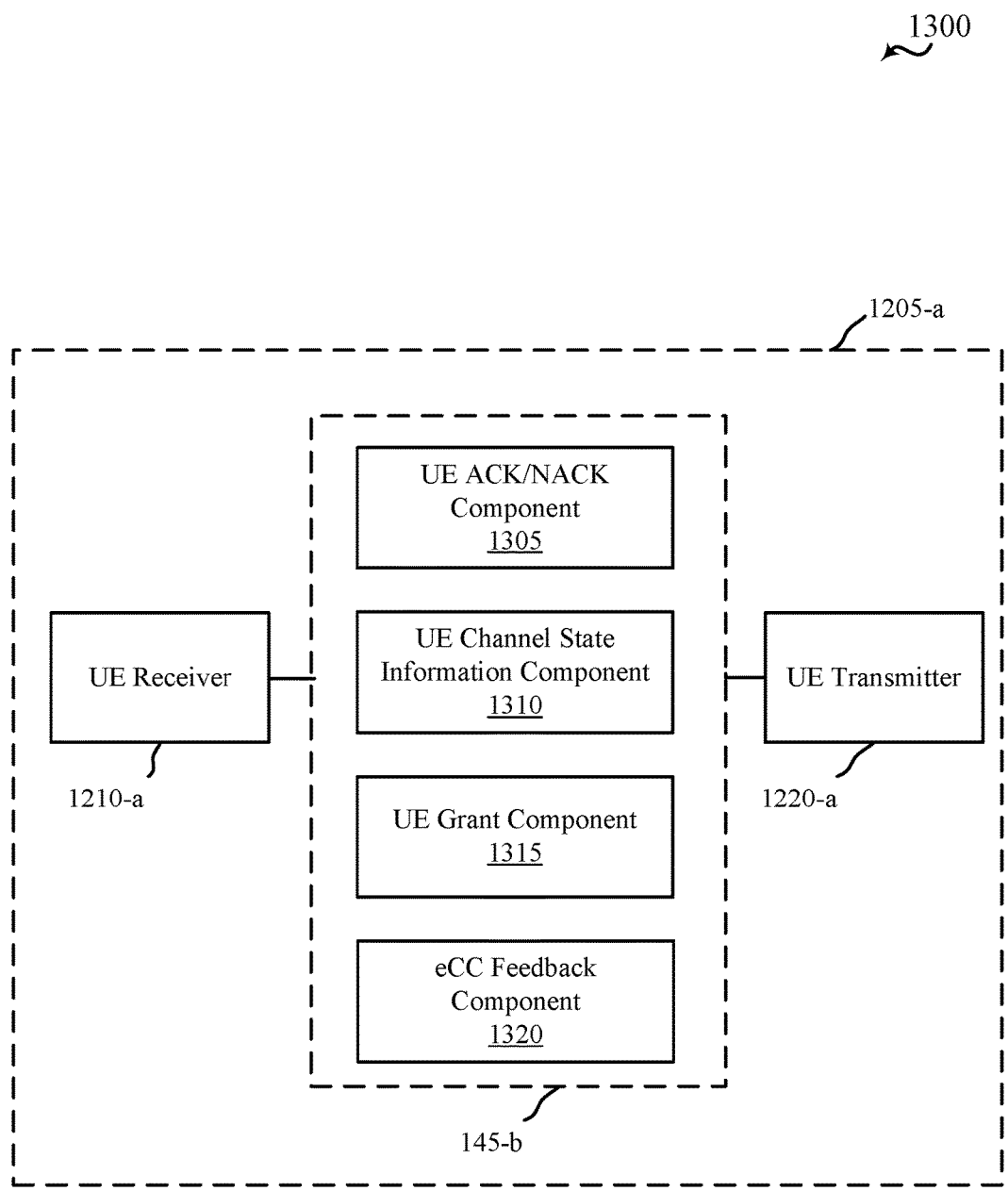
FIG. 13 shows a block diagram of a device configured for use in wireless communication, in accordance with various aspects of the present disclosure.

FIG. 13 shows a block diagram 1300 of a device 1205-a for use in wireless communication, in accordance with various examples. The device 1205-a may be an example of one or more aspects of a UE 115 described with reference to FIGS. 1-11. It may also be an example of a device 1205 described with reference to FIG. 12. The device 1205-a may include a UE receiver 1210-a, a UE eCC control information component 145-b, or a UE transmitter 1220-a, which may be examples of the corresponding modules of device 1205. The device 1205-a may also include a processor. Each of these components may be in communication with each other. The UE eCC control information component 145-b may include a UE ACK/NACK component 1305, a UE CSI component 1310, a UE grant component 1315, and an eCC feedback component 1320. The UE receiver 1210-a and the UE transmitter 1220-a may perform the functions of the UE receiver 1210 and the UE transmitter 1220, of FIG. 12, respectively.

The UE ACK/NACK component 1305 may determine acknowledgment or negative-acknowledgement messages to UL based on DL data sent from a base station, such as a base station 105. The UE ACK/NACK component 1305 may also interpret received DL ACK/NACK messages received at the UE receiver 1210-a over the PCell. For example, the UE ACK/NACK component 1305 may interpret a DL block ACK/NACK message received over the PCell that is intended for the device 1205-a as well as at least one other device. The UE ACK/NACK component 1305 may also aggregate ACK/NACKs from multiple eCC DL data into a single feedback block. Further, the UE ACK/NACK component 1305 may select the PUCCH or the PUSCH of the PCell for the UE transmitter 1220-a to transmit the UL ACK/NACK message.

The UE CSI component 1310 may determine CSI information for the SCell based on DL data received at the UE receiver 1210-a. In some examples, the UE CSI component 1310 may interpret CSI information received at the UE receiver 1210-a over the PCell. Further, the UE CSI component 1310 may select the PUCCH or the PUSCH of the PCell for the UE transmitter 1220-a to transmit the CSI feedback.

The UE grant component 1315 interprets UL grants received by the UE receiver 1210-a, indicating resources for the UE transmitter 1220-a to perform a UL data transmission on the eCC. The UL grant may indicate one or more of several transmission times, an expiration time of the UL grant, or frequency resources over a medium where the UL data may be potentially sent. In some examples, the frequency resources are on the eCC SCell.

The UE grant component 1315 also determines what action the device 1205-a is to take based on whether the device 1205-a gains access to the medium identified in the UL grant. If the device 1205-a does gain access to the medium in one of the resources, then the UE transmitter 1220-a sends the UL data. If the device 1205-a does not gain access to the medium in time, then the UL grant component 1315 instructs the UE transmitter 1220-a to refrain from transmitting the UL data or does not provide the UL data to the UE transmitter 1220-a at all.

The eCC feedback component 1320 may identify a multi-carrier configuration comprising a PCell and an SCell, the SCell comprising an eCC, identify ACK/NACK feedback information for a plurality of code blocks received on the eCC of the SCell (e.g., one or more scheduled transport blocks, each transport block with one or more code blocks, etc.), identify a feedback subframe of the PCell for providing the ACK/NACK feedback information based at least in part on a subframe of the PCell for which transmissions of the plurality code blocks received on the eCC completed, and transmit the ACK/NACK feedback information via the PCell in the identified feedback subframe. In some examples, the PCell includes a downlink primary component carrier and an FDD uplink primary component carrier. The feedback subframe may have a predetermined offset from the subframe of the PCell for which the transmissions of the one or more code blocks received on the eCC completed. In some examples, the PCell may include a TDD component carrier. The feedback subframe may be the first uplink subframe of the TDD component carrier after a predetermined offset from the subframe of the PCell for which the transmissions of the one or more code blocks received on the eCC completed.

Figure 14:
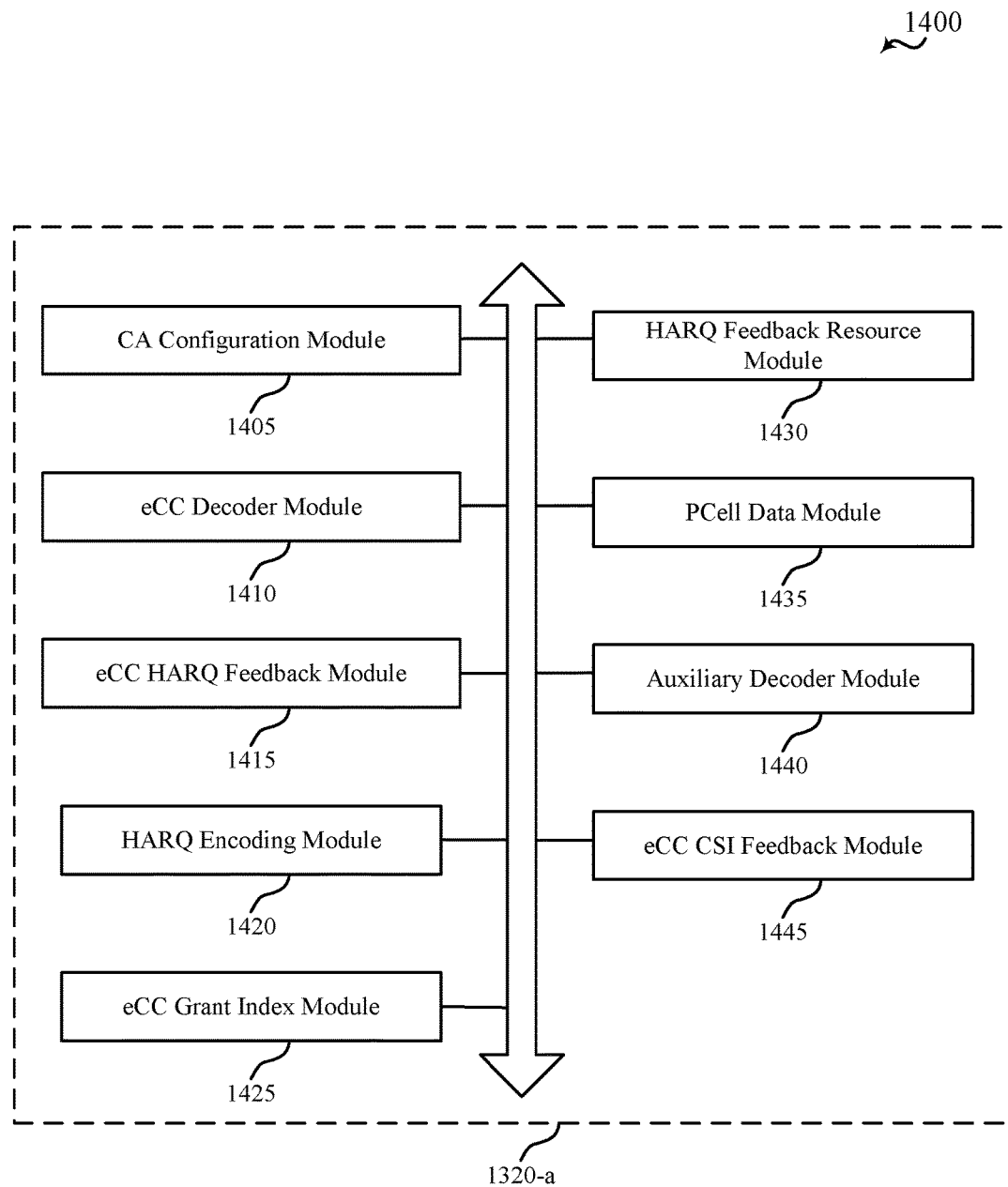
FIG. 14 shows a block diagram of an eCC feedback module configured for HARQ and CSI feedback for non-standalone enhanced component carriers in accordance with various aspects of the present disclosure.

FIG. 14 shows a block diagram 1400 of an eCC feedback component 1320-a configured for HARQ and CSI feedback for non-standalone enhanced component carriers in accordance with various aspects of the present disclosure. The eCC feedback component 1320-a may be a component of a wireless device 1205 or a wireless device 1305 of FIGS. 12-13. The eCC feedback component 1320-a may be an example of aspects of an eCC feedback component 1320 described with reference to FIG. 13. The eCC feedback component 1320-a may include a CA configuration module 1405, an eCC decoder module 1410, and an eCC HARQ feedback module 1415. The eCC feedback component 1320-a may also include a HARQ encoding module 1420, an eCC grant index module 1425, a HARQ feedback resource module 1430, a PCell data module 1435, an auxiliary decoder module 1440, and an eCC CSI feedback module 1445.

The CA configuration module 1405 may identify a multi-carrier configuration comprising a PCell and at least one SCell. The at least one SCell may include an eCC using shared or unlicensed spectrum as described above with reference to FIGS. 2A-11.

The eCC decoder module 1410 may identify ACK/NACK feedback information for a plurality of code blocks received on the eCC of the at least one SCell. The plurality of code blocks may be received in a plurality of scheduled transport blocks as described above with reference to FIGS. 2A-11.

The eCC HARQ feedback module 1415 may identify a feedback subframe of the PCell for providing the ACK/NACK feedback information based at least in part on a subframe of the PCell for which transmissions of the plurality code blocks received on the eCC completed as described above with reference to FIGS. 2A-11. In some examples, the PCell includes a downlink primary component carrier and an FDD uplink primary component carrier. The feedback subframe may have a predetermined offset from the subframe of the PCell for which the transmissions of the one or more code blocks received on the eCC completed. In some examples, the PCell may include a TDD component carrier. The feedback subframe may be the first uplink subframe of the TDD component carrier after a predetermined offset from the subframe of the PCell for which the transmissions of the one or more code blocks received on the eCC completed.

The HARQ encoding module 1420 may jointly code the ACK/NACK feedback information for sending in a single PUCCH transmission as described above with reference to FIGS. 2A-11. In some examples, the PUCCH transmission comprises an LTE/LTE-A PUCCH format 3 transmission. The HARQ encoding module 1420 may also determine that a number of ACK/NACK bits of the ACK/NACK feedback information exceeds a capacity of a PUCCH format used for the PUCCH transmission. When the number of ACK/NACK bits exceeds the PUCCH capacity, the HARQ encoding module 1420 may bundle one or more categories of ACK/NACK feedback information prior to the jointly encoding, wherein the one or more categories comprise any of ACK/NACK feedback information associated with different spatial streams, ACK/NACK feedback information for code blocks within a transport block of the plurality of scheduled transport blocks for the SCell, or combinations thereof.

Additionally or alternatively, the HARQ feedback resource module 1430 may determine a plurality of PUCCH resources for transmission of the ACK/NACK feedback information as described above with reference to FIGS. 2A-11. When the number of ACK/NACK bits exceeds the PUCCH capacity, the HARQ encoding module 1420 may separately encode the ACK/NACK feedback information into multiple blocks of PUCCH modulation symbols for transmission in separate PUCCH transmissions.

The eCC grant index module 1425 may receive downlink transmission index information within downlink grants associated with the plurality of scheduled transport blocks as described above with reference to FIGS. 2A-11. The eCC grant index module 1425 may also determine, based at least in part on receiving a downlink grant for the eCC having an out of order index, that transmission of at least one downlink grant for the eCC has failed. The indexes may be associated with each downlink grant or transport block, or may include index information for each code block of transmissions associated with the plurality of downlink grants. The eCC decoder module 1410 may send, in the transmitted ACK/NACK feedback information, one or more NACK bits for the at least one downlink grant for the eCC that has failed.

In some examples, ACK/NACK feedback information may be transmitted in a data channel of the PCell when a data transmission (e.g., PUSCH, etc.) is scheduled. The PCell data module 1435 may identify a PUSCH transmission scheduled for the identified feedback subframe as described above with reference to FIGS. 2A-11. The auxiliary decoder module 1440 may identify second ACK/NACK feedback information associated with downlink transmissions not carried via the eCC for sending during the identified feedback subframe as described above with reference to FIGS. 2A-11.

The eCC CSI feedback module 1445 may determine a carrier of the PCell or SCell for transmission of aperiodic CSI feedback as described above with reference to FIGS. 2A-11. In some examples, determining the carrier comprises determining the carrier based at least in part on any of a cell on which the grant may be received, a cell which may be scheduled by the grant, or combinations thereof. In some examples, the carrier for transmission of the aperiodic CSI feedback comprises a carrier of the PCell.

The components of the device 1205, including eCC feedback component 1320-a, may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 15:
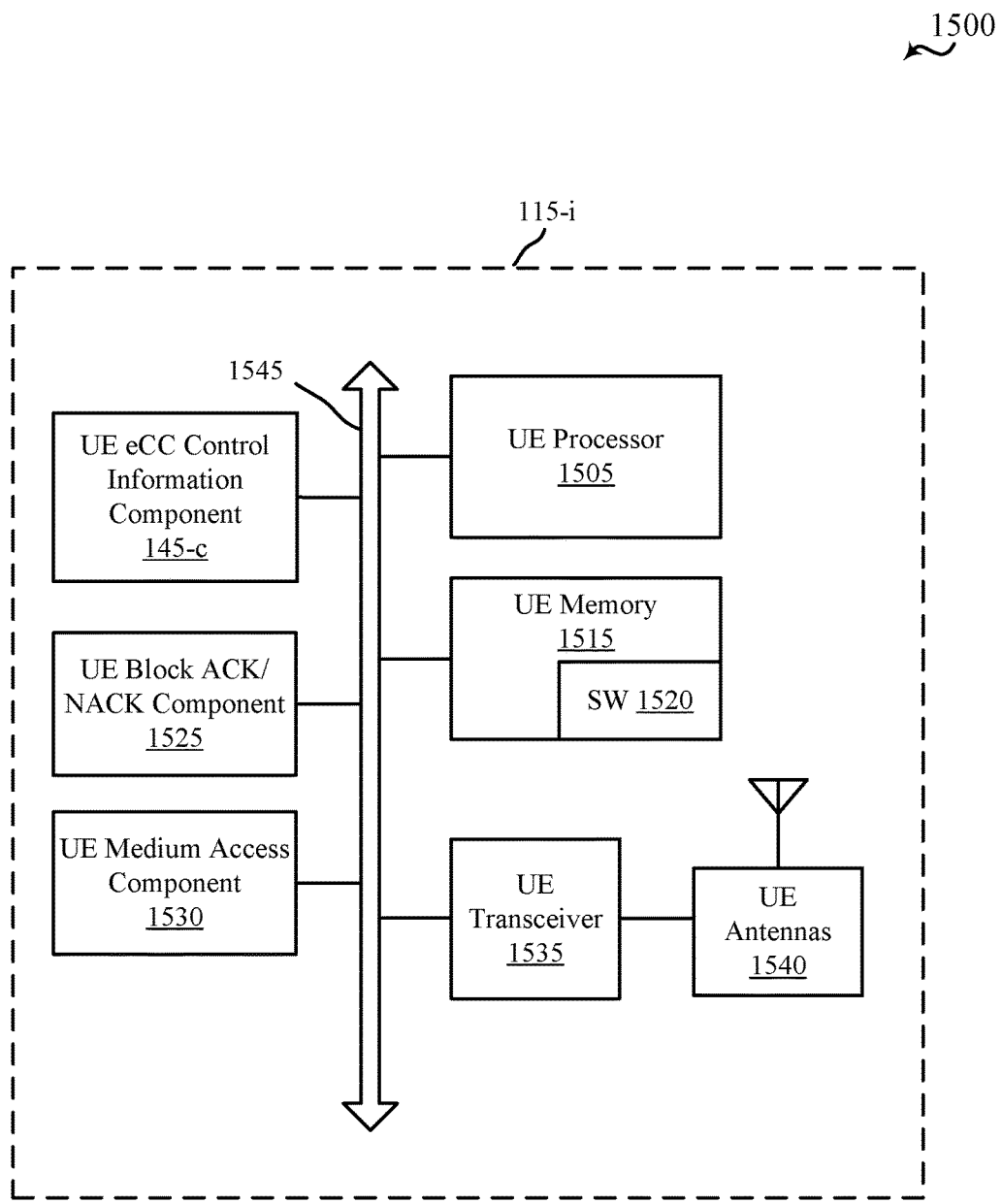
FIG. 15 shows a block diagram of a wireless communication system, in accordance with various aspects of the present disclosure.

FIG. 15 shows a system 1500 for use in wireless communication, in accordance with various examples. System 1500 may include a UE 115-*i*, which may be an example of the UEs 115 of FIGS. 1-11. The UE 115-*i* may also be an example of one or more aspects of device 1205 of FIGS. 12-13.

The UE 115-*i* may generally include components for bi-directional voice and data communications including components for transmitting communications and components for receiving communications. The UE 115-*i* may include UE antenna(s) 1540, a UE transceiver 1535, a UE processor 1505, and UE memory 1515 (including software (SW) 1520), which each may communicate, directly or indirectly, with each other (e.g., via one or more buses 1545). The UE transceiver 1535 may be configured to communicate bi-directionally, via the UE antenna(s) 1540 or one or more wired or wireless links, with one or more networks, as described above. For example, the UE transceiver 1535 may be configured to communicate bi-directionally with base stations 105 with reference to FIGS. 1-11. The UE transceiver 1535 may include a modem configured to modulate the packets and provide the modulated packets to the UE antenna(s) 1540 for transmission, and to demodulate packets received from the UE antenna(s) 1540. While the UE 115-*i* may include a single antenna 1540, the UE 115-*i* may have multiple antennas 1540 capable of concurrently transmitting and/or receiving multiple wireless transmissions. The UE transceiver 1535 may be capable of concurrently communicating with one or more base stations 105 via multiple component carriers. The UE transceiver 1535 may be capable of eCC communications over one or more SCells and a PCell.

The UE 115-*i* may include a UE eCC control information component 145-*c*, which may perform the functions described above for the UE eCC control information component 145 of device 1205 of FIGS. 12-13 and the UE 115*s* of FIGS. 1-2B. The UE 115-*i* may also include a UE block ACK/NACK component 1525 to analyze or generate block ACK/NACK messages. In some examples, the UE block ACK/NACK component 1525 may be a part of the UE eCC control information component 145-*c*.

The UE 115-*i* may also include a UE medium access component 1530 that attempts to gain access to a medium identified in an UL grant. In some examples, the UE medium access component 1530 may be a part of the UE eCC control information component 145-*c*.

The UE memory 1515 may include random access memory (RAM) and read-only memory (ROM). The UE memory 1515 may store computer-readable, computer-executable software/firmware code 1520 containing instructions that are configured to, when executed, cause the UE processor 1505 to perform various functions described herein for sending or receiving control information over a PCell. Alternatively, the computer-readable, computer-executable software/firmware code 1520 may not be directly executable by the UE processor 1505 but be configured to cause a computer (e.g., when compiled and executed) to perform functions described herein. The UE processor 1505 may include an intelligent hardware device, e.g., a central processing unit (CPU), a microcontroller, an ASIC, or the like.

Figure 16:
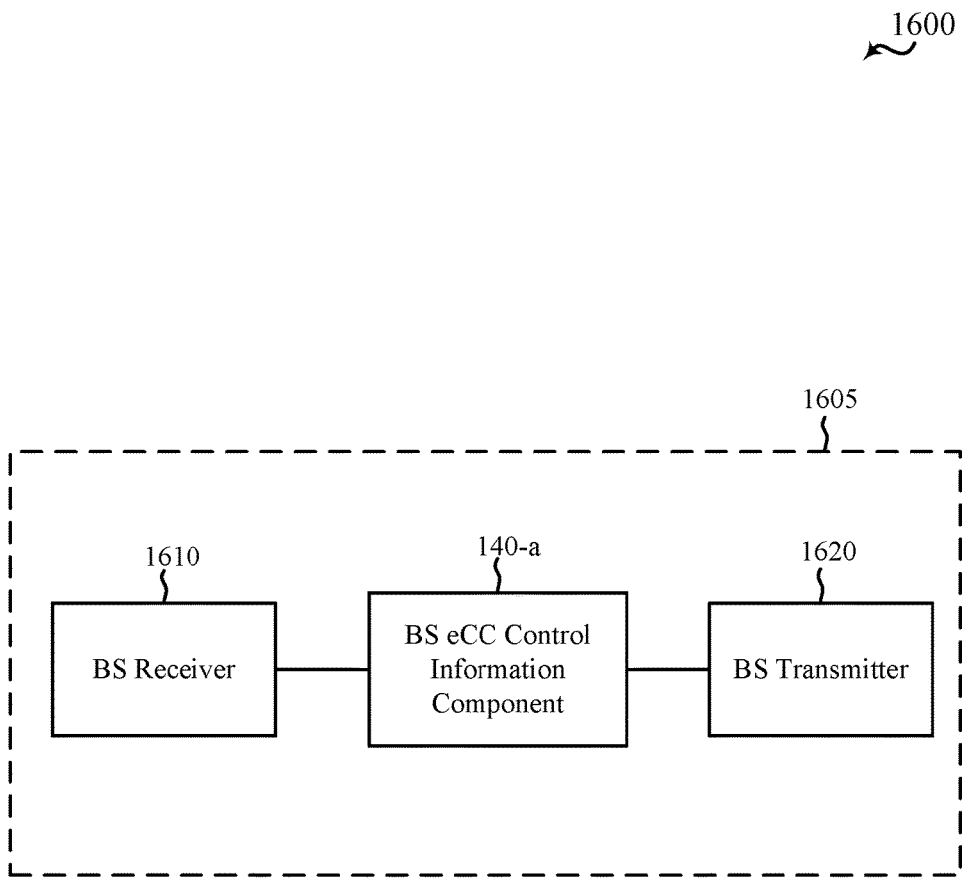
FIG. 16 shows a block diagram of a device for use in wireless communication, in accordance with various aspects of the present disclosure.

FIG. 16 shows a block diagram 1600 of a device 1605 for use in wireless communication, in accordance with various aspects of the present disclosure. In some examples, the device 1605 may be an example of aspects of one or more of the base stations 105 described with reference to FIGS. 1-6. In some examples, the device 1605 may be part or include an LTE/LTE-A eNB and/or an LTE/LTE-A base station that supports eCC communications. The device 1605 may also be a processor. The device 1605 may include a base station receiver 1610, a base station eCC control information component 140-*a*, or a base station transmitter 1620. Each of these components may be in communication with each other.

The components of the device 1605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the base station receiver 1610 may include at least one radio frequency (RF) receiver, such as an RF receiver operable to receive UL data over an SCell and UL control information over a PCell. The base station receiver 1610 may be used to receive various types of data or control signals (i.e., transmissions) over one or more communication links of a wireless communication system, such as one or more communication links of the wireless communications system 100 described with reference to FIG. 1.

In some examples, the base station transmitter 1620 may include at least one RF transmitter, such as at least one RF transmitter operable to transmit DL data over the SCell and DL control information over the PCell. The base station transmitter 1620 may be used to transmit various types of data and/or control signals (i.e., transmissions) over one or more communication links of a wireless communication system, such as one or more communication links of the wireless communications system 100 described with reference to FIG. 1.

The base station eCC control information component 140-*a* may interpret control information received by the base station receiver 1610 over the PCell. The base station eCC control information component 140-*a* may also determine control information to DL, such as CSI, DL ACK/NACK, DL/UL grants, or other types of control information. The base station eCC control information component 140-*a* may format the control information to be transmitted by the base station transmitter 1620 over the PCell. The base station eCC control information component 140-*a* may select an appropriate channel of the PCell to send the information, such as the PHICH, ePHICH, or PDSCH of the PCell. The base station eCC control information component 140-*a* may select the appropriate channel based on at least in part the type of control information, channel conditions, or some other consideration.

Figure 17:
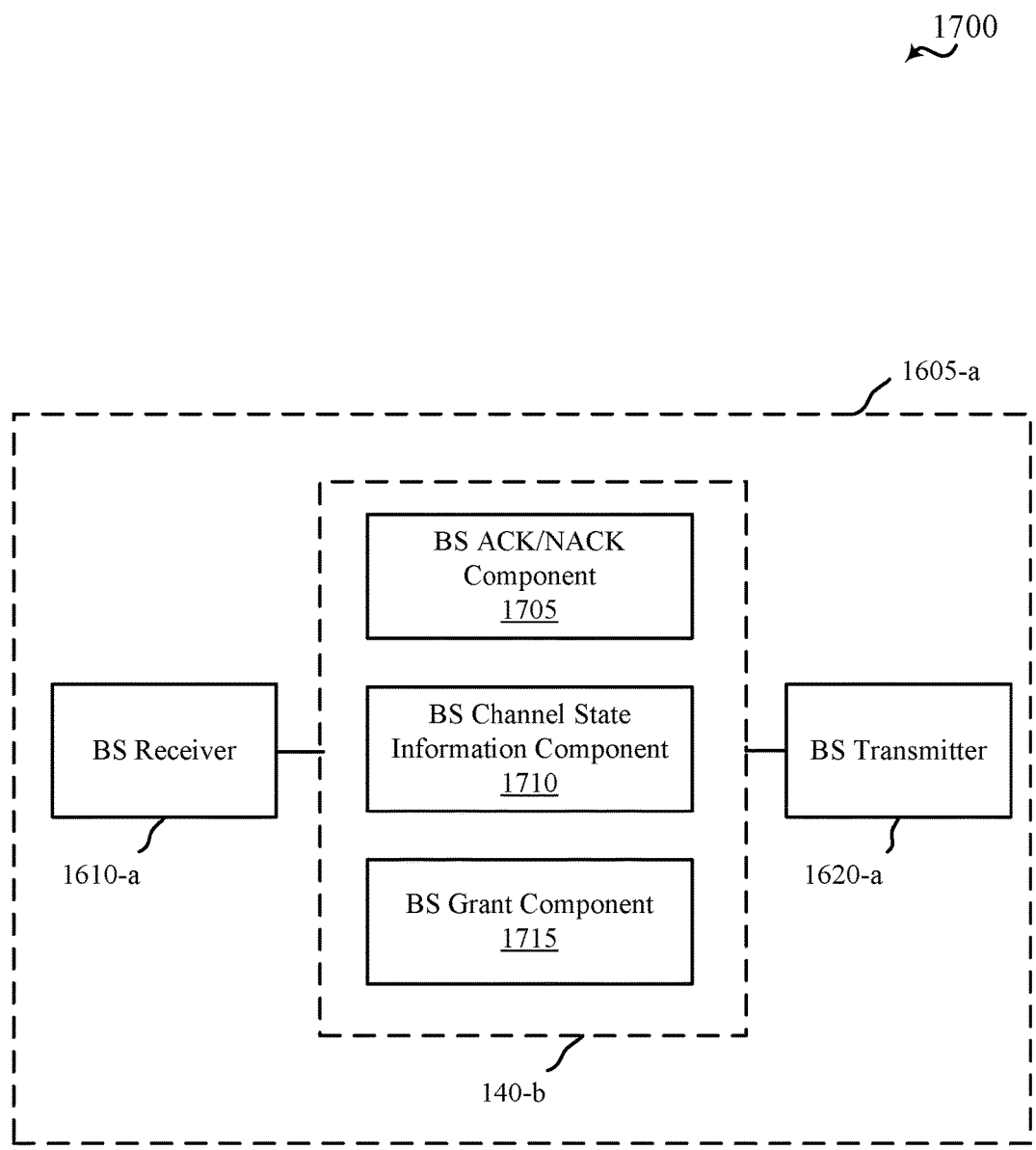
FIG. 17 shows a block diagram of a device for use in wireless communication, in accordance with various aspects of the present disclosure.

FIG. 17 shows a block diagram 1700 of a device 1605-*a* for use in wireless communication, in accordance with various aspects of the present disclosure. In some examples, the device 1605-*a* may be an example of aspects of one or more of the base stations 105 described with reference to FIGS. 1-6, and/or an example of aspects of the device 1605 described with reference to FIG. 16. In some examples, the device 1605-*a* may be part or include an LTE/LTE-A eNB and/or an LTE/LTE-A base station that is capable of eCC communications. The device 1605-*a* may also be a processor. The device 1605-*a* may include a base station receiver 1610-*a*, a base station eCC control information component 140-*b*, or a base station transmitter 1620-*a*. The base station eCC control information component 140-*b* may further include a base station ACK/NACK component 1705, a base station CSI component 1710, and a base station grant component 1715. Each of these components may be in communication with each other.

The components of the device 1605-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the base station receiver 1610-*a* may be an example of one or more aspects of the base station receiver 1610 described with reference to FIG. 16. In some examples, the base station receiver 1610-*a* may include at least one radio frequency (RF) receiver, such as at least one RF receiver operable to receive control information over a PCell. The base station receiver 1610-*a* may be used to receive various types of data and/or control signals (i.e., transmissions) over one or more communication links of a wireless communication system, such as one or more communication links of the wireless communications system 100 described with reference to FIG. 1 and one or more PCells 225 described with respect to FIGS. 2A-2B.

In some examples, the base station transmitter 1620-*a* may be an example of one or more aspects of the base station transmitter 1620 described with reference to FIG. 16. In some examples, the base station transmitter 1620-*a* may include at least one RF transmitter, such as at least one RF transmitter operable to transmit control information over a PCell. The base station transmitter 1620-*a* may be used to transmit various types of data and/or control signals (i.e., transmissions) over one or more communication links of a wireless communications system, such as one or more communication links of the wireless communications system 100 described with reference to FIG. 1 and one or more PCells 225 described with respect to FIG. 2A-2B.

The base station ACK/NACK component 1705 may determine acknowledgment or negative-acknowledgement messages to DL based on UL data sent from a UE, such as a UE 115. The base station ACK/NACK component 1705 may also interpret UL ACK/NACK messages received at the base station receiver 1610-*a* over the PCell. For example, the base station ACK/NACK component 1705 may interpret an UL block ACK/NACK message received over the PCell that is intended for the device 1605-*a*. The base station ACK/NACK component 1705 may also aggregate ACK/NACKs from multiple eCC UL data into a single feedback block. Further, the base station ACK/NACK component 1705 may select the PHICH, ePHICH, or the PDSCH of the PCell for the base station transmitter 1620-*a* to transmit the DL ACK/NACK message.

The base station CSI component 1710 may interpret CSI information received at the base station receiver 1610-*a* over the PCell. In some examples, the base station CSI component 1710 may determine CSI information for the SCell based on UL data received at the base station receiver 1610-*a*.

The base station grant component 1715 determines DL/UL grants to be sent by the base station transmitter 1620-*a*, requesting DL or UL data transmission on the eCC. The base station grant component 1715 may select the PDSCH of the PCell for transmitting the DL/UL grant. The base station grant component 1715 may create the DL/UL grant to indicate one or more of several transmission times, an expiration time of the DL/UL grant, or frequency resources over a medium where the DL/UL data may be potentially sent. In some examples, the frequency resources are on the eCC SCell.

The base station grant component 1715 also determines what action the device 1605-*a* is to take based on whether the device 1605-*a* gains access to the medium identified in the DL grant. If the device 1605-*a* does gain access to the medium in one of the resources, then the base station transmitter 1620-*a* sends the DL data. If the device 1605-*a* does not gain access to the medium in time, then the base station grant component 1715 may instruct the base station transmitter 1620-*a* to refrain from transmitting the DL data or does not provide the DL data to the base station transmitter 1620-*a* at all. In another example, the base station grant component 1715 has the base station transmitter 1620-*a* send the DL grant only after the device 1605-*a* gains access to the medium. This may ensure that the DL data is able to be sent.

Figure 18:
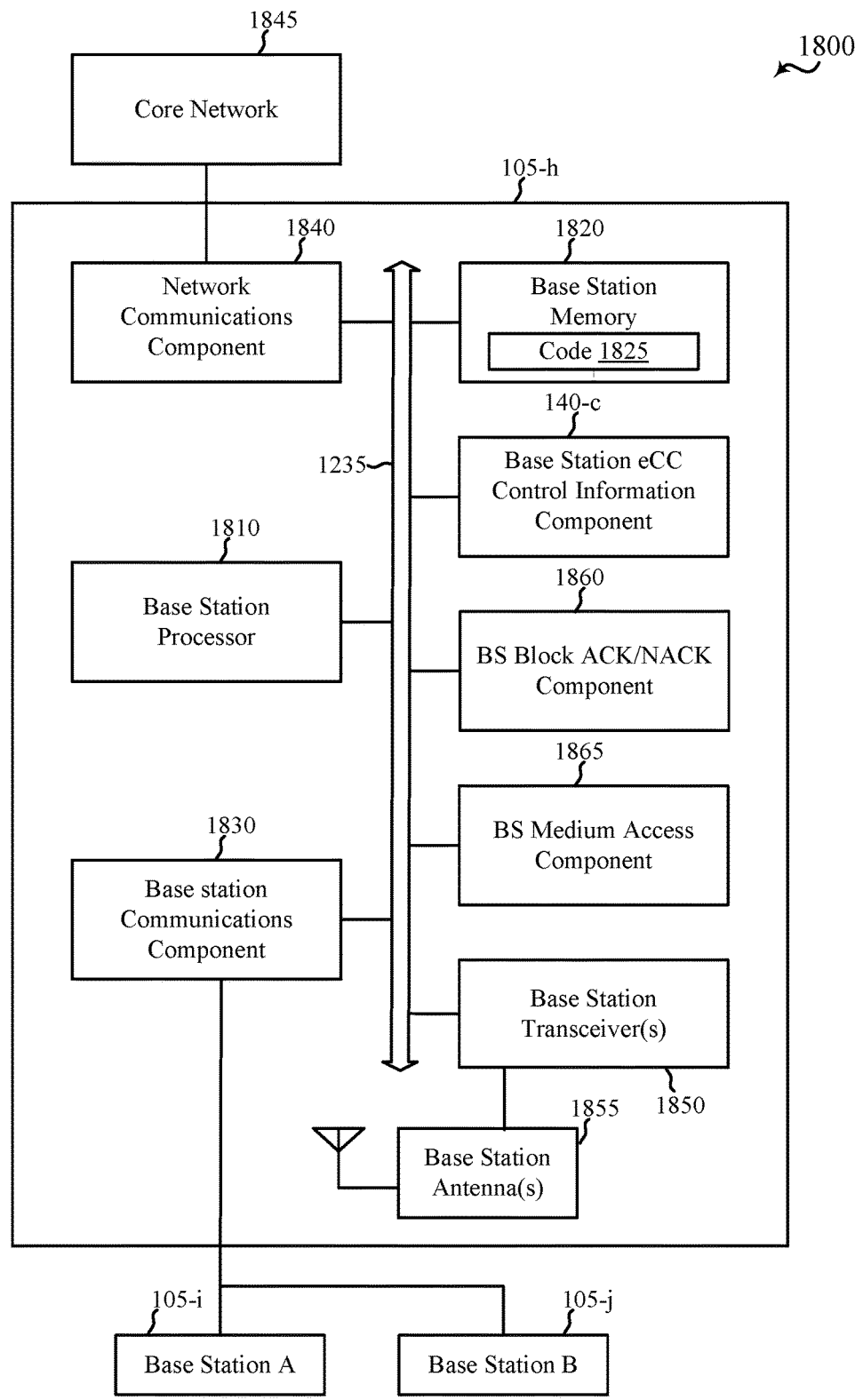
FIG. 18 shows a block diagram of a base station for use in wireless communication, in accordance with various aspects of the present disclosure.

FIG. 18 shows a block diagram 1800 of a base station 105-*h* (e.g., a base station forming part or all of an eNB) for use in wireless communication, in accordance with various aspects of the present disclosure. In some examples, the base station 105-*h* may be an example of aspects of one or more of the base stations 105 described with reference to FIGS. 1-6, or aspects of one or more of the device 1605 when configured as a base station, as described with reference to FIGS. 16-17. The base station 105-*h* may be configured to implement or facilitate at least some of the base station and/or device features and functions described with reference to FIGS. 1-6 and 16-17.

The base station 105-*h* may include a base station processor 1810, a base station memory 1820, at least one base station transceiver (represented by base station transceiver(s) 1850), at least one base station antenna (represented by base station antenna(s) 1855), and base station eCC control information component 140-*c*. The base station 105-*h* may also include one or more of a base station communications component 1830 and/or a network communications component 1840. Each of these components may be in communication with each other, directly or indirectly, over one or more buses 1835.

The base station memory 1820 may include RAM and/or ROM. The base station memory 1820 may store computer-readable, computer-executable software/firmware code 1825 containing instructions that are configured to, when executed, cause the base station processor 1810 to perform various functions described herein related to wireless communication (e.g., send or receive control information over a PCell, etc.). Alternatively, the computer-readable, computer-executable software/firmware code 1825 may not be directly executable by the base station processor 1810 but be configured to cause the base station 105-*h* (e.g., when compiled and executed) to perform various of the functions described herein.

The base station processor 1810 may include an intelligent hardware device, e.g., a CPU, a microcontroller, an ASIC, and the like. The base station processor 1810 may process information received through the base station transceiver(s) 1850, the base station communications component 1830, and/or the network communications component 1840. The base station processor 1810 may also process information to be sent to the base station transceiver(s) 1850 for transmission through the base station antenna(s) 1855, to the base station communications component 1830, for transmission to one or more other base stations 105-*i* and 105-*j*, or to the network communications component 1840 for transmission to a core network 1845, which may be an example of one or more aspects of the core network 130 described with reference to FIG. 1. The base station processor 1810 may handle, alone or in connection with the base station eCC control information component 140-*c*, various aspects of control information feedback communicated over a PCell.

The base station transceiver(s) 1850 may include a modem configured to modulate packets and provide the modulated packets to the base station antenna(s) 1855 for transmission, and to demodulate packets received from the base station antenna(s) 1855. The base station transceiver(s) 1850 may, in some examples, be implemented as one or more base station transmitters and one or more separate base station receivers. The base station transceiver(s) 1850 may support communications in a first radio frequency spectrum band and/or a second radio frequency spectrum band. The base station transceiver(s) 1850 may support communications in a licensed or unlicensed radio frequency spectrum band, which may be a shared radio frequency spectrum band. The base station transceiver(s) 1850 may be configured to communicate bi-directionally, via the antenna(s) 1855, with one or more UEs or apparatuses, such as one or more of the UEs 115 described with reference to FIGS. 1-11 or devices 1205 described with respect to FIGS. 12-13. The base station 105-*h* may, for example, include multiple base station antennas 1855 (e.g., an antenna array). The base station 105-*h* may communicate with the core network 1845 through the network communications component 1840. The base station 105-*h* may also communicate with other base stations, such as the base stations 105-*i* and 105-*j*, using the base station communications component 1830.

The base station eCC control information component 140-*c* may be configured to perform and/or control some or all of the features and/or functions described with reference to FIG. 1, 16, or 17 related to sending or receiving control information over a PCell. The base station eCC control information component 140-*c*, or portions of the base station eCC control information component 140-*c*, may include a processor, or some or all of the functions of the base station eCC control information component 140-*c* may be performed by the base station processor 1810 or in connection with the base station processor 1810. In some examples, the base station eCC control information component 140-*c* may be an example of the base station eCC control information component 140 described with reference to FIG. 1, 16, or 17.

The base station 105-*h* may also include a base station block ACK/NACK component 1860 to analyze or generate block ACK/NACK messages. In some examples, the base station block ACK/NACK component 1860 may be a part of the base station eCC control information component 140-*c*. The base station 105-*h* may also include a base station medium access component 1865 that attempts to gain access to a medium identified in a DL grant. In some examples, the base station medium access component 1865 may be a part of the base station eCC control information component 140-*c*.

Figure 19:
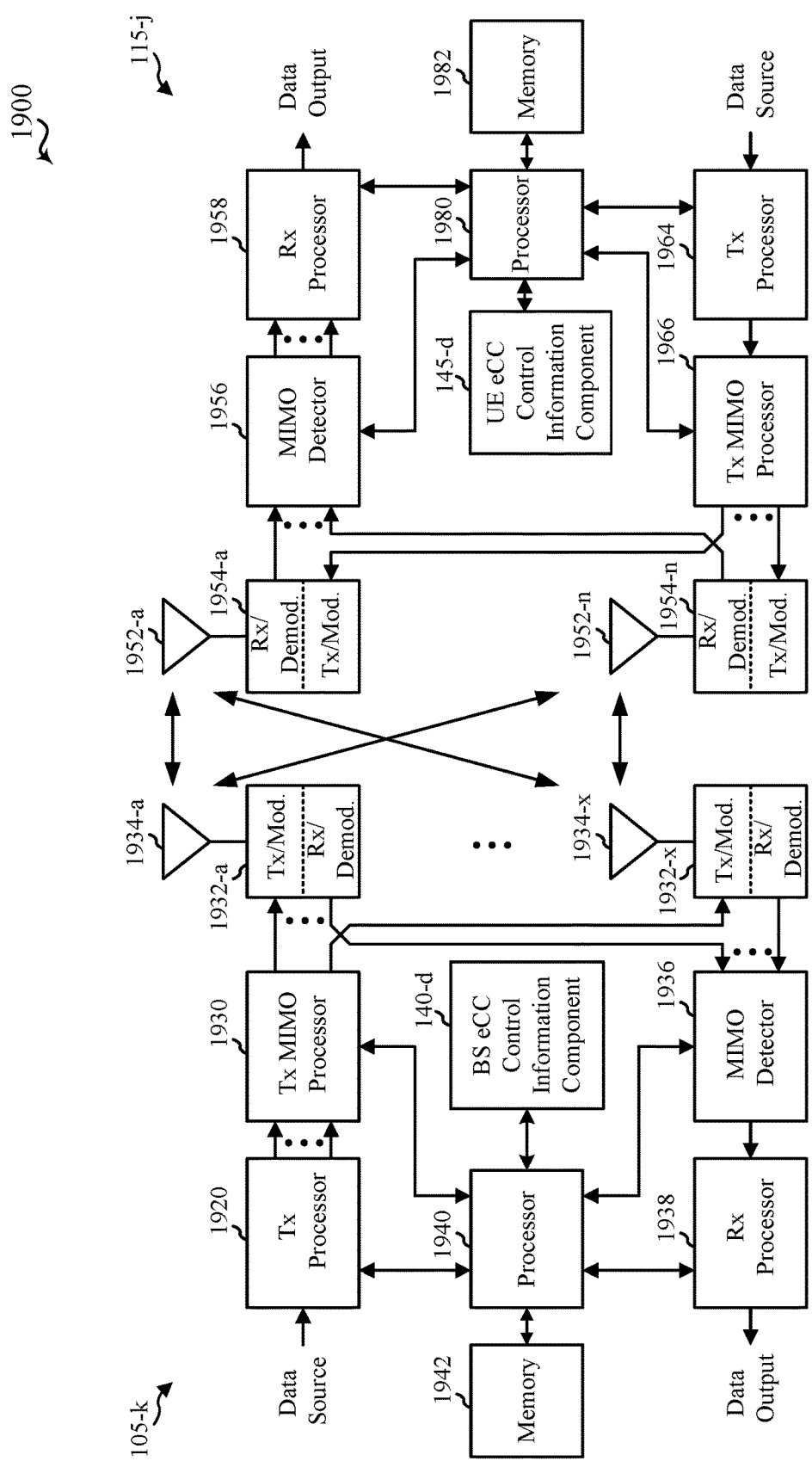
FIG. 19 shows a block diagram of a multiple-input/multiple-output communication system, in accordance with various aspects of the present disclosure.

FIG. 19 is a block diagram of a multiple input/multiple output (MIMO) communication system 1900 including a base station 105-*k* and a UE 115-*j*. The MIMO communication system 1900 may illustrate aspects of the wireless communications system 100 shown in FIG. 1 and the system 200 and communication environment 250 shown in FIGS. 2A and 2B. The base station 105-*j* may be equipped with antennas 1334-*a* through 1334-*x*, and the UE 115-*j* may be equipped with antennas 1952-*a* through 1952-*n*. In the MIMO communications system 1900, the base station 105-*k* may be able to send data over multiple communication links at the same time. Each communication link may be called a "layer" and the "rank" of the communication link may indicate the number of layers used for communication. For example, in a 2×2 MIMO communications system where base station 105-*k* transmits two "layers," the rank of the communication link between the base station 105-*k* and the UE 115-*j* is two. The base station 105-*k* and the UE 115-*j* may perform eCC communications over a PCell and an SCell.

At the base station 105-*k*, a transmit processor 1920 may receive data from a data source. The transmit processor 1920 may process the data. The transmit processor 1920 may also generate control symbols and/or reference symbols. A transmit (TX) MIMO processor 1930 may perform spatial processing (e.g., precoding) on data symbols, control symbols, and/or reference symbols, if applicable, and may provide output symbol streams to the transmit modulators 1932-*a* through 1932-*x*. Each modulator 1932 may process a respective output symbol stream (e.g., for OFDM, etc.) to obtain an output sample stream. Each modulator 1932 may further process (e.g., convert to analog, amplify, filter, and upconvert) the output sample stream to obtain a DL signal. In one example, DL signals from modulators 1932-*a* through 1932-*x* may be transmitted via the antennas 1334-*a* through 1334-*x*, respectively.

At the UE 115-*j*, the UE antennas 1952-*a* through 1952-*n* may receive the DL signals from the base station 105-*k* and may provide the received signals to the demodulators 1954-*a* through 1954-*n*, respectively. Each demodulator 1954 may condition (e.g., filter, amplify, downconvert, and digitize) a respective received signal to obtain input samples. Each demodulator 1954 may further process the input samples (e.g., for OFDM, etc.) to obtain received symbols. A MIMO detector 1956 may obtain received symbols from all the demodulators 1954-*a* through 1954-*n*, perform MIMO detection on the received symbols, if applicable, and provide detected symbols. A receive processor 1958 may process (e.g., demodulate, deinterleave, and decode) the detected symbols, providing decoded data for the UE 115-*j* to a data output, and provide decoded control information to a processor 1980, or memory 1982.

The processor 1980 may in some cases execute stored instructions to instantiate one or more of a UE eCC control information component 145-*d*. The UE eCC control information component 145-*d* may be an example of aspects of the UE eCC control information component 145 described with reference to FIGS. 1, 12, 13, and 15.

On the UL, at the UE 115-*j*, a transmit processor 1964 may receive and process data from a data source. The transmit processor 1964 may also generate reference symbols for a reference signal. The symbols from the transmit processor 1964 may be precoded by a transmit MIMO processor 1966 if applicable, further processed by the demodulators 1954-*a* through 1954-*n* (e.g., for SC-FDMA, etc.), and be transmitted to the base station 105-*k* in accordance with the transmission parameters received from the base station 105-*k*. At the base station 105-*k*, the UL signals from the UE 115-*j* may be received by the antennas 1334, processed by the modulators 1932, detected by a MIMO detector 1936 if applicable, and further processed by a receive processor 1938. The receive processor 1938 may provide decoded data to a data output and to the processor 1940 or memory 1942. The processor 1940 may in some cases execute stored instructions to instantiate one or more of a base station eCC control information component 140-*d*. The base station eCC control information component 140-*d* may be an example of aspects of the base station eCC control information component 140 described with reference to FIGS. 1 and 16-18.

The components of the UE 115-*j* may, individually or collectively, be implemented with one or more ASICs adapted to perform some or all of the applicable functions in hardware. Each of the noted modules may be a means for performing one or more functions related to operation of the MIMO communications system 1900. Similarly, the components of the base station 105-*k* may, individually or collectively, be implemented with one or more ASICs adapted to perform some or all of the applicable functions in hardware. Each of the noted components may be a means for performing one or more functions related to operation of the MIMO communications system 1900.

Figure 20:
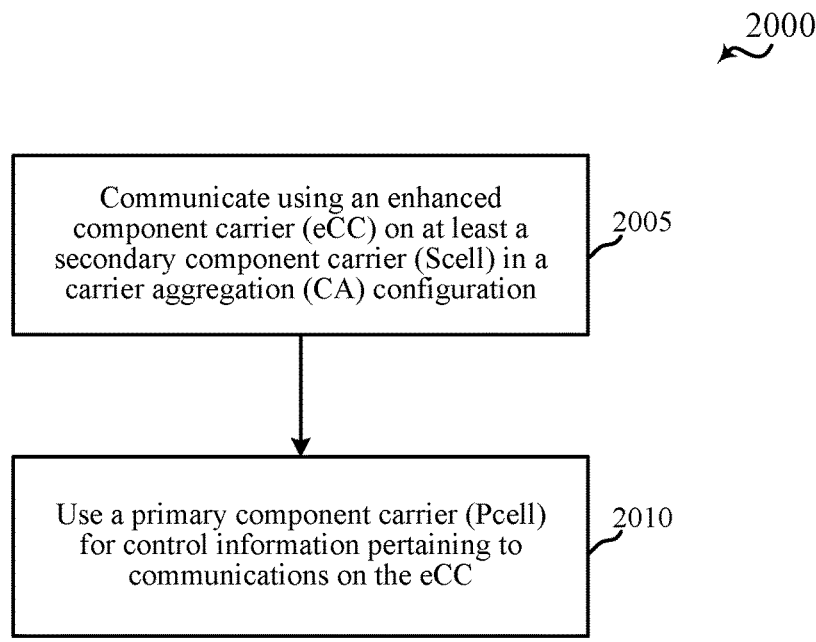
FIG. 20 is a flow chart illustrating an example method of eCC control information communications, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the base stations 105 described with reference to FIGS. 1-6 and 16-18, or aspects of one or more of the UEs described with reference to FIGS. 1-15. In some examples, a base station 105 or a UE 115 may execute one or more sets of codes to control the functional elements of the base station 105 or the UE 115 to perform the functions described below. Additionally or alternatively, the base station 105 or the UE 115 may perform one or more of the functions described below using special-purpose hardware.

At block 2005, the method 2000 may include communicating using an eCC on at least a SCell in a CA configuration. For example, the base station 105 and the UE 115 may establish communications on an eCC SCell, such as the SCell 225-*b* of FIG. 2A. The base station 105 and the UE 115 may exchange DL and UL data over the SCell. In some examples, communicating using the eCC includes communicating on an unlicensed radio frequency spectrum band or a shared radio frequency spectrum band. In additional examples, communicating using the eCC includes communicating on a licensed radio frequency spectrum band.

At block 2010, the method 2000 may include using a PCell for control information pertaining to communications on the eCC. For example, the base station 105 or the UE 115 may send control information, such as CSI, ACK/NACK messages, DL/UL grants, or the like.

In one example, the PCell is used for sending or receiving CSI related to the eCC. Sending or receiving the CSI may include sending or receiving the CSI on one or both of a PUCCH of the PCell and a PUSCH of the PCell.

In another example, the PCell is used for ACK/NACK control information. In some examples, using the PCell for control information includes sending or receiving, in response to data received via the eCC, one of a DL ACK/ NACK and an UL ACK/NACK. For example, a base station 105 may send a DL ACK/NACK in response to UL data. Likewise, a UE 115 may send an UL ACK/NACK in response to DL data. In some examples, using the PCell to send or receive control information further includes sending the UL ACK/NACK in response to eCC DL data on one or both of a PUCCH of the PCell and a PUSCH of the PCell. In another example, using the PCell to send or receive control information further includes sending the DL ACK/ NACK in response to eCC UL data on at least one of a PHICH of the PCell, an ePHICH of the PCell, a PDSCH of the PCell, and combinations thereof.

In another example, communicating one of the DL ACK/ NACK and the UL ACK/NACK may further include communicating a block ACK/NACK containing multiple ACK/ NACKs corresponding to multiple eCC DL data or multiple eCC UL data. Further, communicating the block ACK/ NACK may include indicating that the multiple ACK/ NACKs correspond to multiple users transmitting the data received via the eCC.

In another example of the method 2000, using the PCell to send or receive control information may include sending or receiving one or both of a DL grant and an UL grant. In one example, the method 2000 includes sending the DL grant that identifies one or both of time and frequency resources for PDSCH transmission on the eCC. The method 2000 may also include refraining from sending DL data in response to a failure to gain access to a medium identified in the DL grant using the identified time or frequency resources. For example, if a base station 105 sends a DL grant on the PCell and then cannot access the medium resources during the appropriate time, the base station 105 does not send the DL data. However, if the base station 105 does gain access to the medium during the appropriate time, the base station 105 does send the DL data.

In one example, the method 2000 includes sending the DL grant that identifies an expiration time for PDSCH transmission on the eCC. The method 2000 may also include refraining from sending DL data in response to a failure to gain access to a medium identified in the DL grant by the expiration time. For example, if the base station 105 sends a DL grant on the PCell and then cannot access the medium resources before the expiration time, the base station 105 does not send the DL data.

Some examples of the method 2000 include gaining access to a medium, wherein sending or receiving one or both the DL grant and the UL grant further comprises sending the DL grant on the medium. The method 2000 may also include receiving the UL grant that identifies one or both of time and frequency resources for PUSCH transmission on the eCC. The method 2000 may further include refraining from sending UL data in response to a failure to gain access to a medium identified in the UL grant using the identified times or frequency resources. For example, if a UE 115 receives an UL grant on the PCell and then cannot access the medium resources during the appropriate time, the UE 115 does not send the UL data. However, if the UE 115 does gain access to the medium during the appropriate time, the UE 115 does send the UL data.

Similarly, the method 2000 may include receiving the UL grant that identifies an expiration time for PUSCH transmission on the eCC and refraining from sending UL data in response to a failure to gain access to a medium identified in the UL grant by the expiration time.

In another example, the method 2000 includes receiving a grant comprising a trigger for aperiodic CSI feedback and determining a carrier of the PCell or SCell for transmission of the aperiodic CSI feedback. In some examples, sending or receiving in method 2000 includes sending or receiving the CSI on one or both of a PUCCH of the PCell and a PUSCH of the PCell. In some examples, determining the carrier includes determining the carrier based at least in part on any of a cell on which the grant is received, a cell which is scheduled by the grant, or combinations thereof.

In other examples of the method 2000, using the PCell for control information further includes sending or receiving, in response to data received via the eCC, one of a downlink ACK/NACK feedback information and an uplink ACK/NACK feedback information. The method 2000 may also include identifying ACK/NACK feedback information for a plurality of code blocks received on an eCC of the SCell, the plurality of code blocks received in a plurality of scheduled transport blocks. The method 2000 may further include identifying a feedback subframe of the PCell for providing the ACK/NACK feedback information based at least in part on a subframe of the PCell for which transmissions of the plurality code blocks received on the eCC are completed, wherein sending or receiving one of the downlink ACK/NACK and the uplink ACK/NACK further comprises transmitting the ACK/NACK feedback information via the PCell in the identified feedback subframe.

In some additional examples, the PCell includes a downlink primary component carrier and a FDD uplink primary component carrier, and the feedback subframe has a predetermined offset from the subframe of the PCell for which the transmissions of the plurality of code blocks received on the eCC completed. In other examples, the PCell comprises a TDD component carrier, and wherein the feedback subframe comprises a first uplink subframe of the TDD component carrier after a predetermined offset from the subframe of the PCell for which the transmissions of the plurality of code blocks received on the eCC completed.

Using the PCell to send or receive control information may further include sending the uplink ACK/NACK in response to eCC downlink data on one or both of a PUCCH of the PCell and a PUSCH of the PCell or sending the downlink ACK/NACK in response to eCC uplink data on at least one of a PHICH of the PCell, an ePHICH of the PCell, a PDSCH of the PCell, and combinations thereof. Communicating one of the downlink ACK/NACK and the uplink ACK/NACK may further include communicating a block ACK/NACK containing multiple ACK/NACKs corresponding to multiple eCC downlink data or multiple eCC uplink data. In other examples, communicating the block ACK/NACK further includes indicating that the multiple ACK/NACKs correspond to multiple users transmitting the data received via the eCC. Additional examples of the method 2000 include receiving downlink transmission index information within downlink grants associated with the plurality of scheduled transport blocks.

In another example, the method 2000 includes determining that a number of ACK/NACK bits of the ACK/NACK feedback information exceeds a capacity of a PUCCH format used for transmitting the ACK/NACK feedback information and determining a plurality of PUCCH resources for transmission of the ACK/NACK feedback information, wherein sending or receiving the ACK/NACK feedback information further comprises transmitting a plurality of PUCCH transmissions using the plurality of PUCCH resources.

The operation(s) at block 2005 and 2010 may be performed using the UE eCC control information component 145 or the base station eCC control information component 140 described with reference to FIGS. 1 and 12-19.

Thus, the method 2000 may provide for wireless communication. It should be noted that the method 2000 is just one implementation and that the operations of the method 2000 may be rearranged or otherwise modified such that other implementations are possible.

Figure 21:
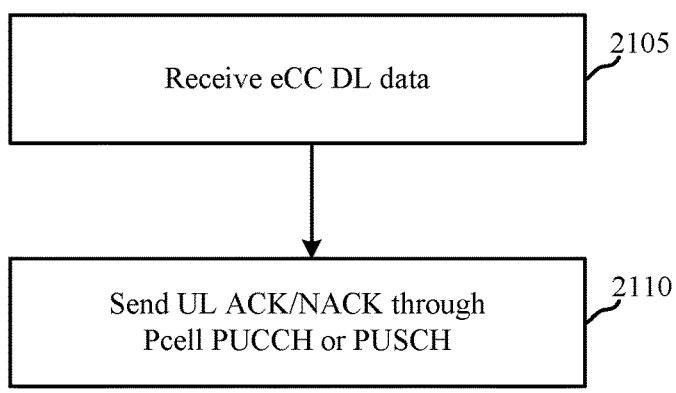
FIG. 21 is a flow chart illustrating an example method of eCC UL ACK/NACK communications, in accordance with various aspects of the present disclosure.
Figure 22:
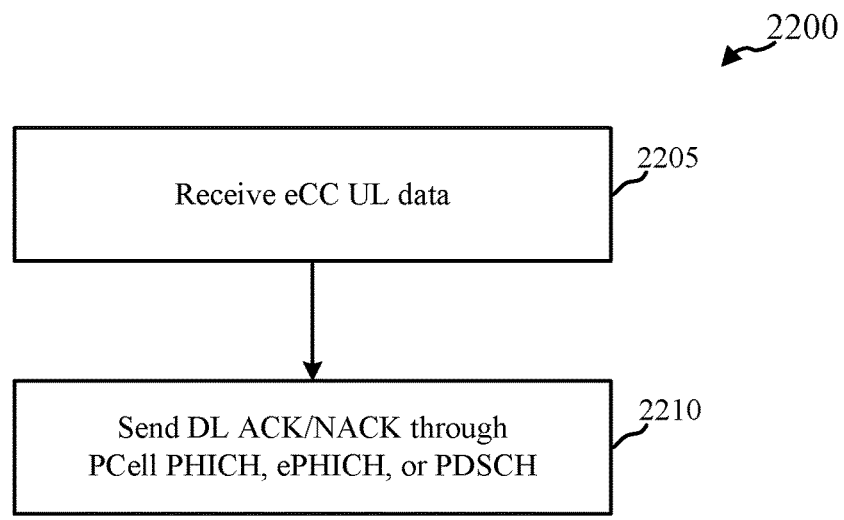
FIG. 22 is a flow chart illustrating an example method of eCC DL ACK/NACK communications, in accordance with various aspects of the present disclosure.

FIG. 21 is a flow chart illustrating an example of a method 2100 of eCC UL ACK/NACK communications, in accordance with various aspects of the present disclosure. For clarity, the method 2100 is described below with reference to aspects of one or more the UEs described with reference to FIGS. 1-15. In some examples, a UE 115 may execute one or more sets of codes to control the functional elements of the UE 115 to perform the functions described below. Additionally or alternatively, the UE 115 may perform one or more of the functions described below using special-purpose hardware.

At block 2105, the method 2100 includes receiving eCC DL data. For example, the UE 115 may receive data from a base station 105 over the eCC SCell. The UE 115 may receive the DL data on the eCC SCell PDSCH. At block 2110, the UE 115 may send an UL ACK/NACK message through the PCell PUCCH or PUSCH. For example, if the UE 115 adequately received the DL data at block 2105, the UE 115 may send an UL ACK message to the base station 105. If the UE 115 did not adequately receive the DL data at block 2105, the UE 115 may send an UL NACK message to the base station 105. In some examples of the method 2100, the ACK/NACK messages are block ACK/NACK messages.

The operations at blocks 2105 and 2110 may be performed using the UE eCC control information component 145 described with reference to FIGS. 1 and 12-13. Thus, the method 2100 may provide for wireless communication. It should be noted that the method 2100 is just one implementation and that the operations of the method 2100 may be rearranged or otherwise modified such that other implementations are possible.

FIG. 16 is a flow chart illustrating an example of a method 2200 of eCC DL ACK/NACK communications, in accordance with various aspects of the present disclosure. For clarity, the method 2200 is described below with reference to aspects of one or more of the base stations 105 described with reference to FIGS. 1-2, and 16-18. In some examples, a base station 105 may execute one or more sets of codes to control the functional elements of the base station 105 to perform the functions described below. Additionally or alternatively, the base station 105 may perform one or more of the functions described below using special-purpose hardware.

At block 2205, the method 2200 may include receiving eCC UL data. For example, the base station 105 may receive data from a UE 115 over the eCC SCell. The base station 105 may receive the UL data on the eCC SCell PUSCH. At block 2210, the base station 105 may send a DL ACK/NACK message through the PCell PHICH, ePHICH, or PDSCH. For example, if the base station 105 adequately received the UL data at block 2205, the base station 105 may send a DL ACK message to the UE 115. If the base station 105 did not adequately receive the UL data at block 2205, the base station 105 may send a DL NACK message to the UE 115. In some examples of the method 2200, the ACK/NACK messages are block ACK/NACK messages.

The operations at blocks 2205 and 2210 may be performed using the base station eCC control information component 140 described with reference to FIGS. 1 and 10-13. Thus, the method 2200 may provide for wireless communication. It should be noted that the method 2200 is just one implementation and that the operations of the method 2200 may be rearranged or otherwise modified such that other implementations are possible.

Figure 23:
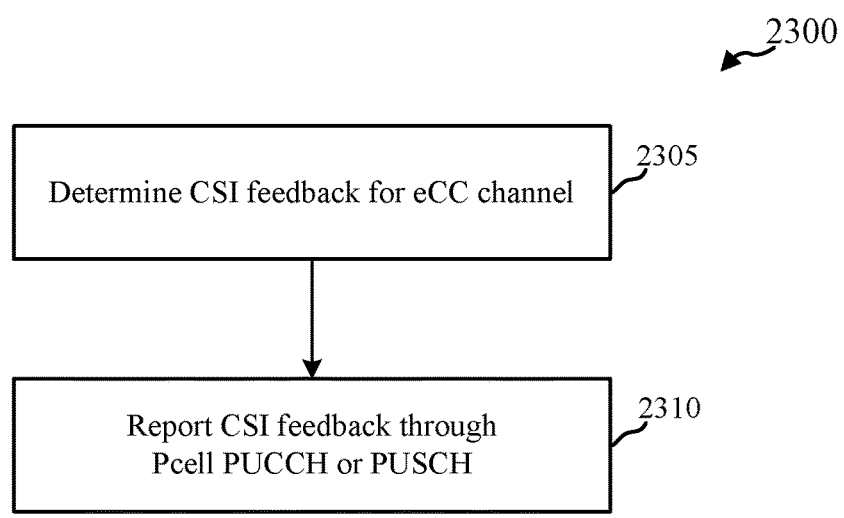
FIG. 23 is a flow chart illustrating an example method of eCC CSI communications, in accordance with various aspects of the present disclosure.

FIG. 23 is a flow chart illustrating an example of a method 2300 of eCC CSI communications, in accordance with various aspects of the present disclosure. For clarity, the method 2300 is described below with reference to aspects of one or more of the UEs described with reference to FIGS. 1-15. In some examples, a UE 115 may execute one or more sets of codes to control the functional elements of the UE 115 to perform the functions described below. Additionally or alternatively, the UE 115 may perform one or more of the functions described below using special-purpose hardware.

At block 2305, the method 2300 includes determining CSI feedback for the eCC SCell channel. For example, the UE 115 may determine CSI feedback based on a signal, such as a pilot signal, received from the base station 105 over the eCC SCell. At block 2310, the UE 115 may report CSI feedback through the PCell PUCCH or PUSCH. The CSI feedback may reflect eCC DL channel quality to be reported to the base station 105 on UL.

The operations at blocks 2305 and 2310 may be performed using the UE eCC control information component 145 described with reference to FIGS. 1 and 12-13. Thus, the method 2300 may provide for wireless communication. It should be noted that the method 2300 is just one implementation and that the operations of the method 2300 may be rearranged or otherwise modified such that other implementations are possible.

Figure 24:
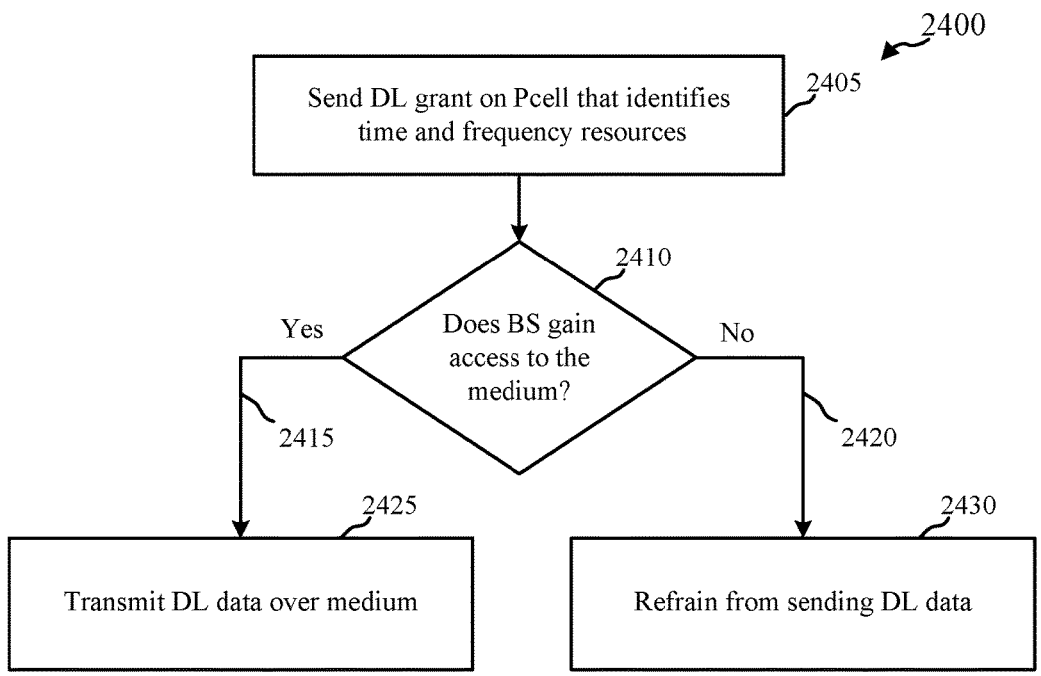
FIG. 24 is a flow chart illustrating an example method of eCC DL grant communications, in accordance with various aspects of the present disclosure.

FIG. 24 is a flow chart illustrating an example of a method 2400 of eCC DL grant communications, in accordance with various aspects of the present disclosure. For clarity, the method 2400 is described below with reference to aspects of one or more of the base stations 105 described with reference to FIGS. 1-6, and 16-18. In some examples, a base station 105 may execute one or more sets of codes to control the functional elements of the base station 105 to perform the functions described below. Additionally or alternatively, the base station 105 may perform one or more of the functions described below using special-purpose hardware.

At block 2405, the method 2400 may include sending a DL grant on a PCell of the eCC. The DL grant may identify several times and frequency resources for the potential DL data. In another example, the DL grant identifies an expiration time after which the DL grant is no longer valid. In some examples, the base station 105 transmits the DL grant on the PCell PDCCH.

At block 2410, the base station attempts to gain access to the medium identified by the DL grant. If the base station 105 does gain access to the medium, the method 2400 proceeds along path 2415 to block 2425. At block 2425, the method 2400 includes transmitting the DL data over the medium.

However, if the base station 105 does not gain access to the medium or specific resources in time, the method 2400 proceeds along path 2420 to block 2430. At block 2430, the method 2400 includes refraining from transmitting the DL data. In some examples, the method 2405 may return to block 2405 and the base station 105 may send a new DL grant on the PCell.

The operations at blocks 2405-2430 may be performed using the base station eCC control information component 140 described with reference to FIGS. 1 and 12-13. Thus, the method 2400 may provide for wireless communication. It should be noted that the method 2400 is just one implementation and that the operations of the method 2400 may be rearranged or otherwise modified such that other implementations are possible.

Figure 25:
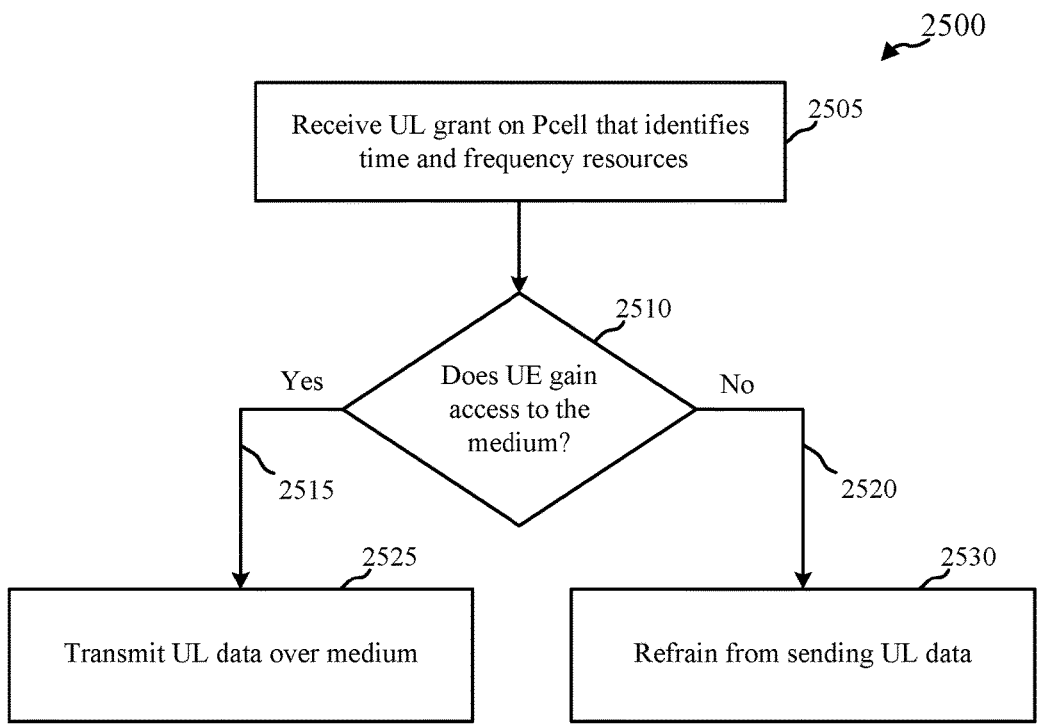
FIG. 25 is a flow chart illustrating an example method of eCC UL grant communications, in accordance with various aspects of the present disclosure.

FIG. 25 is a flow chart illustrating an example of a method 2500 of eCC UL grant communications, in accordance with various aspects of the present disclosure. For clarity, the method 2500 is described below with reference to aspects of one or more of the UEs described with reference to FIGS. 1-15. In some examples, a UE 115 may execute one or more sets of codes to control the functional elements of the UE 115 to perform the functions described below. Additionally or alternatively, the UE 115 may perform one or more of the functions described below using special-purpose hardware.

At block 2505, the method 2500 may include receiving an UL grant on a PCell of the eCC. The UL grant may identify several times and frequency resources for the potential UL data. In another example, the UL grant identifies an expiration time after which the UL grant is no longer valid. In some examples, the UE 115 receives the UL grant on the PCell PDCCH.

At block 2510, the UE 115 attempts to gain access to the medium identified by the UL grant. If the UE 115 does gain access to the medium, the method 2500 proceeds along path 2515 to block 2525. At block 2525, the method 2500 includes transmitting the UL data over the medium.

However, if the UE 115 does not gain access to the medium or specific resources in time, the method 2500 proceeds along path 2520 to block 2530. At block 2530, the method 2500 includes refraining from transmitting the UL data. In some examples, the method 2500 may return to block 2505 and the base station 105 may send a new UL grant on the PCell.

The operations at blocks 2505-2530 may be performed using the UE eCC control information component 145 described with reference to FIGS. 1, 7-9, and 13. Thus, the method 2500 may provide for wireless communication. It should be noted that the method 2500 is just one implementation and that the operations of the method 2500 may be rearranged or otherwise modified such that other implementations are possible.

Figure 26:
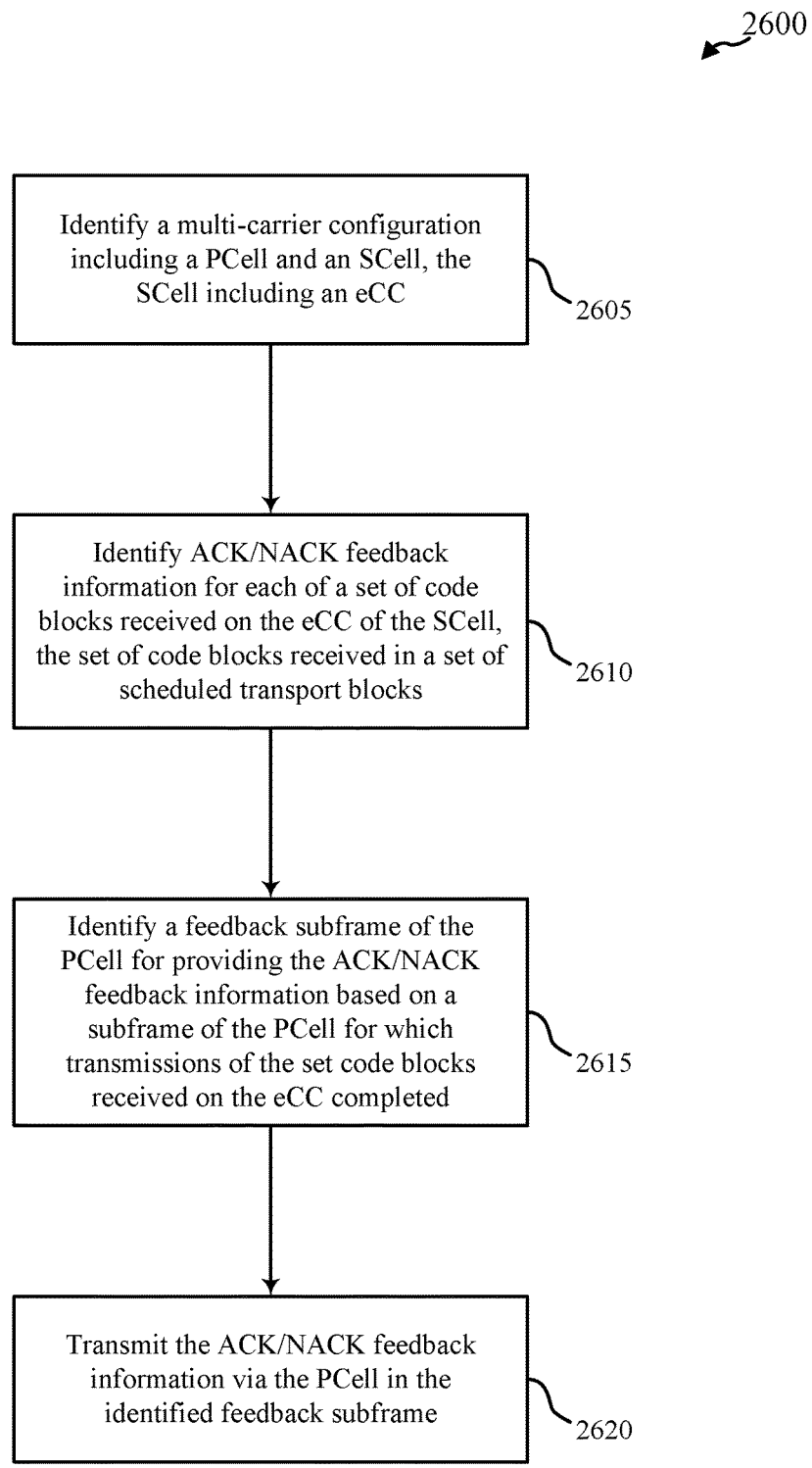
FIG. 26 shows a flowchart illustrating a method for HARQ feedback for non-standalone enhanced component carriers in accordance with various aspects of the present disclosure.

FIG. 26 shows a flowchart illustrating a method 2600 for HARQ and CSI feedback for non-standalone enhanced component carriers in accordance with various aspects of the present disclosure. The operations of method 2600 may be implemented by a UE 115 or its components as described with reference to FIGS. 1-15. For example, the operations of method 2600 may be performed by the UE eCC information component 145 as described with reference to FIGS. 1 and 12-13. In some examples, a UE 115 may execute a set of codes to control the functional elements of the UE 115 to perform the functions described below. Additionally or alternatively, the UE 115 may perform aspects the functions described below using special-purpose hardware.

At block 2605, the UE 115 may identify a multi-carrier configuration comprising a PCell and an SCell, as described above with reference to FIGS. 2-11. For example, the SCell may include a non-standalone eCC using unlicensed or shared spectrum. In certain examples, the operations of block 2605 may be performed by the CA configuration module 1405 as described above with reference to FIG. 14.

At block 2610, the UE 115 may identify ACK/NACK feedback information for a plurality of code blocks received on the eCC of the SCell, the plurality of code blocks received in a plurality of scheduled transport blocks as described above with reference to FIGS. 2-11. In certain examples, the operations of block 2610 may be performed by the eCC decoder module 1410 as described above with reference to FIG. 14.

At block 2615, the UE 115 may identify a feedback subframe of the PCell for providing the ACK/NACK feedback information based at least in part on a subframe of the PCell for which transmissions of the plurality code blocks received on the eCC completed as described above with reference to FIGS. 2-11. In certain examples, the operations of block 2615 may be performed by the eCC HARQ feedback module 1415 as described above with reference to FIG. 14.

At block 2620, the UE 115 may transmit the ACK/NACK feedback information via the PCell in the identified feedback subframe as described above with reference to FIGS. 2-11. In certain examples, the operations of block 2620 may be performed by the transmitter 1220 as described above with reference to FIG. 12.

Figure 27:
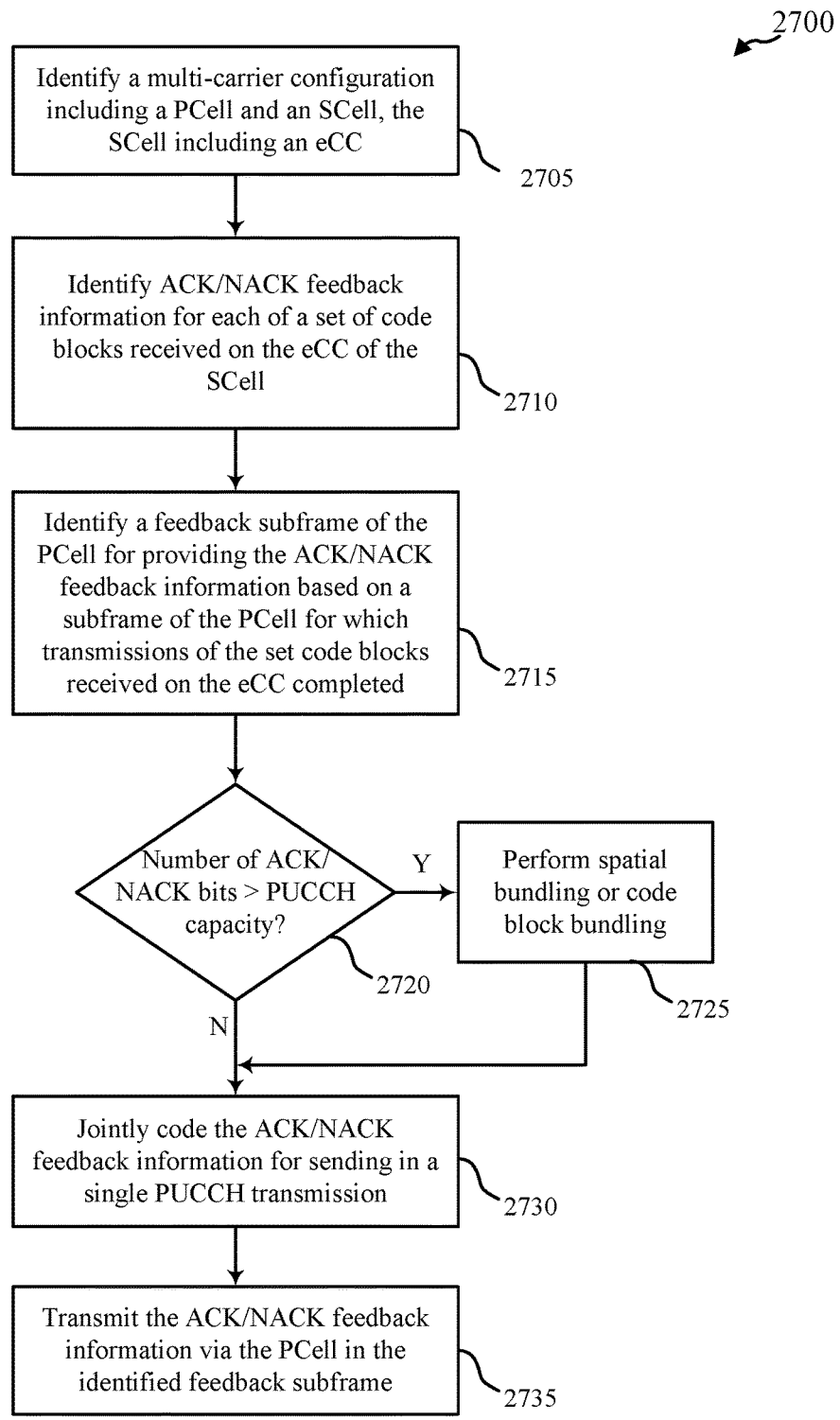
FIG. 27 shows a flowchart illustrating a method for HARQ feedback for non-standalone enhanced component carriers in accordance with various aspects of the present disclosure.

FIG. 27 shows a flowchart illustrating a method 2700 for HARQ and CSI feedback for non-standalone enhanced component carriers in accordance with various aspects of the present disclosure. The operations of method 2700 may be implemented by a UE 115 or its components as described with reference to FIGS. 1-11. For example, the operations of method 2700 may be performed by the UE eCC information component 145 as described with reference to FIGS. 1 and 12-13. In some examples, a UE 115 may execute a set of codes to control the functional elements of the UE 115 to perform the functions described below. Additionally or alternatively, the UE 115 may perform aspects the functions described below using special-purpose hardware. The method 2700 may also incorporate aspects of method 2600 of FIG. 26.

At block 2705, the UE 115 may identify a multi-carrier configuration comprising a PCell and an SCell, as described above with reference to FIGS. 2A-11. For example, the SCell may include a non-standalone eCC using unlicensed or shared spectrum. In certain examples, the operations of block 2705 may be performed by the CA configuration module 1405 as described above with reference to FIG. 14.

At block 2710, the UE 115 may identify ACK/NACK feedback information for a plurality of code blocks received on the eCC of the SCell, the plurality of code blocks received in a plurality of scheduled transport blocks as described above with reference to FIGS. 2A-11. In certain examples, the operations of block 2710 may be performed by the eCC decoder module 1410 as described above with reference to FIG. 14.

At block 2715, the UE 115 may identify a feedback subframe of the PCell for providing the ACK/NACK feedback information based at least in part on a subframe of the PCell for which transmissions of the plurality code blocks received on the eCC completed as described above with reference to FIGS. 2A-11. In certain examples, the operations of block 2715 may be performed by the eCC HARQ feedback module 1415 as described above with reference to FIG. 14.

At block 2720, the UE 115 may determine whether a number of ACK/NACK bits of the ACK/NACK feedback information exceeds a capacity of a PUCCH format used for the PUCCH transmission as described above with reference to FIGS. 2A-11. In certain examples, the operations of block 2720 may be performed by the CA configuration module 1405 as described above with reference to FIG. 14.

If the UE 115 determines at block 2720 that the number of ACK/NACK bits exceeds the PUCCH capacity, the UE 115 may perform bundling of the ACK/NACK feedback information according to categories of the ACK/NACK feedback information at block 2725. For example, the UE 115 may first perform spatial bundling (e.g., bundling of ACK/NACK feedback information for different spatial streams, etc.). If the number of ACK/NACK bits of the ACK/NACK feedback information still exceeds a capacity of a PUCCH format after spatial bundling, the UE 115 may perform bundling for ACK/NACK bits associated with multiple code blocks within a transport block of the plurality of scheduled transport blocks for the SCell. In certain examples, the operations of block 2725 may be performed by the CA configuration module 1405 as described above with reference to FIG. 14.

At block 2730, the UE 115 may jointly code the ACK/NACK feedback information for sending in a single PUCCH transmission as described above with reference to FIGS. 2A-11. In certain examples, the operations of block 2730 may be performed by the CA configuration module 1405 as described above with reference to FIG. 14.

At block 2735, the UE 115 may transmit the ACK/NACK feedback information via the PCell in the identified feedback subframe as described above with reference to FIGS. 2A-11. In certain examples, the operations of block 2735 may be performed by the transmitter 1220 as described above with reference to FIG. 12.

Figure 28:
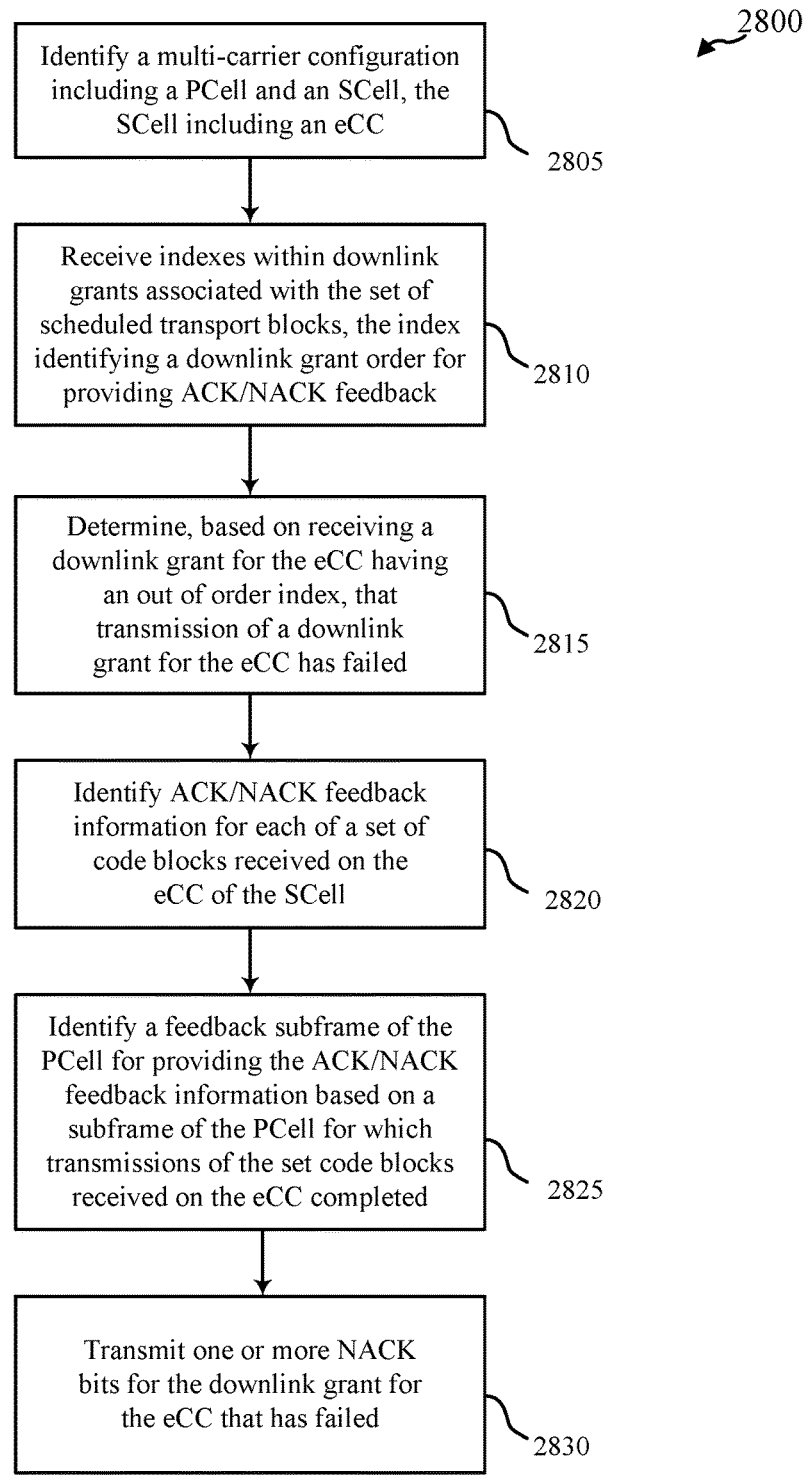
FIG. 28 shows a flowchart illustrating a method for HARQ feedback for non-standalone enhanced component carriers in accordance with various aspects of the present disclosure.

FIG. 28 shows a flowchart illustrating a method 2800 for HARQ and CSI feedback for non-standalone enhanced component carriers in accordance with various aspects of the present disclosure. The operations of method 2800 may be implemented by a UE 115 or its components as described with reference to FIGS. 1-11. For example, the operations of method 2800 may be performed by the UE eCC information component 145 as described with reference to FIGS. 1 and 12-13. In some examples, a UE 115 may execute a set of codes to control the functional elements of the UE 115 to perform the functions described below. Additionally or alternatively, the UE 115 may perform aspects the functions described below using special-purpose hardware. The method 2800 may also incorporate aspects of methods 2600, and 2700 of FIGS. 26-27.

At block 2805, the UE 115 may identify a multi-carrier configuration comprising a PCell and an SCell, as described above with reference to FIGS. 2-11. For example, the SCell may include a non-standalone eCC using unlicensed or shared spectrum. In certain examples, the operations of block 2805 may be performed by the CA configuration module 1405 as described above with reference to FIG. 14.

At block 2810, the UE 115 may receive downlink transmission index information within downlink grants associated with the plurality of scheduled transport blocks as described above with reference to FIGS. 6-11. In certain examples, the operations of block 2810 may be performed by the eCC decoder module 1410 as described above with reference to FIG. 14.

At block 2815, the UE 115 may determine, based at least in part on receiving a downlink grant for the eCC having an out of order index, that transmission of at least one downlink grant for the eCC has failed as described above with reference to FIGS. 2-11. In certain examples, the operations of block 2815 may be performed by the eCC decoder module 1410 as described above with reference to FIG. 14.

At block 2820, the UE 115 may identify ACK/NACK feedback information for a plurality of code blocks received on the eCC of the SCell, the plurality of code blocks received in a plurality of scheduled transport blocks as described above with reference to FIGS. 2-11. In certain examples, the operations of block 2820 may be performed by the eCC decoder module 1410 as described above with reference to FIG. 14.

At block 2825, the UE 115 may identify a feedback subframe of the PCell for providing the ACK/NACK feedback information based at least in part on a subframe of the PCell for which transmissions of the plurality code blocks received on the eCC completed as described above with reference to FIGS. 7-11. In certain examples, the operations of block 2825 may be performed by the eCC HARQ feedback module 1415 as described above with reference to FIG. 14.

At block 2830, the UE 115 may transmit the ACK/NACK feedback information via the PCell in the identified feedback subframe as described above with reference to FIGS. 7-11. For example, the UE 115 may send, in the transmitted ACK/NACK feedback information, one or more NACK bits for the at least one downlink grant for the eCC that has failed as described above with reference to FIGS. 2-11. In certain examples, the operations of block 2830 may be performed by the transmitter 1220 as described above with reference to FIG. 12.

Figure 29:
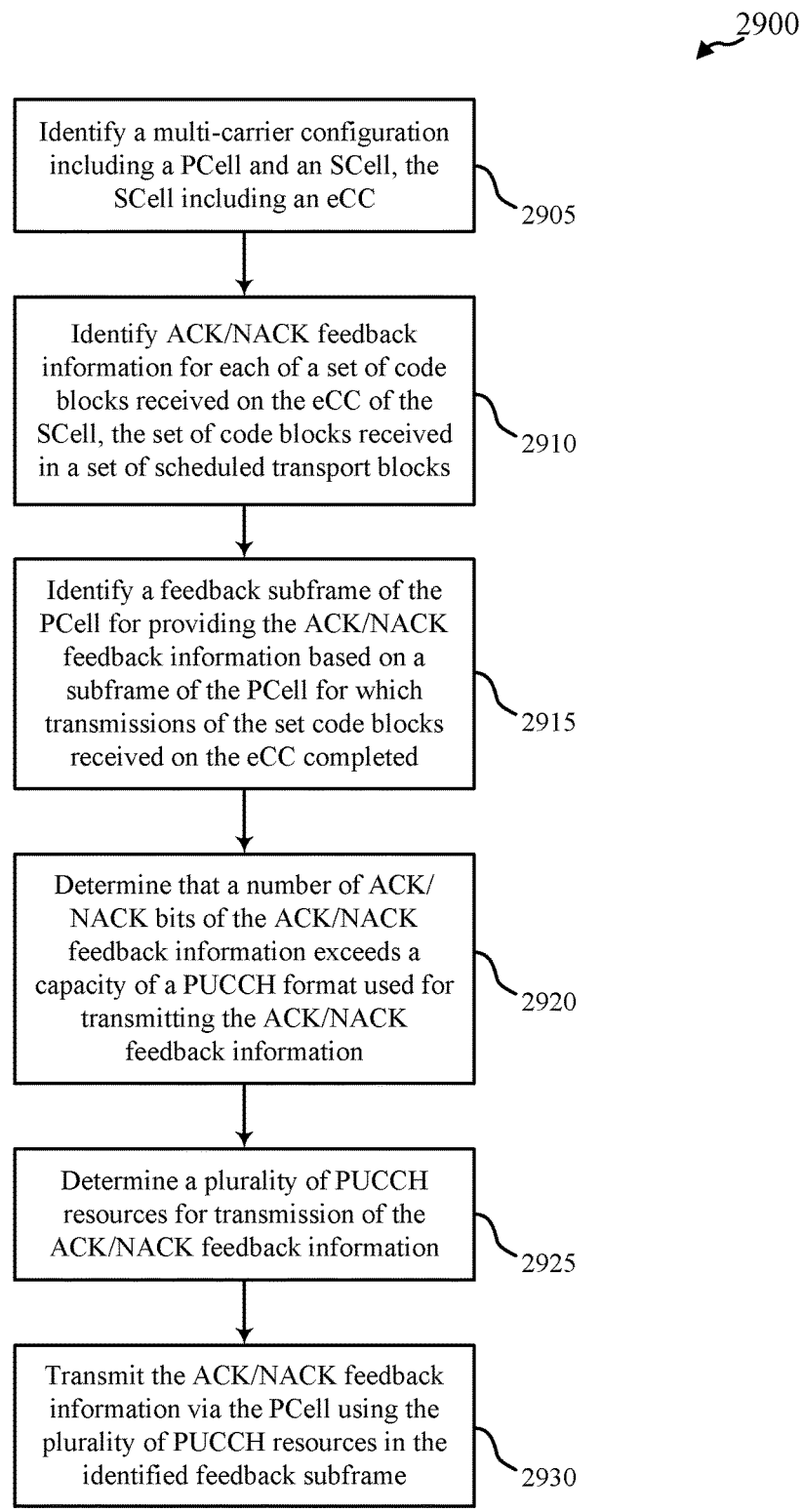
FIG. 29 shows a flowchart illustrating a method for HARQ feedback for non-standalone enhanced component carriers in accordance with various aspects of the present disclosure.

FIG. 29 shows a flowchart illustrating a method 2900 for HARQ and CSI feedback for non-standalone enhanced component carriers in accordance with various aspects of the present disclosure. The operations of method 2900 may be implemented by a UE 115 or its components as described with reference to FIGS. 1-11. For example, the operations of method 2900 may be performed by the UE eCC information component 145 as described with reference to FIGS. 1 and 12-13. In some examples, a UE 115 may execute a set of codes to control the functional elements of the UE 115 to perform the functions described below. Additionally or alternatively, the UE 115 may perform aspects the functions described below using special-purpose hardware. The method 2900 may also incorporate aspects of methods 2000, 2600, 2700, and 2800 of FIGS. 20 and 26-28.

At block 2905, the UE 115 may identify a multi-carrier configuration comprising a PCell and an SCell, as described above with reference to FIGS. 2-11. For example, the SCell may include a non-standalone eCC using unlicensed or shared spectrum. In certain examples, the operations of block 2905 may be performed by the CA configuration module 1405 as described above with reference to FIG. 14.

At block 2910, the UE 115 may identify ACK/NACK feedback information for a plurality of code blocks received on the eCC of the SCell, the plurality of code blocks received in a plurality of scheduled transport blocks as described above with reference to FIGS. 7-11. In certain examples, the operations of block 2910 may be performed by the eCC decoder module 1410 as described above with reference to FIG. 14.

At block 2915, the UE 115 may identify a feedback subframe of the PCell for providing the ACK/NACK feedback information based at least in part on a subframe of the PCell for which transmissions of the plurality code blocks received on the eCC completed as described above with reference to FIGS. 7-11. In certain examples, the operations of block 2915 may be performed by the eCC HARQ feedback module 1415 as described above with reference to FIG. 14.

At block 2920, the UE 115 may determine that a number of ACK/NACK bits of the ACK/NACK feedback information exceeds a capacity of a PUCCH format used for transmitting the ACK/NACK feedback information as described above with reference to FIGS. 7-11. In certain examples, the operations of block 2920 may be performed by the CA configuration module 1405 as described above with reference to FIG. 14.

At block 2925, the UE 115 may determine a plurality of PUCCH resources for transmission of the ACK/NACK feedback information as described above with reference to FIGS. 7-11. In certain examples, the operations of block 2925 may be performed by the HARQ feedback resource module 1415 as described above with reference to FIG. 14.

At block 2930, the UE 115 may transmit the ACK/NACK feedback information via the PCell using the plurality of PUCCH resources in the identified feedback subframe as described above with reference to FIGS. 7-11. In certain examples, the operations of block 2930 may be performed by the transmitter 1220 as described above with reference to FIG. 12.

Figure 30:
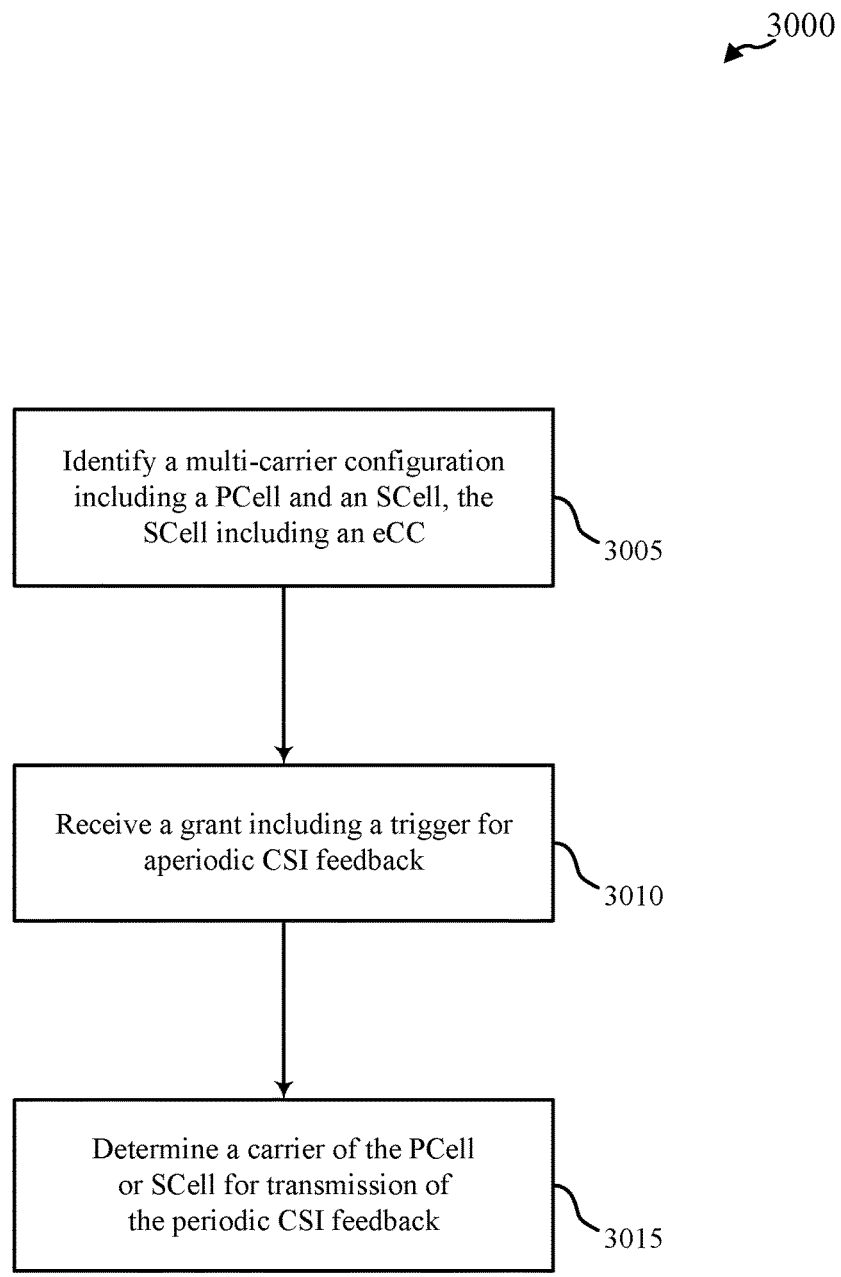
FIG. 30 shows a flowchart illustrating a method for CSI feedback for non-standalone enhanced component carriers in accordance with various aspects of the present disclosure.

FIG. 30 shows a flowchart illustrating a method 3000 for CSI feedback for non-standalone enhanced component carriers in accordance with various aspects of the present disclosure. The operations of method 3000 may be implemented by a UE 115 or its components as described with reference to FIGS. 1-15. For example, the operations of method 3000 may be performed by the UE eCC information component 145 as described with reference to FIGS. 1 and 12-13. In some examples, a UE 115 may execute a set of codes to control the functional elements of the UE 115 to perform the functions described below. Additionally or alternatively, the UE 115 may perform aspects the functions described below using special-purpose hardware. The method 3000 may also incorporate aspects of methods 2000, 2600, 2700, 2800, and 2900 of FIGS. 20 and 26-29.

At block 3005, the UE 115 may identify a multi-carrier configuration comprising a PCell and an SCell, as described above with reference to FIGS. 2-11. For example, the SCell may include a non-standalone eCC using unlicensed or shared spectrum. In certain examples, the operations of block 3005 may be performed by the CA configuration module 1405 as described above with reference to FIG. 14.

At block 3010, the UE 115 may receive a grant comprising a trigger for aperiodic CSI feedback as described above with reference to FIGS. 2-7. In certain examples, the operations of block 3010 may be performed by the device 1205 as described above with reference to FIG. 12.

At block 3015, the UE 115 may determine a carrier of the PCell or SCell for transmission of the aperiodic CSI feedback as described above with reference to FIGS. 2-11. In certain examples, the operations of block 3015 may be performed by the eCC CSI feedback module 1445 as described above with reference to FIG. 14.

In some examples, aspects from two or more of the methods 2000-3000 may be combined. It should be noted that the methods 2000-3000 are just example implementations, and that the operations of the methods 2000-3000 may be rearranged or otherwise modified such that other implementations are possible. Although the methods 2000-3000 describe communications between a base station and a UE, the techniques described herein may also apply to communications between two or more base stations as well as two or more UEs.

The detailed description set forth above in connection with the appended drawings describes examples and does not represent the only examples that may be implemented or that are within the scope of the claims. The terms "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
    configuring a wireless device for communications using a component carrier (CC);
    communicating, by the wireless device, using the CC on at least a secondary cell in a carrier aggregation (CA) configuration, wherein the CC comprises a wideband carrier having non-backward compatible orthogonal frequency division multiplexing (OFDM) numerology with respect to a carrier of a primary cell;
    using, by the wireless device, the primary cell for control information pertaining to communications on the CC;
    receiving, at the wireless device, an uplink grant that identifies one or both of time and frequency resources for a physical uplink shared channel (PUSCH) transmission on the CC; and
    refraining from sending, at the wireless device, uplink data in response to a failure to gain access to a medium identified in the uplink grant using the identified times or frequency resources.

2. The method of claim 1, wherein communicating using the CC comprises:
    communicating on an unlicensed radio frequency spectrum band or a shared radio frequency spectrum band.

3. The method of claim 1, wherein using the primary cell for control information further comprises:
    sending channel state information (CSI) related to the CC.

4. The method of claim 3, further comprising:
    receiving, at the wireless device, a grant comprising a trigger for aperiodic CSI feedback; and
    determining, by the wireless device, a carrier of the primary cell or secondary cell for transmission of the aperiodic CSI feedback.

5. The method of claim 3, wherein sending CSI further comprises:
    sending the CSI on one or both of a physical uplink control channel (PUCCH) of the primary cell and a physical uplink shared channel (PUSCH) of the primary cell.

6. The method of claim 4, wherein determining the carrier comprises:
    determining the carrier based at least in part on any of a cell on which the grant is received, a cell which is scheduled by the grant, or combinations thereof.

7. The method of claim 1, wherein using the primary cell for control information further comprises:

sending, in response to data received via the CC, uplink acknowledgment/negative acknowledgment (ACK/NACK) feedback information.

8. The method of claim 7, further comprising:

identifying ACK/NACK feedback information for a plurality of code blocks received on an CC of the secondary cell, the plurality of code blocks received in a plurality of scheduled transport blocks; and identifying a feedback subframe of the primary cell for providing the uplink ACK/NACK feedback information based at least in part on a subframe of the primary cell for which transmissions of the plurality code blocks received on the CC are completed, wherein sending the uplink ACK/NACK feedback information further comprises transmitting the uplink ACK/NACK feedback information via the primary cell in the identified feedback subframe.

9. The method of claim 8, wherein the primary cell comprises a downlink primary component carrier and a frequency division duplex (FDD) uplink primary component carrier, and wherein the feedback subframe has a predetermined offset from the subframe of the primary cell for which the transmissions of the plurality of code blocks received on the CC completed.

10. The method of claim 8, wherein the primary cell comprises a time division duplex (TDD) component carrier, and wherein the feedback subframe comprises a first uplink subframe of the TDD component carrier after a predetermined offset from the subframe of the primary cell for which the transmissions of the plurality of code blocks received on the CC are completed.

11. The method of claim 7, wherein using the primary cell for control information further comprises:

sending the uplink ACK/NACK in response to CC downlink data on one or both of a physical uplink control channel (PUCCH) of the primary cell and a physical uplink shared channel (PUSCH) of the primary cell.

12. The method of claim 7, wherein sending the uplink ACK/NACK feedback information further comprises:

sending a block ACK/NACK containing multiple ACK/NACKs corresponding to multiple CC downlink data.

13. The method of claim 12, further comprising:

receiving downlink transmission index information within downlink grants associated with the plurality of scheduled transport blocks.

14. The method of claim 7, further comprising:

determining that a number of ACK/NACK bits of the uplink ACK/NACK feedback information exceeds a capacity of a PUCCH format used for transmitting the uplink ACK/NACK feedback information; and determining a plurality of PUCCH resources for transmission of the uplink ACK/NACK feedback information, wherein sending the uplink ACK/NACK feedback information further comprises transmitting a plurality of PUCCH transmissions using the plurality of PUCCH resources.

15. A method for wireless communication, comprising:

configuring a wireless device for communication using a component carrier (CC);

communicating, by the wireless device, using the CC on at least a secondary cell in a carrier aggregation (CA) configuration, wherein the CC comprises a wideband carrier having non-backward compatible orthogonal frequency division multiplexing (OFDM) numerology with respect to a carrier of a primary cell;

using, by the wireless device, the primary cell for control information pertaining to communication on the CC;

sending, by the wireless device, a downlink grant that identifies one or both of time and frequency resources for physical downlink shared channel (PDSCH) transmission on the CC; and refraining from sending, at the wireless device, downlink data in response to a failure to gain access to a medium identified in the downlink grant using the identified time or frequency resources.

16. The method of claim 15, wherein the downlink grant identifies multiple time and frequency resources for physical downlink shared channel (PDSCH) transmission on the CC.

17. The method of claim 15, wherein the downlink grant identifies an expiration time for physical downlink shared channel (PDSCH) transmission on the CC, further comprising refraining from sending, at the wireless device, the downlink data in response to a failure to gain access to a medium identified in the downlink grant by the expiration time.

18. The method of claim 1, wherein the uplink grant identifies an expiration time for a physical uplink shared channel (PUSCH) transmission on the CC, further comprising refraining from sending, at the wireless device, the uplink data in response to a failure to gain access to the medium identified in the uplink grant by the expiration time.

19. An apparatus for wireless communication, comprising:

a processor;

memory in electronic communication with the processor; and instructions stored in the memory, the instructions being executable by the processor to:

configure a wireless device for communications using a component carrier (CC);

communicate, by the wireless device, using the CC on at least a secondary cell in a carrier aggregation (CA) configuration, wherein the CC comprises a wideband carrier having non-backward compatible orthogonal frequency division multiplexing (OFDM) numerology with respect to a carrier of a primary cell;

use, by the wireless device, a primary cell for control information pertaining to communications on the CC.

receive, by the wireless device, an uplink grant the identifies one or both of time and frequency resources for a physical uplink shared channel (PUSCH) transmission on the CC; and refrain from sending, by the wireless device, uplink data in response to a failure to gain access to a medium identified in the uplink grant using the identified times of frequency resources.

20. The apparatus of claim 19, wherein the instructions are executable by the processor to:

send channel state information (C SI) related to the CC.

21. The apparatus of claim 19, wherein the instructions are executable by the processor to:

send, in response to data received via the CC, uplink ACK/NACK feedback information.

22. The apparatus of claim 21, wherein the instructions are executable by the processor to:

identify ACK/NACK feedback information for a plurality of code blocks received on an CC of the secondary cell, the plurality of code blocks received in a plurality of scheduled transport blocks; and identify a feedback subframe of the primary cell for providing the uplink ACK/NACK feedback information based at least in part on a subframe of the primary cell for which transmissions of the plurality code blocks received on the CC are completed, wherein the instructions are executable by the processor to send the uplink ACK/NACK feedback information via the primary cell in the identified feedback subframe.

23. The method of claim 15, wherein communicating using the CC comprises:
communicating on an unlicensed radio frequency spectrum band or a shared radio frequency spectrum band.

24. The method of claim 15, wherein using the primary cell for control information further comprises:
sending, in response to data received via the CC, a downlink acknowledgment/negative-acknowledgment (ACK/NACK) feedback information.

25. The method of claim 24, further comprising:
identifying ACK/NACK feedback information for a plurality of code blocks received on a CC of the secondary cell, the plurality of code blocks received in a plurality of scheduled transport blocks; and
identifying a feedback subframe of the primary cell for providing the downlink ACK/NACK feedback information based at least in part on a subframe of the primary cell for which transmissions of the plurality of code blocks received on the CC are completed, wherein sending the downlink ACK/NACK feedback information further comprises transmitting the downlink ACK/NACK feedback information via the primary cell in the identified feedback subframe.

26. The method of claim 25, wherein the primary cell comprises a downlink primary component carrier and a frequency division duplex (FDD) uplink primary component carrier, and wherein the feedback subframe has a predetermined offset from the subframe of the primary cell for which the transmissions of the plurality of code blocks received on the CC completed.

27. The method of claim 25, wherein the primary cell comprises a time division duplex (TDD) component carrier, and wherein the feedback subframe comprises a first uplink subframe of the TDD component carrier after a predetermined offset from the subframe of the primary cell for which the transmissions of the plurality of code blocks received on the CC are completed.

28. The method of claim 24, wherein using the primary cell for control information further comprises:
sending the downlink ACK/NACK feedback information in response to CC uplink data on at least one of an indicator channel of the primary cell, a physical downlink shared channel (PDSCH) of the primary cell, and combinations thereof.

29. The method of claim 24, wherein sending the downlink ACK/NACK feedback information further comprises:
sending a block ACK/NACK containing multiple ACK/NACKs corresponding to multiple CC uplink data.

30. The method of claim 29, wherein sending the block ACK/NACK further comprises:
indicating that the multiple ACK/NACKs correspond to multiple users transmitting the data received via the CC.

31. An apparatus for wireless communication, comprising:
a processor;
memory in electronic communication with the processor; and
instructions stored in the memory, the instructions being executable by the processor to:
configure a wireless device for communications using a component carrier (CC);
communicate, by the wireless device, using the CC on at least a secondary cell in a carrier aggregation (CA) configuration, wherein the CC comprises a wideband carrier having non-backward compatible orthogonal frequency division multiplexing (OFDM) numerology with respect to a carrier of a primary cell;
use, by the wireless device, a primary cell for control information pertaining to communications on the CC
send, by the wireless device, a downlink grant that identifies one or both of time and frequency resources for physical downlink shared channel (PDSCH) transmission on the CC; and
refrain from sending, at the wireless device, downlink data in response to a failure to gain access to a medium identified in the downlink grant using the identified time or frequency resources.

* * * * *